US005467448A

United States Patent [19]

Hilton et al.

[11] Patent Number: 5,467,448

[45] Date of Patent: Nov. 14, 1995

[54] TEXT FORMATTING BY THE DIRECT SELECTION OF BORDERS IN AN EDITING DISPLAY

[75] Inventors: Michael W. Hilton, Mountain View; Michael R. Plasterer, Cupertino; Bruce H. Browne, Palo Alto, all of Calif.

[73] Assignee: Claris Corporation, Santa Clara, Calif.

[21] Appl. No.: 420,622

[22] Filed: Apr. 12, 1995

Related U.S. Application Data

[63] Continuation of Ser. No. 201,068, Feb. 24, 1994, abandoned, which is a continuation of Ser. No. 698,735, May 10, 1991, abandoned.

[51] Int. Cl.⁶ .................................................. G06F 17/21
[52] U.S. Cl. ............................................ 395/148; 395/146
[58] Field of Search ..................................... 395/145, 144, 395/148, 161, 146

[56] References Cited

U.S. PATENT DOCUMENTS

| | | | |
|---|---|---|---|
| 4,829,470 | 5/1989 | Wang | 395/144 X |
| 5,001,697 | 3/1991 | Torres | 364/521 |
| 5,208,906 | 5/1993 | Morgan | 395/148 |
| 5,231,577 | 7/1993 | Koss | 395/148 X |

OTHER PUBLICATIONS

Microsoft Excel User's Guide (Trademark of Microsoft Corporation) 1986, pp. 6, 9–12, 124, 239 and 329.
Microsoft Word for Windows 2.0 (Trademark of Microsoft Corporation), 1989, pp. 1–4.
*Inside QuarkXPress* (1989).
G. Booch, *Object–Oriented Design With Applications* (1991), pp. 97–131.
Ashton–Tate Corporation, manual entitled *Using FullWrite Professional*™ (1990), and related manuals including: *The FullWrite Professional*™ *Toolbox, Using Sound Notes, Using Tycho Table Maker*™, *Support and Services Guide, Learning FullWrite Professional*™, *Getting Started with FullWrite Professional*™, and *FullWrite Professional*™ *Quick Reference Card.*
*Microsoft Windows User's Guide* (Trademark of Microsoft Corporation), 1990 p. 43.

*Primary Examiner*—Heather R. Herndon
*Assistant Examiner*—Cliff Nguyen Vo
*Attorney, Agent, or Firm*—Blakely, Sokoloff, Taylor & Zafman

[57] ABSTRACT

A method and apparatus for adjusting the format of a table. The table comprises a column with a first, second, third, and fourth edges. The method comprises selecting a first edge of the column, the first edge residing in a first position on a page. Then, the first edge is moved to a second position on a page. Text of the column is reflowed to fit within the first, second, third, and fourth edges. The means for selecting comprises a mouse, in a preferred embodiment, and a means for selecting comprises a selection button on the mouse.

21 Claims, 67 Drawing Sheets

| | File | Edit | Font | Size | Style | Format | Frame | View | Table | 620 |
|---|---|---|---|---|---|---|---|---|---|---|

US Constitution

| | | | Table To Text | ← 1537 |
|---|---|---|---|---|
| | | | Sort Cells... | ← 1538 |
| | | | Merge Cells | ← 1539 |
| State | Original Reps. | Current Reps | Row Height... | ← 1540 |
| New hampshire | 3 | 1 | Column Width... | ← 1541 |
| 1525 Massachusetts | 8 | 10 | | |
| Rhode Island | 1 | 2 | Cell Borders... | ← 1535 |
| Connecticut | 5 | 12 | Hide Cell Guides | ← 1536 |
| New York | 6 | 16 | | |
| New Jersey | 4 | 8 | Insert Row | ← 1531 |
| Pennsylvania | 8 | 10 | Insert Column | ← 1532 |
| Delaware | 1 | 2 | Delete Row | ← 1533 |
| Maryland | 6 | 10 | Delete Column | ← 1534 |
| Virginia | 10 | 12 | | |
| North Carolina | 5 | 8 | | 1530 |
| South Carolina | 5 | 7 | | |

1526 The Number of Representatives shall not exceed one for every thirty Thousand, but each State shall have at Least one Representative; and until such enumeration shall be made, the State of Page 1 | 100 %

| State | Original Reps. | Current Reps. |
|---|---|---|
| New Hampshire | 3 | 1 |
| Massachusetts | 8 | 10 |
| Rhode Island | 1 | 2 |
| Connecticut | 5 | 12 |
| New York | 6 | 16 |
| New Jersey | 1555 4 | 1553 8 |
| Pennsylvania | 8 | 10 |
| Delaware | 1556 1 | 1551 2 |
| Maryland | 1554 6 | 1552 10 |
| Virginia | 10 | 12 |
| North Carolina | 5 | 8 |
| South Carolina | 5 | 620 |

The Number of Representatives shall not exceed one for every thirty Thousand, but each State shall have at Least one Representative; and until such enumeration shall be made, the State of

Figure 15d

TEXT FORMATTING BY THE DIRECT SELECTION OF BORDERS IN AN EDITING DISPLAY

This is a continuation of application Ser. No. 08/201,068, filed Feb. 24, 1994, now abandoned, which is a continuation of application Ser. No. 07/698,735, filed May 10, 1991, now abandoned.

BACKGROUND OF THE INVENTION

1. Field of the Invention

The present invention relates to adding additional features to computer systems. More particularly, this invention relates to a system and method for adding additional functionality to computer systems without the need for rebuilding the entire system. This invention further relates to improved functions for manipulating text, associating sound with given portions of text, and adding multilingual capability to computers.

2. Background Information

The addition of functionality is typically a high priority in the design of modern computer systems. The addition of functions to computer systems has been typically performed at two levels: (1) user-generated addition of functions; and (2) changes to the computer system software. User-generated additions of functionality are typically performed using "macro" commands. Macro commands are a series of steps or instructions in the language of the underlying system. Macros are executed by the underlying system software using a scripting function or other interpretive-based activity which takes each instruction generated by the user and performs the required function. As can be appreciated by one skilled in the art, this approach has the limitation that the user is subject to the functionality of the underlying computer system. In other words, features which are not supported by the underlying system will not be able to be performed. Therefore, macro-based additions of user functionality are intimately tied to the underlying system software. For example, in a system which does not support mathematical functions, if a user desires to perform some arithmetic using macros, those functions will be unavailable to him.

Another disadvantage of the macro-based functions is that lower level operations than that provided by the underlying system are not accessible to the user. If the underlying system software does not provide access to certain data items residing in memory or computer registers, then those data items will also not be accessible to the user in his macro program.

Yet another disadvantage of using macros to add functionality to computer systems is that the execution of macro functions by the computer system are typically executed using an interpretive function. In other words, the macro commands are read in as text, and the text is parsed by the underlying computer system. Then the parsed commands are executed. The commands which comprise the macro typically are not transformed into machine executable object code or a similar low-level sequence of instructions. As a result of these parsing and interpretive functions, significant performance penalties are incurred while executing user-generated macros. Performance penalties may be minimized by adding functionality using compiled program modules.

An alternative way to add functionality to computer systems is for the user to generate his own routines in a suitable computer source code, compile, and link those routines. Of course, if an entirely new program is generated, the user must generate all the underlying low-level functions which are required by the system. The user cannot take advantage of the powerful features offered by an existing system. This is a very time consuming and complex task and requires an intimate understanding of the underlying computer system. This approach, however, does provide the utmost flexibility and functionality, as it provides all the power of the computer system at the disposal of the programmer (provided that the required features are available in the underlying source code).

An alternative way to add functionality to an existing computer system is to develop functions which operate in conjunction with an existing computer program. This will allow the user to take advantage of the functions provided by the existing program, yet retain the utmost flexibility in generating his own functions. This approach suffers from the deficiency that a thorough knowledge of the existing system is required. This approach also suffers from several other disadvantages. One shortcoming is that the existing source and/or object code of the program must be available to the user in order for him to add functions which operate in conjunction with it. This is necessary because the user's functions, once they have been generated and compiled into object code, must be linked with the existing system's object code. Alternatively, the user may wish to make modifications to the existing software itself in order to add the functions he desires. Therefore, the source code of the software will be required. If changes are made to the source code, an even more lengthy process of compiling the source and linking object code modules of the existing system will be required along with the new functions generated by the user. This process is not only difficult and time consuming, it also is very error-prone.

Another disadvantage of this approach, from the computer system developer's point of view, is that the underlying source code of his system must be available to the user. In a commercial context, where thousands of man hours have gone into development of such a system, that approach is not desirable. Trade secret or other proprietary information may be disclosed, and/or the competitive advantage of the developer may be affected. A balance between maintaining the expandability of computer system functions along with protecting the computer system developer's interest must therefore be achieved. Thus, current state-of-the-art techniques are inadequate for maximizing the capability of user-generated functions added to existing computer systems, while preserving the rights of the underlying computer system developer.

Another shortcoming of existing computer systems is that there is typically no distinction between text which is written in one language versus text which is written in another. For instance, one document may contain text written in many different languages. So, when the user wishes to proofread the document, he will be checking the document for accuracy in many different languages. Modern day text processing systems generally provide capabilities such as spell checking and/or word lookup in a thesaurus for synonyms of words. In a multilingual document, such spell checking and thesaurus capabilities fall short because no indication is given that text in one portion of a document is written in one language and text in another portion of the document is written in another language. The user has the option in existing systems of proofreading the document manually or only using the spell checker and/or thesaurus on areas of text that are written in the language of the dictionary or the thesaurus. This requires that substantial user intervention take place in that the user must instruct the program to only check given portions of text. This is an error-prone and time consuming process.

Yet another disadvantage of existing systems is that lack of on-screen cues for reformatting documents. One typical way in which documents are reformatted is by entering new page margins manually. This does not give the user the opportunity to view the changes to the document right on the screen. Typically, a delay or other time period transpires between when the new formatting options are input to the computer system, and when the on-screen text is updated. Yet another way in which documents are reformatted is through the use of a "ruler guide." The system typically displays a "ruler" or a scale in which various formatting options may be referenced. Typically, formatting options are represented on the "ruler" in a manner that corresponds with the position of margins and/or tab stops in the document that the user is viewing. However, the adjustment of the features are not readily apparent on the document itself. In other words, rulers and tab stop markers on the ruler may be adjusted, however, those changes are not viewable in the document until the system updates the text.

Yet another disadvantage of existing text processing systems is the lack of an ability to associate sound with given portions of the text. A user may desire to open a document open for comment from other users, and provide feedback to the author of the text. The feedback may come in the form of text entered by the reviewing personnel or in the form of sound samples giving special instructions to the author or secretarial personnel who are updating the text contained within the document.

Another shortcoming of existing text processing systems is the ability to effectively integrate tables of information within documents. For instance, a user may wish to include within his document a multicolumnar table containing various information. Typically, such prior approaches to inserting data have required that the user specify certain tab stops at which each column of the table will reside. Therefore, if the formatting of the document changes (for instance, a column becomes too narrow or a column becomes too wide) substantial reformatting of the document must take place. This includes, among other things, moving data which resides in one column in a first row to a second row in the same column to prevent the data in that column from running into the adjacent column. Therefore, improved methods of formatting multicolumnar data within a document is required.

SUMMARY AND OBJECTS OF THE INVENTION

One of the objects of the present invention is to provide an easy and efficient method and system for adding functionality to a computer system while preserving the integrity of the underlying computer system source and/or object code.

Another of the objects of the present invention is to provide a means for adding functionality to an existing computer system without requiring that the user rebuild the entire system.

Another object of the present invention is to provide added functionality to existing computer systems without being limited by the functions of the computer system.

Another object of the present invention is to provide a means for associating sound with given portions of text in a document.

Another object of the present invention is to provide a means for distinguishing text in one area of a document as being written in one language with text and another area of a document written in another language.

Another object of the present invention is to provide a means for adjusting the format of documents in a way that is readily apparent to the user.

Another object of the present invention is to provide a means for creating and adjusting tables within a document in such a way that the changes are performed without substantial user intervention.

These and other objects of the present invention are provided for by a method and apparatus in a computer system for communicating between a first process and a second process. The means comprises a process handler, the process handler operative upon a first, second, and third parameters, the first parameter containing a pointer to a process datum. The second parameter contains a message, and the third parameter contains data. The main process transmits and receives information via the process datum, the message, and the data. In the preferred embodiment, the process datum is known as a "pointer" to a data structure containing information about a frame within a document, for instance.

These and other objects of the present invention are provided for by a method and apparatus in a computer system for associating a sound with a first area in text. The means comprises a means for identifying first position in the text, and a means for inserting a datum associated with the first position in the text. The apparatus further comprises a means for recording the sound, a means for storing the sound in the datum, and a means for playing back the sound stored in the datum. In the preferred embodiment, the datum is known as a "sound note" as identified with a particular position in text. In the preferred embodiment, the sound note may be recorded and/or played asynchronously with other processes operating in the computer system.

These and other objects of the present invention are provided for by a means and apparatus for identifying different languages in text. The means comprises a means for identifying a first area in text as comprising a first language. And the means further comprises a means for identifying a second area in the text as comprising a second language. The means may comprise, in one embodiment, a table. This table may have a starting and ending position for the first area, and a value indicating the language in that first area. Further, the table may comprise a starting and ending position for a second area, with a value indicating a second language for the second area. In the preferred embodiment, this allows the associating of certain reference documents, such as thesauri and/or dictionaries which may be used to correct the text contained within those areas.

These and other objects of the present invention are provided for by a method and apparatus in a computer system of adjusting the format of a document. The document comprises a first, second, third, and fourth edges. The method and apparatus comprises selecting a first edge of the document, the first edge residing at a first position on a page. Then, the first edge is moved to a second position on a page, and text is reflowed within the document to fit within the first, second, third, and fourth edges of the page. In the preferred embodiment, the cursor selection device comprises a mouse, and the method of selecting comprises pointing a cursor at the first edge, and depressing a selection button on the mouse. Further, the input selection device is augmented by the use of a "option" key on an alphanumeric input device.

These and other objects of the present invention are provided for by a method and apparatus for adjusting the format of a table. The table comprises a column with a first, second, third, and fourth edges. The method comprises selecting a first edge of the column, the first edge residing in a first position on a page. Then, the first edge is moved to a second position on a page. Text of the column is reflowed to fit within the first, second, third, and fourth edges. The means for selecting comprises a mouse, in a preferred embodiment, and a means for selecting comprises a selection button on the mouse.

BRIEF DESCRIPTION OF DRAWINGS

The present invention is illustrated by way of example and not limitation in the figures of the accompanying in which like references indicate like elements and in which:

FIGS. 15a through 15f show inserting multicolumnar table in a frame as provided by a user-added function, along with the table's contextual menu and various modifications which may be performed on the table.

DETAILED DESCRIPTION OF THE PREFERRED EMBODIMENT

A method and apparatus of adding various functionality to computer systems is described. In the following description, for the purposes of explanation, specific data structures, pointers, external references, times, signals, and formats are set forth in order to provide a thorough understanding of the present invention. However, it will be apparent to one skilled in the art, that the present invention may be practiced without these specific details. In other instances, well known data structures and devices are shown in block diagram form in order to not unnecessarily obscure the present invention.

A portion of the disclosure of this patent document contains material which is subject to copyright protection. The copyright owner has no objection to the facsimile reproduction by any one of the patent disclosure, as it appears in the Patent and Trademark Office patent files of records, but otherwise reserves all copyright rights whatsoever.

Figure 1:
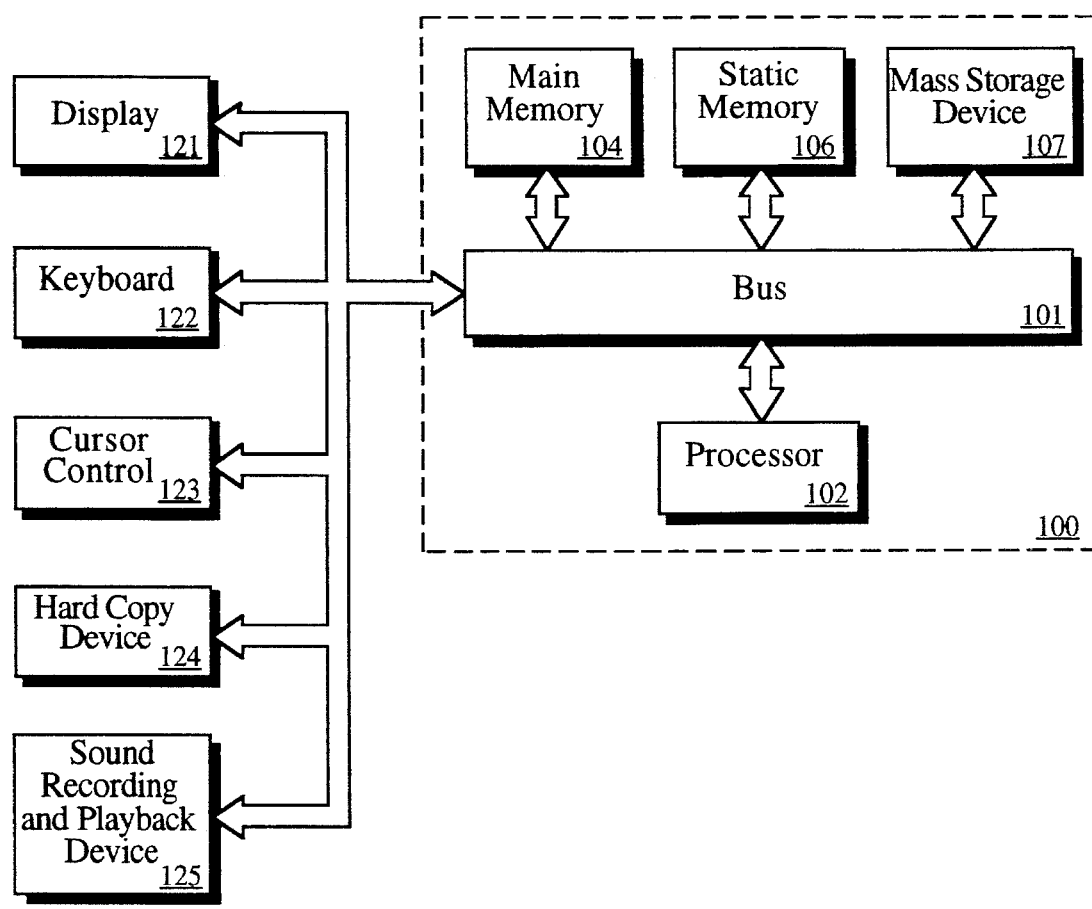
FIG. 1 is a block diagram of a computer system used in the preferred embodiment.

Referring to FIG. 1, the computer system upon which the preferred embodiment of the present invention is implemented is shown as 100. 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such an audio digitizer means coupled to a microphone for recording information. Further, the device may include a speaker which is coupled to a digital to analog (D/A) converter for playing back the digitized sounds.

In the preferred embodiment, computer system 100 is one of the Macintosh® family of personal computers such as the Macintosh® SE or Macintosh® II manufactured by Apple® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill.

The preferred embodiment uses an object-oriented approach to allow users to add functionality to computer system 100. In other words, given functions in the system are treated as objects in the system, to be manipulated. The underlying routines which provide the basis for the functioning of the computer system, and additional user expansion of these functions, is provided by routines written in the "C" programming language. Routines are compiled using the Think C brand compiler available from Semantec Corporation of Cupertino, Calif. or MPW brand C compiler available from Apple® Computer, Inc. of Cupertino, Calif. which each generate computer object code for Motorola 68000 family central processing units operating in the Macintosh® brand operating system. Examples of code segments for the data structures and messages used in the preferred embodiment are shown in the appendices attached to this patent application. These will be discussed and explained in more detail below.

Before discussing the preferred embodiment in detail, a brief overview of the user interface used by the preferred embodiment. The preferred embodiment uses a "windowing" operating system wherein selections are performed using a cursor control device such as 123 shown in FIG. 1. Typically, an item is "selected" on a computer system display such as 121 using cursor control device 123 by depressing a selection button which is typically mounted on the cursor control device such as 123. Therefore, in order to run a given program, the user merely selects area on a computer display by "double clicking" the area on the screen. A "double click" is an operation comprising two rapid depressings of the mouse or other selection device indicating to the operating system that the program is desired to be run. Further, "pull-down" menus are used in the preferred embodiment. A pull-down menu is a selection which is accessible by depressing the selection button when the cursor is pointing at a menu bar (typically at the top of a computer screen), and "dragging" (moving cursor control device 123 while the selection button is depressed) until the selection the user wishes to access is reached on the pull-down menu. An item is indicated as being selected on a pull-down menu when the item is displayed in "reverse video" or white text on a black background. The selection is performed by the user releasing the selection button when the selection he wishes to make is displayed in this reverse video format.

The preferred embodiment of the present invention provides an object-oriented approach to adding user functionality to the existing computer system. The computer system used in the preferred embodiment is known as the MacWrite® Pro brand word processing program available from Claris® Corporation of Santa Clara, Calif. (Claris® and MacWrite® Pro are registered trademarks of Claris Corporation). The basic object provided by the preferred embodiment of the present invention is known as a "frame" and exists within a document while the program is operating. A frame is a region on a page within a document that contains data that may be manipulated in various ways by the user. Text and picture frames are features of the document processing program of the preferred embodiment. The preferred embodiment further provides a means for adding additional user functions via frames. Text and graphics frames will be discussed in more detail below. In addition, user-generated functions contained for these frames will also be discussed.

The object-oriented model of the preferred embodiment uses a hierarchical classification structure, which is defined in certain records preceding each user-generated computer program. These data structures, defined by the underlying MacWrite® Pro brand word processing system, provide means for communication to add functionality without rebuilding the entire word processing system. The data structures used by the preferred embodiment and referenced by each user-added routine are shown in Appendices I through V. Appendix I shows the external variables and frame data structure items required by the preferred embodiment. The "frame" is the lowest level of object which is allowed by the preferred embodiment. The frame object is known as a "base class," and is required by any user-added function which is generated. 200 shows the hierarchical structure of the base classes which are used in the preferred embodiment. These are, in order of lowest to highest classifications: frame 210; link 220; text 230; and footnote 240. All user-defined classes of objects must use the frame data structures as shown in Appendix I to allow communication with the computer system. The higher level classes such as link 220, text 230, footnote 240, and index 250 are optional to the user, however, the use of higher level classifications such as these results in the "inheritance" of the attributes of the lower and intermediate level classifications. In other words, if a frame is defined as a footnote 240, it "inherits" the attributes of the intermediate classifications' text 230, link 220, and frame 210. Besides frame 210, intermediate classes may be overridden by user-defined classifications. The link-based class data items are shown in Appendix III, and the text based class are shown in Appendix IV. In addition, page object 221 which is shown in Appendix II, also inherits the attributes of the frame object 210. This page-based class object is shown in Appendix II.

The inheritance model of objects used by the preferred embodiment is known to those skilled in the art, and is discussed at length in the publication *Object Oriented Design with Applications*, by Grady Booch (1991), published by the Benjamin/Cummings Publishing Company of Redwood City, Calif. at pages 97 through 131. Classes exists in a hierarchy, as graphically exemplified by 200 shown in FIG. 2a. Other subclasses of frame object 210 are page object 220, equation object 222, graphic object 223, and user-defined object 224. Note that a user-defined object may reside at any level of the hierarchy, but is merely shown at the second level of the hierarchy for simplicity of explanation. Another example of A child class of linked object 220 is shown as table 231. Children are those classes which reside at the lower levels in the object definition hierarchy. Table object 231 will be discussed in more detail below. Other examples of children of text object 230 are: header object 24 1, footer object 242, table text object 243, and post it object 246. These classes are all text objects, and thus are children of text object 230.

The processes or frames which are used in the preferred embodiment and may be generated by users of the computer system are implemented using programs known as external applications or XAPP's. These programs contain the data structures shown in the appendices as required by the particular XAPP. XAPP's provide communication with the computer system of the preferred embodiment using "handlers." A frame handler is a set of processes that act on frames via "FrameHandles." Frames, which are identified by their FrameHandle, are associated to a particular handler via their class. In other words, a particular frame may be associated with its handler via a datum known as a "class ID" contained within the data structure representing the frame pointed to by the FrameHandle. Therefore, once a "FrameHandle" is created, a process or external application may be referred to by its handle using the FrameHandle. As shown in Appendix I, numerous attributes are defined for each FrameHandle, and for each external application or XAPP, there may be numerous frame objects associated with that particular process. Each instance of a frame is referred to by its "FrameHandle."

Functions are performed on objects (frames) through messages. For example, if a frame needs to drawn, the system of the preferred embodiment sends a message to the frame telling it to draw itself. The system of the preferred embodiment also passes all necessary data needed by the object in order to perform a given function.

Figure 2A:
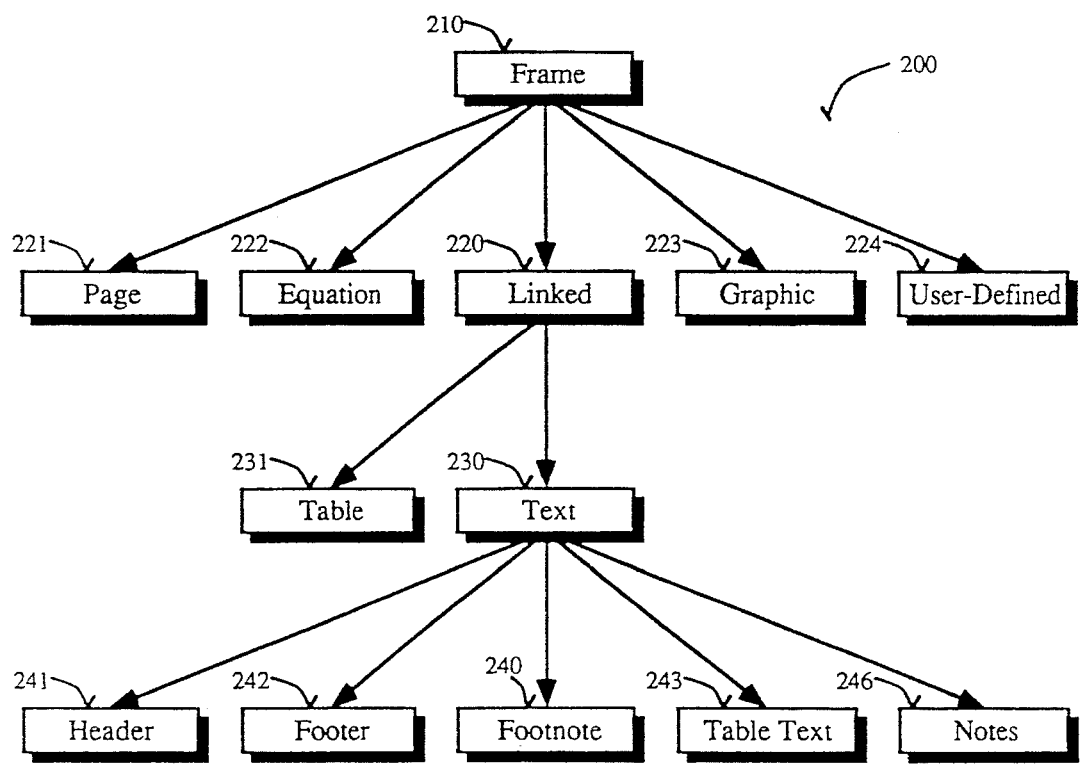
FIG. 2a shows the hierarchical relationship of classes of frames used in the preferred embodiment.

Each base class in the preferred embodiment has a unique number associated with it. This number is known as the "class ID." The class ID is stored in the data structure pointed to by the FrameHandle for each frame. This number identifies which class and therefore which handler to which the frame belongs. When a frame is created, a message entitled "InitMsg" is sent to the appropriate handler. Each class of the handler inherits this message up to its base class, until the message reaches Frame class 210. The frame class then creates a new FrameHandle for the process which requires the new frame. In other words, if a frame is defined as a footer 242 as shown in FIG. 2a, then the request to create the footer is inherited from footer 242 to text 230 to link 220 and thus to frame 210. Once the frame class for the handler receives the message that a frame is required to be created, the frame class creates a FrameHandle, and then passes the message back through the intermediate classes until it reaches the base class of the XAPP via the handler. In this example, frame class 210 will pass the message of creation to link class 220, then to text class 230 and to footer class 242. Thus, when a FrameHandle is created for a particular frame, all the intermediate classes are "inherited" for that process.

Each user-generated function which is used by the preferred embodiment at a minimum requires the frame class (the data structure used to communicate with the XAPP). It provides communication with the main program of the preferred embodiment using a routine known as a "handler." The handler routines is responsible for communicating messages between the XAPP and the main program. Each handler uses a data type of "FrameHandle" (see Appendix I) for frames created in the main program. A FrameHandle is a C programming language defined type which is the generic data type for all frames created in the application. Each class, as defined by the XAPP's present in the current application, must have an associated handler. Each handler routines takes the same parameters and has the following format:

| long HandlerProc(frame,msg,data) | |
|---|---|
| FrameHandle | frame; |
| short | msg; |
| long | data; |

Figure 2B:
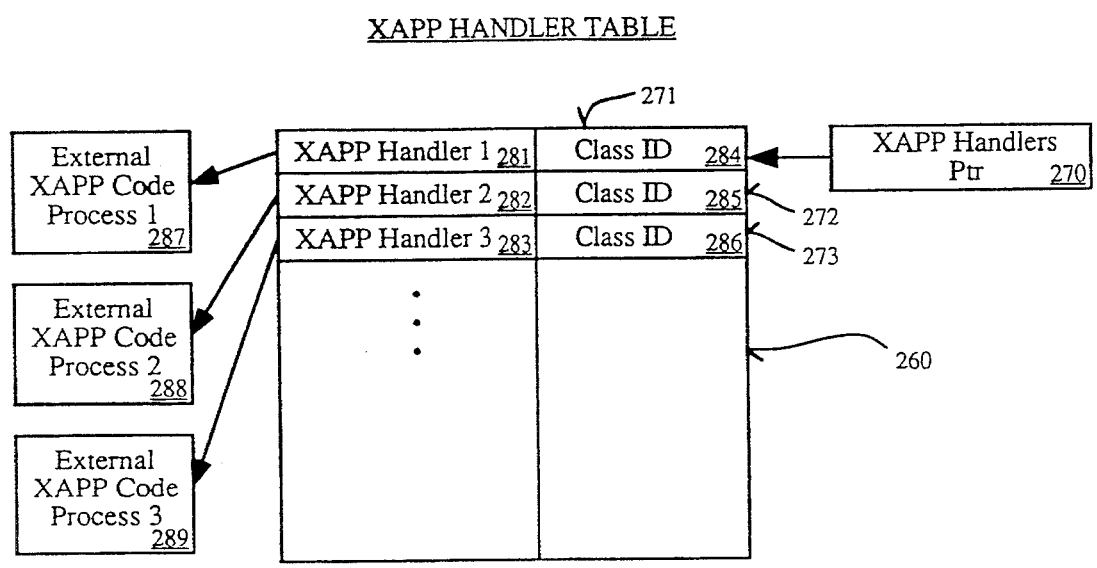
FIG. 2b shows a data structure used for keeping track of added functions in the preferred embodiment

The variable "frame" is of type FrameHandle and uniquely identifies the data associated with this frame including any XAPP specific data for the XAPP which is being activated. As shown in FIG. 2b, a handler is merely the uniquely identifying process pointer and a FrameHandle is the pointer for the data of a particular frame. XAPP handler table 260 shown in FIG. 2b has a XAPP handler pointer to it 270 which indicates the associated handlers such as 271, 272, or 273 for specified XAPP's. Each item which the XAPP handler pointer points has an associated Pointer such as 281, 282, or 283 associated with it which identifies the XAPP process such as 287, 288, or 289. The "data" parameter returned by HandlerProc can contain a pointer or handle to other data structures. The frame class fields in the corresponding handler table such as 284, 285, and 286 contain a value indicating the appropriate class ID (frame type identifier) of the process. This indicates which XAPP to call for the handler.

Figure 2C:
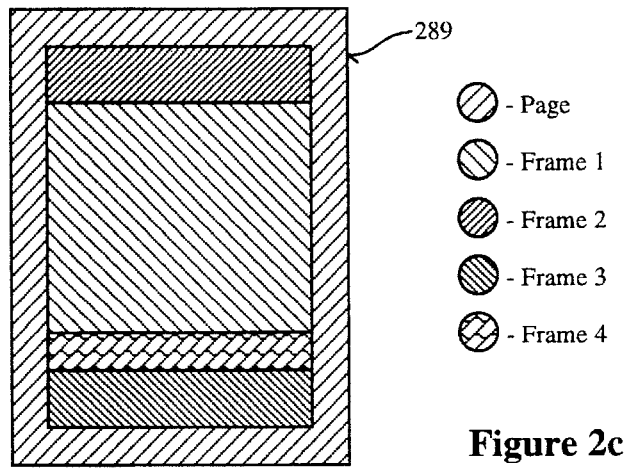
FIG. 2c shows a data structure used by XAPP's for frames used in the preferred embodiment.
Figure 2D:
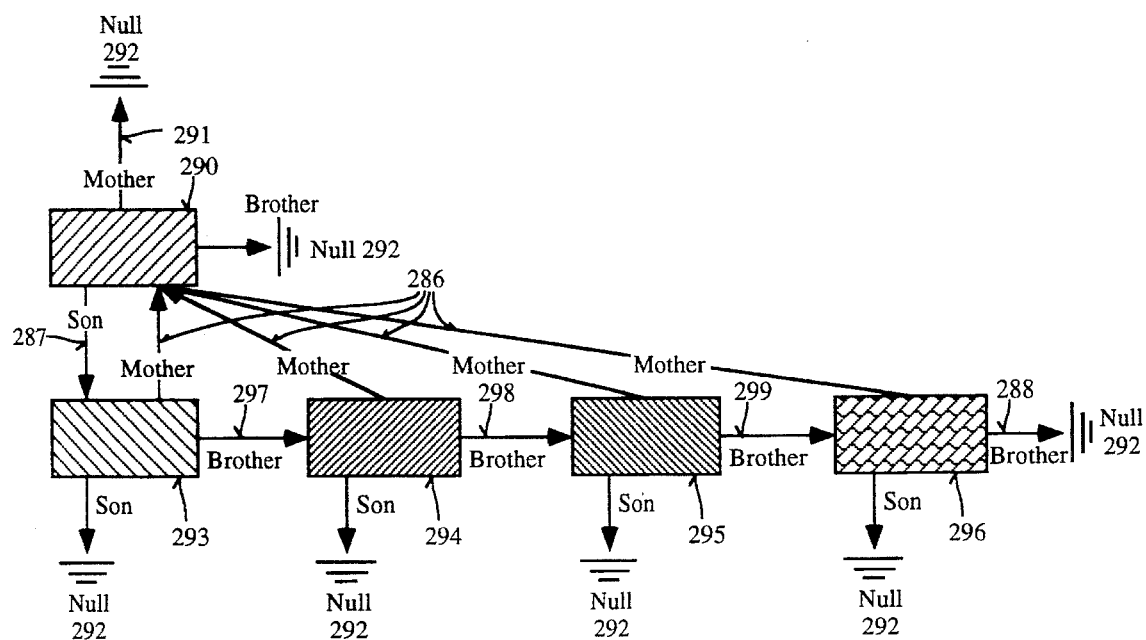

A more detailed representation of the FrameHandle data structure for frames on a particular page is discussed with reference to FIG. 2c. As shown in FIG. 2c, a particular frame such as page 290 is the mother of all the items residing in it. This is highest level object for a page and is represented by a mother pointer 291 pointing to null 292. The relationship of the page to all the son FrameHandles 293 through 296. Each of the FrameHandles 293 through 296 have corresponding brother pointers 297 through 299 and 288 which indicate other frame items on the page residing in that class. The last FrameHandle 296 points to null 292 because there are no other brother FrameHandles associated with it. Notice that the mother frame 290 has a single son pointer 287 indicating the first son object 293. However, each of the son handles 293 through 296 have corresponding mother pointers collectively known as 286 pointing to the mother frame handle 290. These various relationships are defined in more detail in Appendix I in the long ("handler") object. The item shown in FIG. 2c represents the relationships which may exist on a page, for instance, such as 289 shown in FIG. 2c.

Upon activation of a given frame residing on a page, first the page item such as 290 shown in FIG. 2c is accessed by its FrameHandle for the particular page. Then, because we know that each frame residing on a page is a child of the page, the first son pointer of 287 of mother 290 is traversed to determine whether the activation of a frame on a page is within the bounds for the area in which the cursor resided and activated. For instance, 293 is checked to determine whether it is within the bounds which the cursor had activated. If not, then the other brother items 294 through 296 are scanned to see whether any of them reside within the frame bounds indicated by the mouse activation of the area on the display. If none of the brother objects are activated, as indicated by checking their bounds values in each datum, then son objects for the brothers are traversed. Although there are no son objects shown in FIG. 2c, it will be apparent to one skilled in the art that the data structure shown in FIG. 2c may be extended to other son objects and sons of son objects in the same manner as shown in FIG. 2c. This process continues until the frame which was activated is located. Once it is located, the corresponding XAPP is called by checking the class ID of the FrameHandle which is located, and then calling the appropriate handler from the handler table 271 shown in FIG. 2b with the FrameHandle to activate the frame. Then, the XAPP handler takes over control and performs all XAPP-specific operations within the frame as indicated by the user and either inherits or returns control to the main program for other functions.

In order for the main system to recognize XAPP's which are desired to be added to the program, the program must search in certain computer directories for files are of specified types. These resources are referenced by a field in a directory description file known as the "TYPE" field. The use of type field in the Macintosh computer environment is well-known to those skilled in the art. At program initialization time, the system searches in the specified directories for all those files with descriptors of type "XTYP." This XTYP file gives the program some underlying information about the XAPP. It gives:

1. the XAPP interface version number that this XAPP supports;
2. the class ID of the XAPP. Each XAPP developed has a unique value associated with it, which should not conflict with those of other XAPP's;
3. default frame settings (for instance, whether the text will wrap within the frame, and any background and border attributes);
4. the name of the XAPP; and
5. any icons to display into the program object palette.

Figure 3:
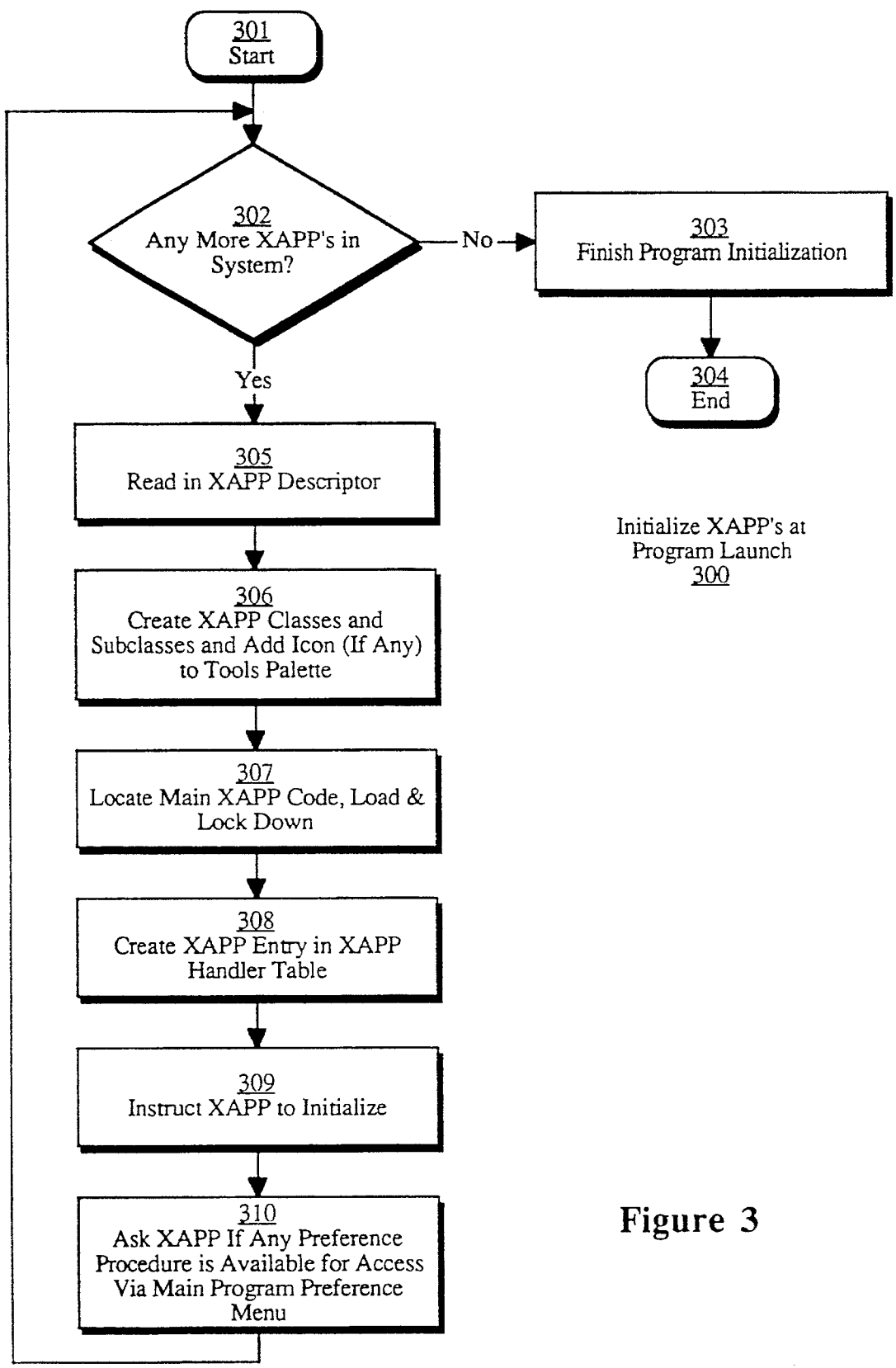
FIG. 3 shows a process for initializing added functions of computer systems at program initialization time.

The process for initializing XAPP's is described in detail with reference to FIG. 3. As shown in 300, the initialize XAPP procedure at program launch time starts at step 301. It proceeds to step 302 to determine whether any more XAPP's are required to be loaded. If not, the procedure branches to step 303 wherein the remainder of the program initialization is completed, and the process ends at step 304. If, however, more XAPP's are required to be loaded, 302 proceeds to step 305. 305 reads in the XAPP descriptor file, (which has the resource type "XTYP") determines whether all the current versions of the XAPP is correct, and identifies the class ID for this XAPP. In the preferred embodiment, the system checks the current directory in which the main program resides to see whether any files have the type "XTYP." The program will also check, in the Macintosh® brand operating system, the "System Folder" and a directory in the system folder named "Claris." At step 306, memory is allocated for the XAPP classes (and subclasses via inheritance) so that enough memory is reserved for the XAPP to perform operations. Also, the file is read to determine whether an icon exists for the XAPP, and loads the icon for use in the program tools palette. At step 307, the main XAPP executable code is located and prepared for execution. This is performed, by searching through the type attributes of files contained in specified directories of the computer system to see whether those resources have the type "XAPP." The identified directories may also contain XAPP procedures. Once the main code resource of the XAPP is found, it is locked (prevented from access or modification by other routines for the duration of program execution) and dereferenced so that it becomes the handler routine for the XAPP. The main routine has the following fore, at (the same as the handler):

| long main(frame,msg,data) | |
|---|---|
| FrameHandle | frame; |
| short | msg; |
| long | data; |

After the code is loaded by the system, and locked down, an entry in the XAPP handler table is created for the XAPP at step 308. This allows the program to call the appropriate handler for each particular frame class This allows access to the XAPP handler routine at later times for transmitting messages between the XAPP and the main program.

In addition to performing operations on a frame which are of the class type of the XAPP, there exist special messages in the system for performing specified operations on XAPP's. One example of a message which should be understood by all XAPP's in the preferred embodiment is the "InitXAPP" message which is sent to the XAPP after the code resource has been locked down. The XAPP is instructed to initialize using the "InitXAPP" message at step 309. This allows the XAPP to do any XAPP-specific initialization prior to operating for the duration of the main program's execution.

The last step for XAPP initialization is to allow, at step 310, the XAPP to create its own "preference" option on the main menu if it has a preference procedure which it uses. In other words, the main system maintains a "preference" menu to handle configuration information and other user options. The main routine queries the XAPP to see whether it should create a preference menu entry and link that entry with a specific preference procedure. Once complete, the initialization for this XAPP is complete, and process 300 proceeds to step 302 to determine whether any more XAPP's are required to be loaded and initialized. Process 300 continues to execute in the manner discussed above until there are no more XAPP's in the specified directories. It will then end at step 304 at that time. Now that initialization for the XAPP's is complete, the XAPP class is now a registered class within the main program. Therefore, for the duration of the execution of the main program, frames may be created with the class ID of the XAPP which was initialized.

The generic XAPP routine shown in Appendix V is one example of a routine which may be operated with the underlying program of the preferred embodiment. This routine may be compiled and linked by itself, as it contains the necessary external parameters which are required to provide communication with the main program. The generic XAPP set forth in Appendix V simply displays the words "Hello, MacWrite!!" inside a frame in the document. A special cursor also appears when the computer system cursor controlled by the user passes over this frame. The generic XAPP routine shown in Appendix V comprises a resource file, a source file, "GenericXAPPHandler.c," and two header files (GenericXAPPRes ID.h and GenericXAPP.h).

The generic XAPP resource file contains three resources: a color icon ("CICN"), a black and white icon ("Icon"), and a cursor ("CRSR"). The XAPP must have an Icon resource with the same ID as the class ID. Optionally, if 121 is a color monitor, the XAPP may have a "CICN" resource with the same ID. If 121 is a color monitor, the color icon will be used instead of "Icon" for display. The class ID for the routine "GenericXAPP.c" must be a unique number between 50 and 32,767. Class ID's less than 50 are reserved by the preferred embodiment for system functions.

The GenericXAPP handler routine ("main") provides communication with the main program. It always takes three parameters: a "frame," a "message," and "data." One skilled in the art will notice that after the XAPP setup code is executed, the XAPP checks to see if the message passed in is an "XAPP" message. Messages have values associated with them and XAPP messages have values less than zero. If it is an XAPP message, it is channeled through a "Switch" statement. There are several XAPP messages provided by the preferred embodiment, but the only one that requires a response from the XAPP is the "InitXAPP" message. The XAPP should return "TRUE" from the "InitXAPP" message to denote that initialization has succeeded. If "FALSE" is returned, the XAPP file is closed, and the XAPP is not used for the duration of program execution. The "CloseXAPP" message is sent when the application terminates. The XAPP should do any necessary cleanup when it receives this message (releasing resources and memory), and the main program performs the close routine itself. If the message passed is not an XAPP message, as determined by being less zero, then it performs action according to the message which is transmitted to the XAPP procedure.

Some examples of messages passed from the main program to the XAPP include:

InitMsg—This message is sent when a new frame is being created. All frame classes must inherit this message before doing anything else, because the frame is created by the root (Frame) class. The new frame is returned by inheritance. Once we have the new frame, we can override any of the frame defaults. GenericXAPP changes the DoFrameOutline() field to TRUE. This tells MacWrite Pro to draw a guide around the frame when page guides are turned on. DoFrameOutline() is off by default.

KeyMsg—This message is sent when a frame is active and a key on an input device level as 122 has been depressed by the user. The data field contains a pointer to the corresponding event record. The default behavior for this message is for the computer to "beep." GenericXAPP finds the beep annoying, and therefore intercepts the message and just returns to the main program.

MouseMsg—This message is sent when the mouse has been clicked in a frame by the user. The data field contains a pointer to the corresponding event record. The default behavior for this message is to "beep." The GenericXAPP program again finds the beep annoying, and again intercepts the message and just returns to the main program.

CursorMsg—This message is sent when the cursor is over a frame. The data field contains a pointer to the corresponding event record. The default behavior for this message is to set the cursor to an arrow. The GenericXAPP routine has its own cursor, and sets it appropriately.

DrawContentsMsg—This message is sent when a frame needs to be updated. By default, nothing is drawn in the frame. This is where GeneficXAPP draws the text "Hello, MacWrite!"

DisposeMsg—This message is sent when a frame is about to be discarded. The DataXAPP needn't intercept this message. However, if the data to be disposed included a handle to other data, that handle would have to be disposed of here. For example:

```
case DisposeMsg:
/*
**    data:              None.
**    return value:      None.
*/
    /* Dispose of the frame here. */
    DisposHandle(DataXAPPHandle(frame));
    returnvalue - Inherit(frame,msg,data)
    break;
```

CopyMsg—This message is sent when a frame has been duplicated. The frame parameter contains a frame that has just been duplicated via a routine "HandToHand()." The DataXAPP needn't intercept this message. However, if our data included a handle to other data, that handle would have to be duplicated.

```
case CopyMsg:
{
/*
**    data:              CopyMsgData.
**    return value:      Error Code.
*/
    Handle    temp;
    returnvalue - Inherit(frame,msg,data)
    /* Duplicate our frame data here. */
    temp - DataXAPPHandle(frame);
    if (XAPPHandToHand(&temp))
    {
                        returnvalue - XAPPMemErr;
                        break;
    }
    DataXAPPHandle(frame) - temp;
    break;
}
```

GetDiskDataSizeMsg—This message is sent when the main program needs to know the size of a frame on a disk or other non-volatile medium. This message is first inherited, and then the size of the data on disk is added to the return value. If the XAPP writes data to the non-volatile medium 107, then the XAPP must respond to this message.

LoadMsg—This message is sent when a frame is being loaded from a non-volatile medium such as 107. Inheriting this message creates a new frame and loads in all of the parent data. Upon returning, the frame must be sized properly (as in "InitMsg"), and the XAPP's data must be read in. An XAPP-provided routine, "XAPPReadFromDisk()," is called with the proper size and buffer parameters. "XAPPReadFromDisk0" can be repeatedly called as many times as necessary in order to load all of the data from mass storage 107. The XAPP need not be concerned with how or from where the data is actually being loaded.

SaveMsg—This message is sent when a frame needs to be saved to mass storage 107. This message is sent twice for each save. The first time the message is sent, a "false" save is occurring. This means that nothing actually gets written to 107. This is done in order to determine what the size of the file will be on 107. The common global "Storagecalc" denotes whether or not a "false" save is occurring. Inheriting the "SaveMsg" message saves all of the parent data to disk. Upon returning, the XAPP's data must be saved. An XAPP-provided routine, "XAPPWriteToDisk()," is called with the proper size and buffer parameters. These are defined in "DataXAPP.h" in Appendix VI. "XAPPWriteToDisk0" can be repeatedly called as many times as necessary in order to save all of the XAPP's data to disk. The XAPP need not be concerned with how or to where the data is actually being saved. Saving and loading data must be in the same order!!

DeactivateFrameObjMsg/DeactivateMsg—"DeactivateFrameObjMsg" message is sent when a frame is being deselected as a frame. The DeactivateMsg message is sent when a frame's contents are being deselected. It is at this point that the MenuXAPP removes its menu from the menu bar. An "if()" statement is only there to prevent flashing when clicking from one MenuXAPP frame to another.

UpdateMenusMsg—This message is sent when the menus need to be updated. This message must be inherited by all intermediate classes. The MenuXAPP puts a check mark next to the appropriate menu item in its menu.

DoCommandMsg—This message is sent when the application needs to send a command to a frame. The MenuXAPP intercepts this message because it notifies the XAPP when one of its menu items has been chosen.

Of course, the foregoing messages are set forth for illustration purposes only, and there are many such messages which provide communication between the XAPP programs and the main program. Many other messages are contemplated within the spirit and scope of the present invention, for providing various functions between XAPP's and the main program.

Figure 4:
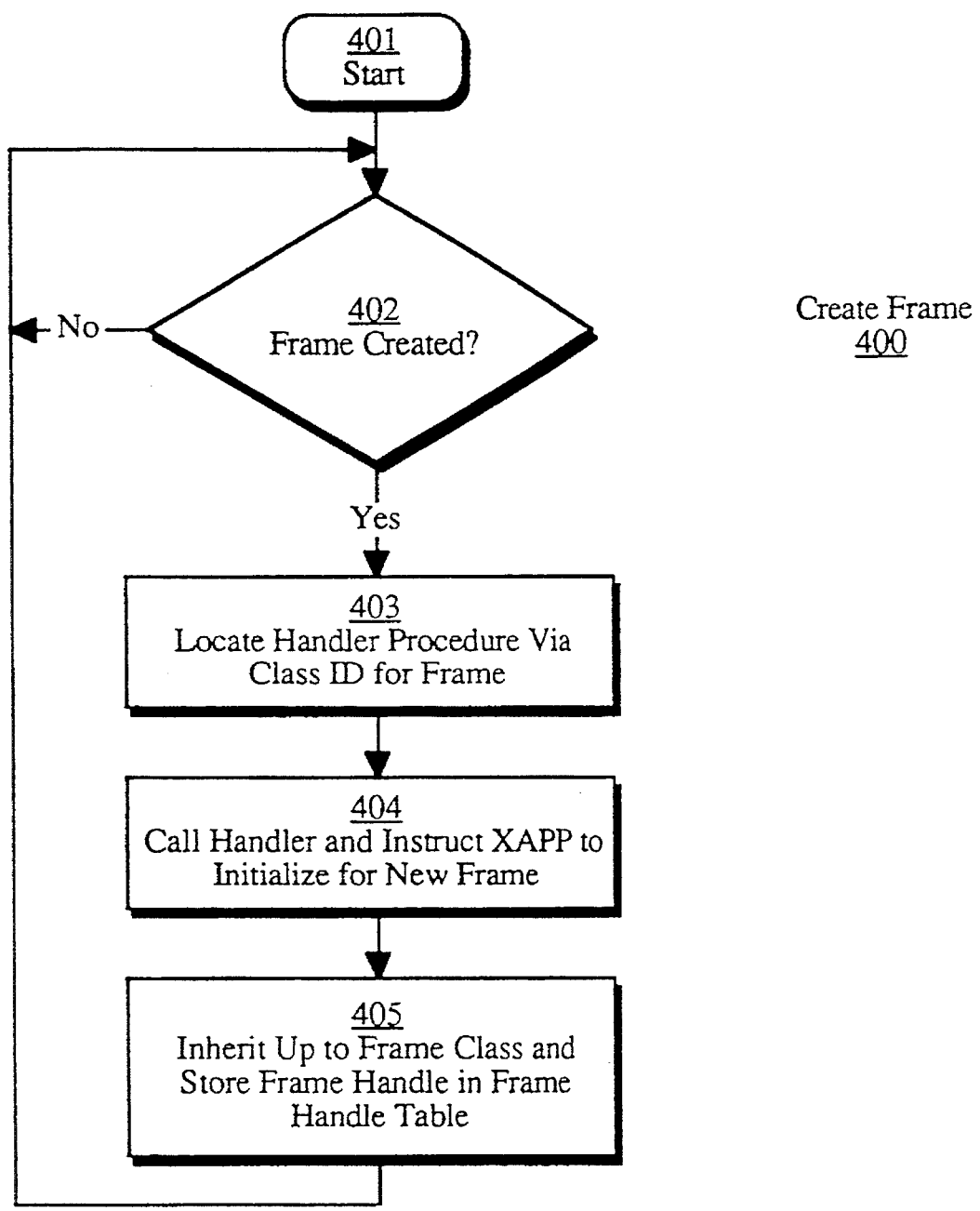
FIG. 4 shows a method for creating a "frame" in the preferred embodiment.
Figure 5:
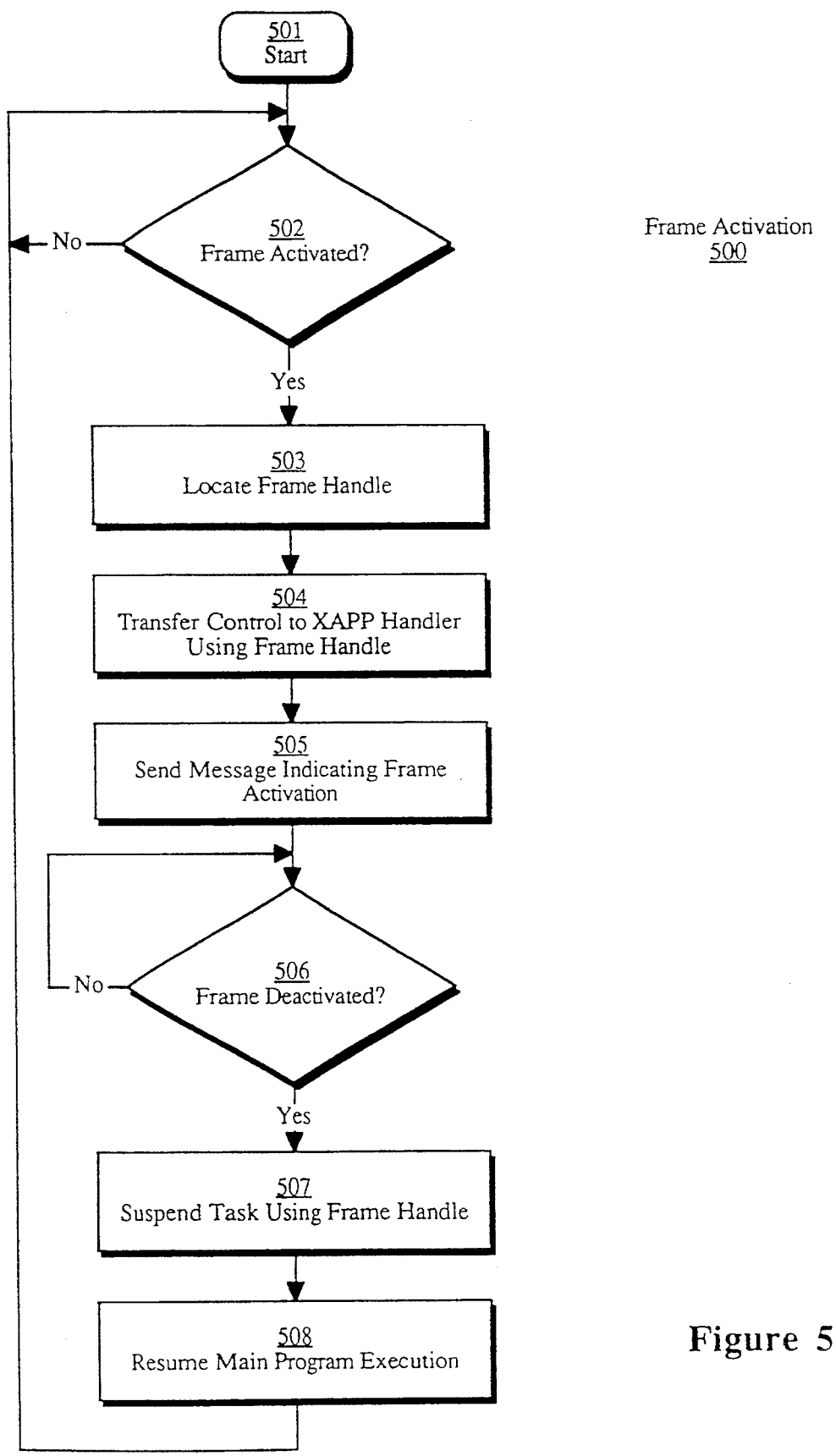
FIG. 5 shows a "frame" activation process as used by the preferred embodiment.

Creation of frames is performed in the manner as set forth in FIG. 4. As shown in FIG. 4, process 400 starts by determining at step 402 whether a frame has been requested to be created or not. This is determined, by selecting either the appropriate menu item in a pull-down menu or selecting an appropriate icon on the main program screen (these will be discussed in more detail below). If no frame is requested to be created, then process 400 continues executing 402 until such time as a frame create request has been made. If a frame is requested to be created, then the appropriate handler for the frame class is located in the handler table such as 271 shown in FIG. 2b. Once the handler is located, at step 404, a new FrameHandle is created which has the type of the frame class specified via "InitMsg." Once this has been performed, and memory has been allocated for all the appropriate data items via inheritance, the XAPP is called at step 405 to initialize the frame with initial values. Also, the appropriate FrameHandle entry is made in a data structure for the page, similar to that shown in FIG. 2c, for the class of frame created. Once performed, process 400 loops back to step 402 to see whether any other frames are created. The frame may then be referenced by its FrameHandle. When activation of the frame is later performed (as shown in FIG. 5 to be discussed below), messages may be sent back and forth to the XAPP using the frame pointer for updating various information. The activation of the frame will now be discussed with reference to FIG. 5.

As shown in FIG. 5, process 500 determines at step 502 whether a given frame has been activated or not. This is done by scanning the FrameHandles data structure (such as shown in FIG. 2c) to determine which frame is within the area activated. If no frame has not been activated, then process 500 loops at step 502 until such time as a frame is activated. If a frame is activated, then the appropriate FrameHandle which identifies the frame in the main program is located at step 503. Once located, control is transferred to the particular XAPP handler at step 504 using the handler procedure that this FrameHandle points to. Then, at step 505, a "Frame Activate" message is sent to the frame handler for the XAPP at step 505 to indicate frame activation. Control is then assumed by the XAPP handler, and via inheritance, control is passed back to the main program for certain functions, but control is retained for XAPP-specific functions. At step 506, it is determined repetitively while the handler is executing whether the frame has become deactivated or not. As long as the frame is not deactivated as determined at step 506, the handler maintains control for XAPP-specific functions. Once the frame is deactivated (which is determined by activation of another frame or a return to the main program), the handler is suspended at step 507 using the FrameHandle, and main program execution is resumed at step 508. It is determined again at step 502 whether another frame has been activated or not. As discussed above, during XAPP handler execution, messages are passed between the main program and the frame handler using messages, some of which are set forth above. These allow various functions to be performed by the XAPP which are supported by the main program. This also allows the XAPP to perform functions which are not be available to the underlying main program. Therefore, XAPP-specific functions are not tied to the capabilities of the main program. Routines not envisioned by the creators of the main program may be created by end-users to perform user-defined functions within frames. It can be appreciated by one skilled in the an that the present invention has utility exceeding that used by simple user-defined macro programs. Further, because only the XAPP must be built and debugged, development of XAPP's is substantially cheaper and is simpler than the development required for an entire systems. Also, functionality of the main program is preserved.

Some specific examples of the capabilities of the preferred embodiment will now be discussed. These include, among others, specific examples of XAPP programs, and user interface features provided to interface with XAPP's used by the preferred embodiment.

Figure 6A:
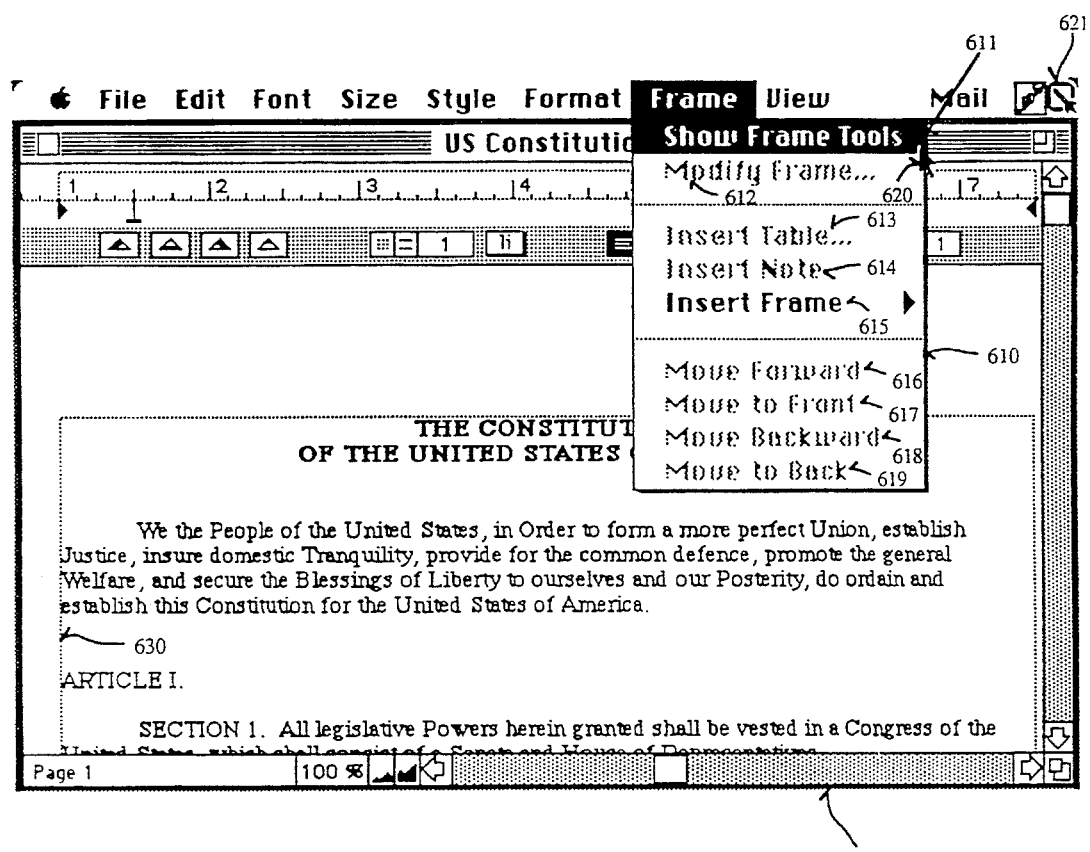
FIGS. 6a and 6b show the computer system of the preferred embodiment operating without any user-added functions.
Figure 7:
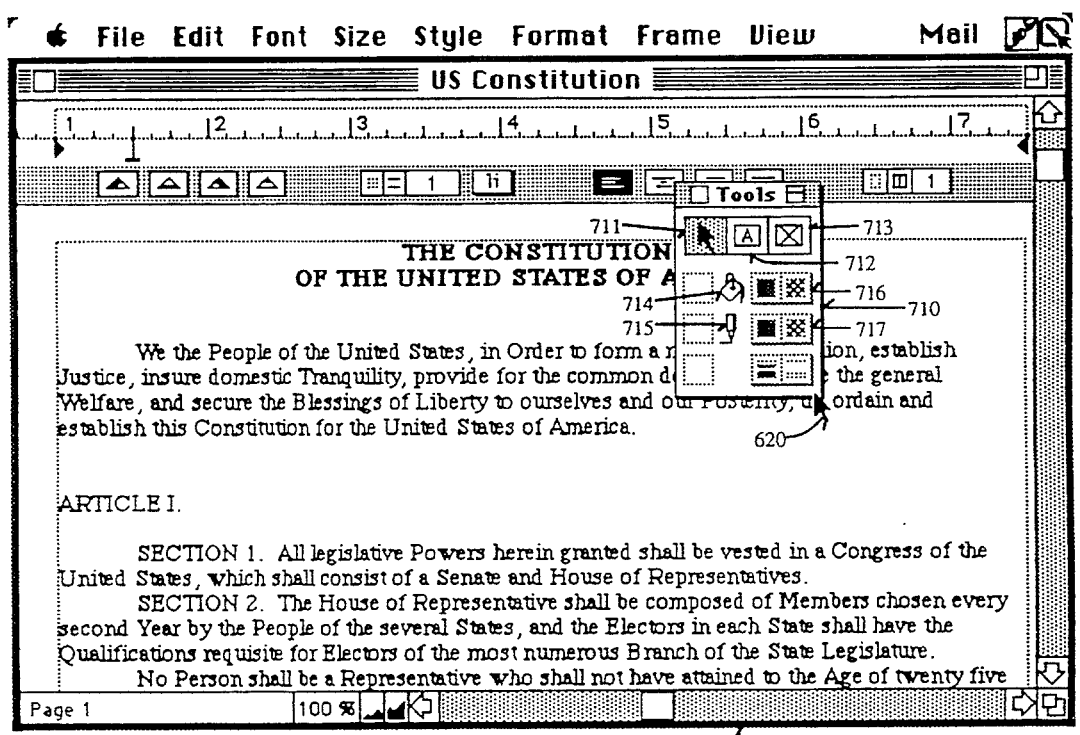
FIG. 7 shows the frame tools menu of the preferred embodiment without any user added functions.

600 in FIG. 6a shows a typical session using the preferred embodiment. 600 shows the text processing system of the preferred embodiment operating on a document entitled "US Constitution." The document is represented on the screen enclosed by a border 630 (which is of the base class "PageBaseClass" set forth in Appendix II), into which various frames may be created. Screen 600 shows a pull-down menu 610 which is accessible by moving cursor 620 to the menu portion of the screen 621 and depressing a selection key on a cursor control device 123 as shown in FIG. 1. This causes the screen, using the Macintosh® brand Finder operating system environment, to be activated by dragging cursor 620 (moving it while the selection key continues to be depressed) and highlighting a command on pull-down menu 610. As is shown in FIG. 6a, only "Show Frame Tools" selection 611 and "Insert Frame Tool" selection 615 are accessible as indicated by the commands being displayed in boldfaced type. The remaining commands: "Modify Frame" 612, "Insert Table" 613, "Insert Note" 614, "Move Forward" 616, "Move to Front" 617, "Move Backward" 618, and "Move to Back" 619, are "ghosted out" indicating that they are not available for selection at this time. "Ghosting out" a selection is represented by showing the selection in pixels with less than full-intensity of the display to indicate that it is not available for selection. The "Frame Tools" selection 611 and the "Insert Frame" selection 615 are shown in boldface indicating that they are currently accessible. The items ghosted out are not available for selection because either the XAPP's which control those functions are not currently loaded, or a frame has not been activated for modification, such as for the selection "Modify Frame" 612. "Show Frame Tools" selection 611 is highlighted in this example as shown by its letters being represented in reverse video (white letters on a black background). Therefore, when this selection is made as shown in FIG. 6a, the "Frame tools" menu will be displayed after the selection button is released. The frame tools menu is shown as 710 on screen 700 of FIG. 7.

In the example shown in screen 600 of FIG. 6a, certain selections were "ghosted out." These may be for XAPP programs for which the system found files of type "XTYP," however, no corresponding files of type "XAPP" were found by the main program in the required directories at launch time. Therefore, initialization for XAPP's was never performed as shown in process 300 of FIG. 3. As is shown in screen 650 of FIG. 6b, a directory such as the folder "MacWrite Pro" 660 in which the program "MacWrite Pro" resides (as indicated by the presence of icon 651), there are no other files present except for the data files represented by icons 652, 653, and 654. When "Frame tools" menu 710 is activated by selecting 611 such as shown in screen 600 of FIG. 6, then frame tools menu 710 will be displayed as is shown in screen 700 of FIG. 7. Note that the tools menu contains three icons: 711, 712, and 713. The 711 icon has been selected as shown in screen 700 as indicated by its "shaded" state. This icon is selected using cursor 620 to activate certain functions in the preferred embodiment. Icon 712 is used for creating text frames, and icon 713 is used for creating picture frames. Text frames have the "LinkBaseClass" (see Appendix III), and picture frames have a "FrameBaseClass" (see Appendix I). The text frame create icon 712, and the picture frame create icon 713 are used for creating frames having the respective picture base classes. Additionally, icons 714 and 715 are labels used to indicate changes which may be made to the color and/or pattern of the border and background of a frame. As is shown on screen 700 in FIG. 7, the associated pattern selection icons 716 and 717 on the tools menu have been "ghosted out" because no frame has been selected and therefore modification of attributes of a frame is not currently possible. The use of icons 714 and 715 will be discussed in more detail below.

Figure 8A:
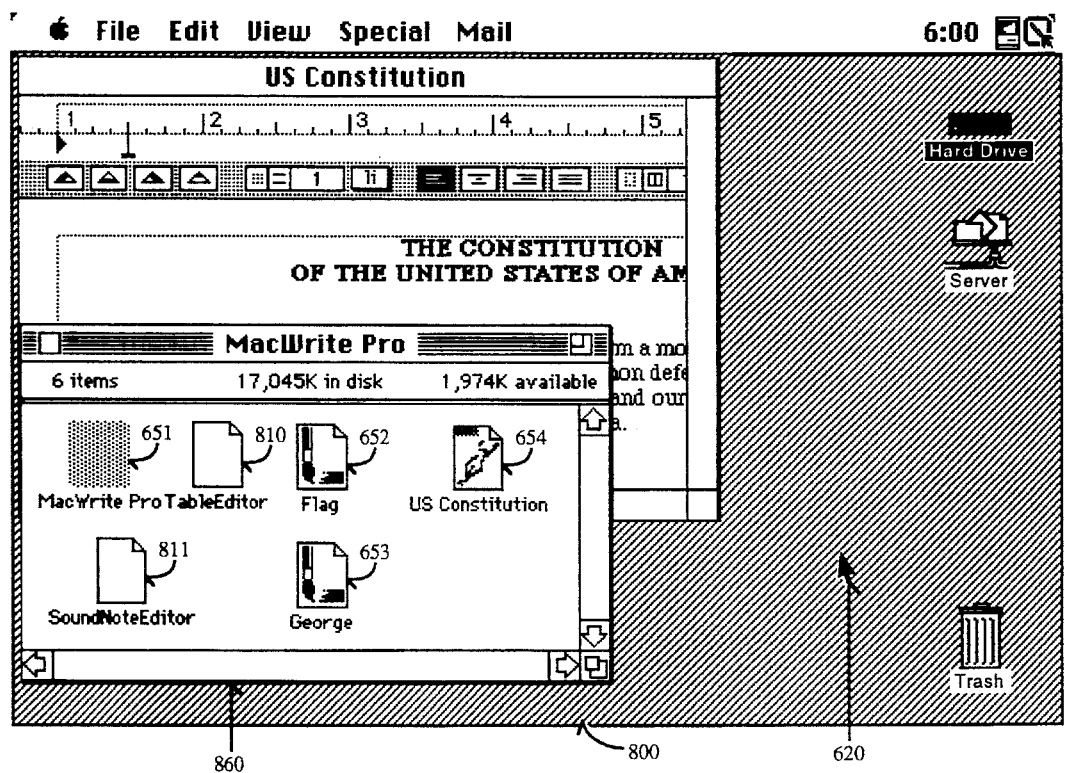
FIGS. 8a and 8b show the method and the results of adding user functions.
Figure 8B:
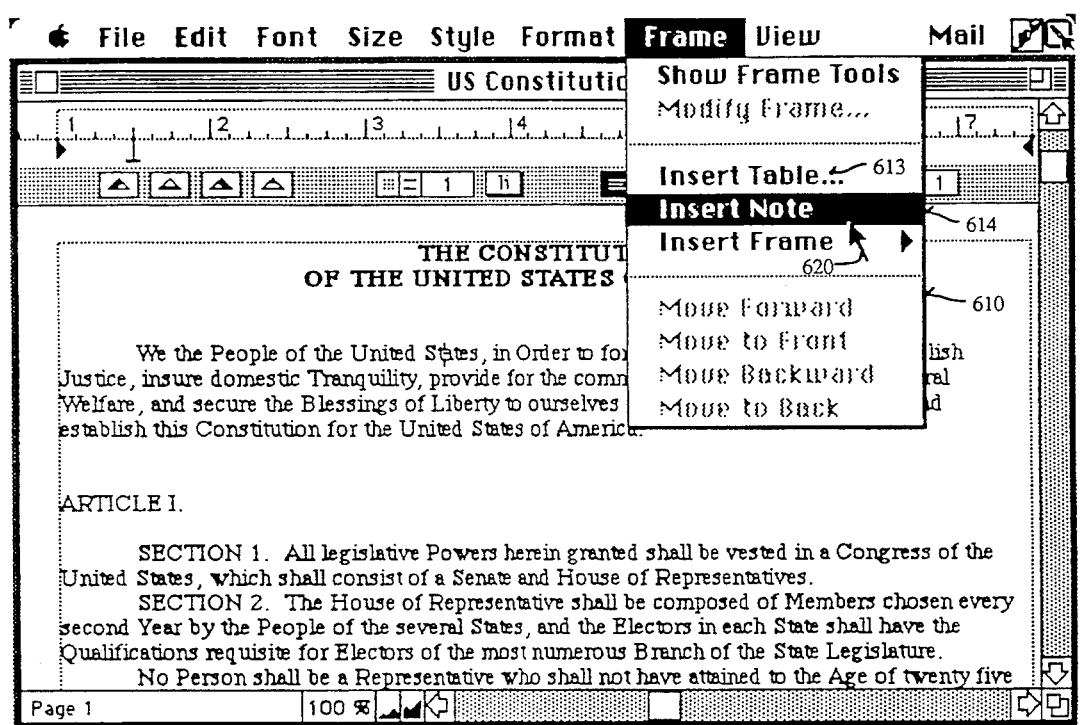
Figure 9:
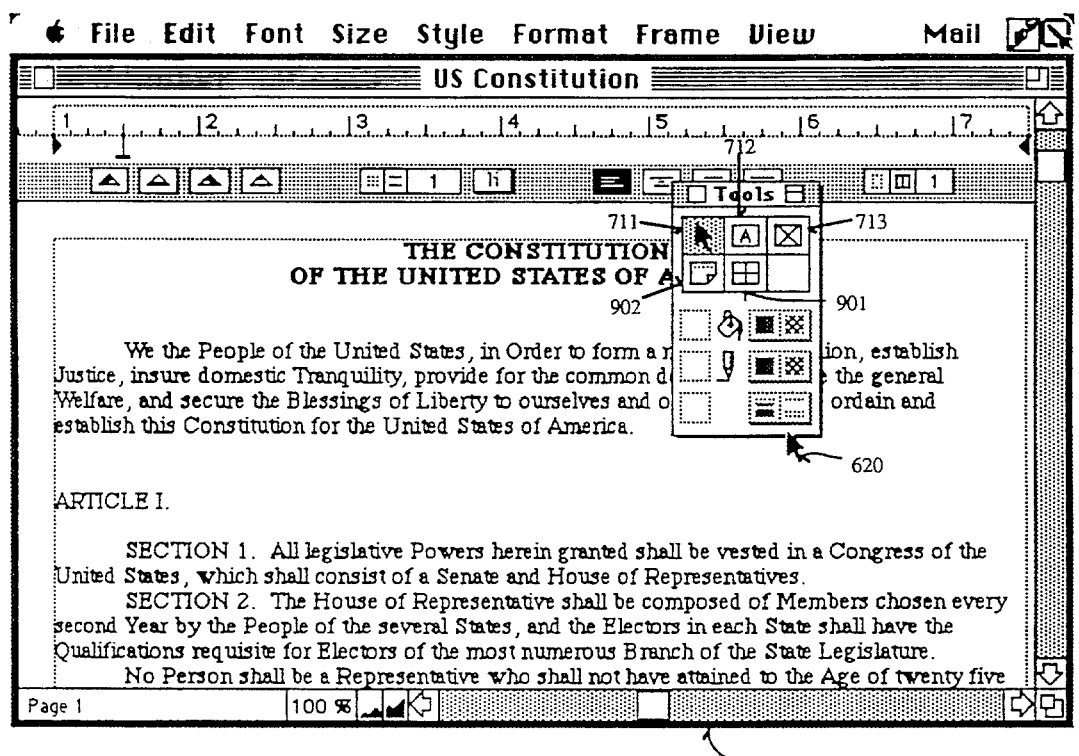
FIG. 9 shows a tools menu with user-added functions.

Screen 800 in FIG. 8a shows the directory "MacWrite Pro" 660 with two additional file icons added into it: TableEditor 810; and SoundNoteEditor 811. These are XAPP's which are loaded by MacWrite Pro at program launch time. They have been programmed to include the class required for their data types and inherit the base classes for frames and intermediate classes as set forth in "GenericXAPP." FIG. 8b shows the results of launching the main program with the two file icons 810 and 811, indicating the presence of the program files themselves, in directory 660 shown in screen 800. As a result, pull-down menu 610 in screen 850 shown in FIG. 8b, now contains the "Insert Table" selection 613 and the "Insert Note" selection 614 in boldface. This indicates that those two functions are now available for selection by the user because they have been loaded. Frames may be created which are controlled by these XAPP's. In addition, as shown in screen 900 of FIG. 9, two additional icons 901 and 902 now reside in the frame tools menu. These two items, "Insert Table" icon 901, and "Insert Note" icon 902 are now available for creation as new frame classes within the main program of the preferred embodiment. If icon 902 is selected, then a frame is created in a manner as discussed with reference to FIG. 4 above, into which text may be inserted. Before proceeding to a discussion of the additional features provided by XAPP's for notes and tables a discussion of text and picture frames is in order.

Figure 10A:
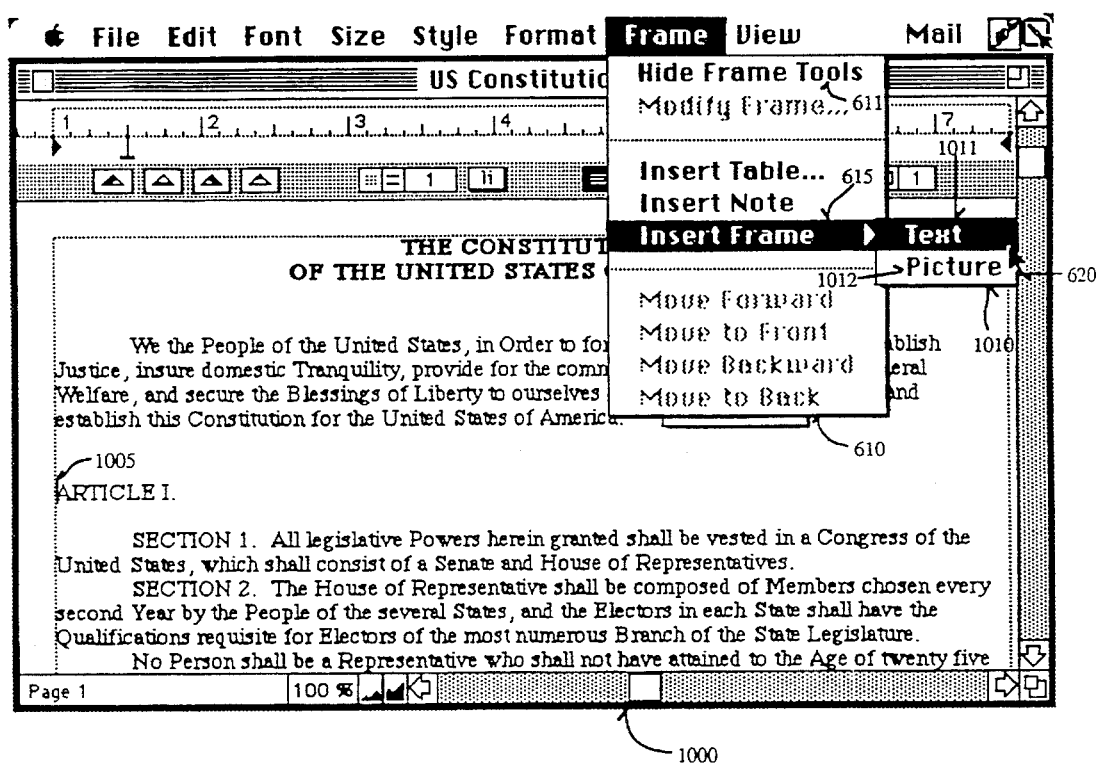
FIGS. 10a through 10c show a method for inserting a "frame" containing text in the preferred embodiment.
Figure 10B:
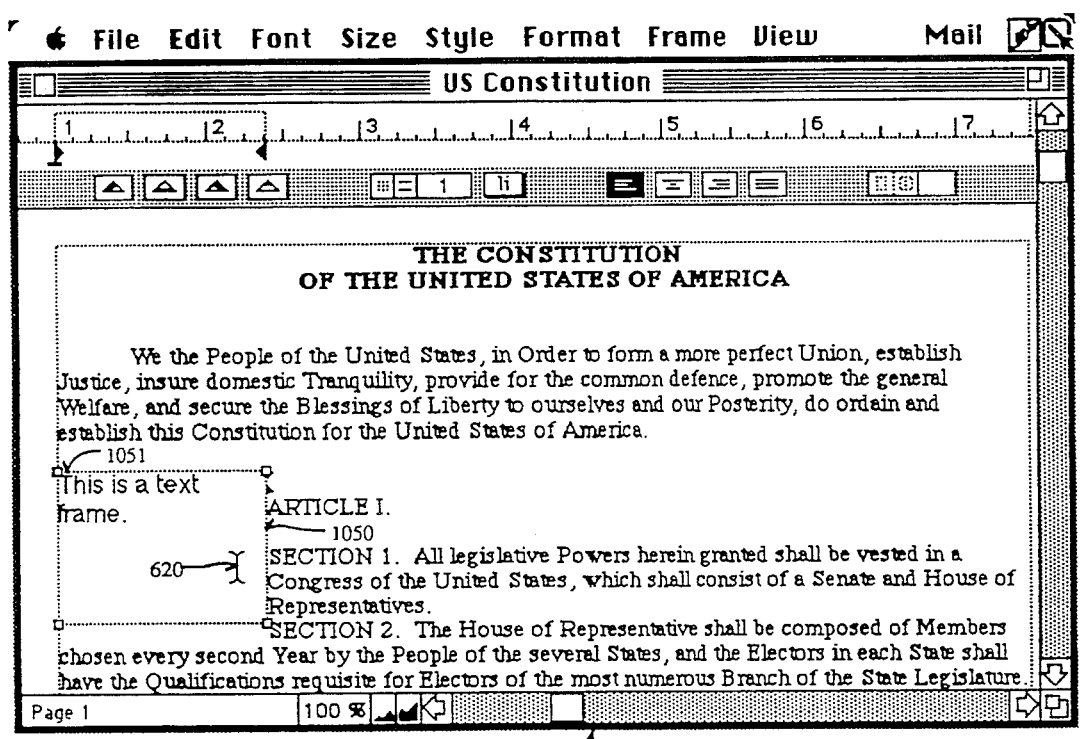

As shown in screen 10()0 of FIG. 10a, a text frame may be inserted by selecting item 615 on pull-down menu 610. When 615 is selected, submenu 1010 appears. Then, a selection such as 1011 "Text" may be selected by depressing cursor 620 in order to create a text frame. Prior to selecting "Insert Text Frame" option 1011, the user must place the cursor at the place in the document where he wishes the new text frame to reside, such as 1005. Once 1011 is selected, the screen will change to appears as shown in screen 1040 of FIG. 10b. 1040 of FIG. 10b now has the text frame 1050 created, into which text may be entered. As shown in FIG. 10b, the text "This is a text frame" 1051 may be typed into text frame 1050 after frame creation by placing the cursor 620 within the text frame and depressing the selection device. This allows the user to type in text using an input device such as 122 shown in FIG. 1, or similar alphanumeric input device. Notice also that cursor 620 changes to a vertical bar as shown in screen 1040 of FIG. 10b, when it is placed in an area containing, or which should contain text.

Figure 10C:
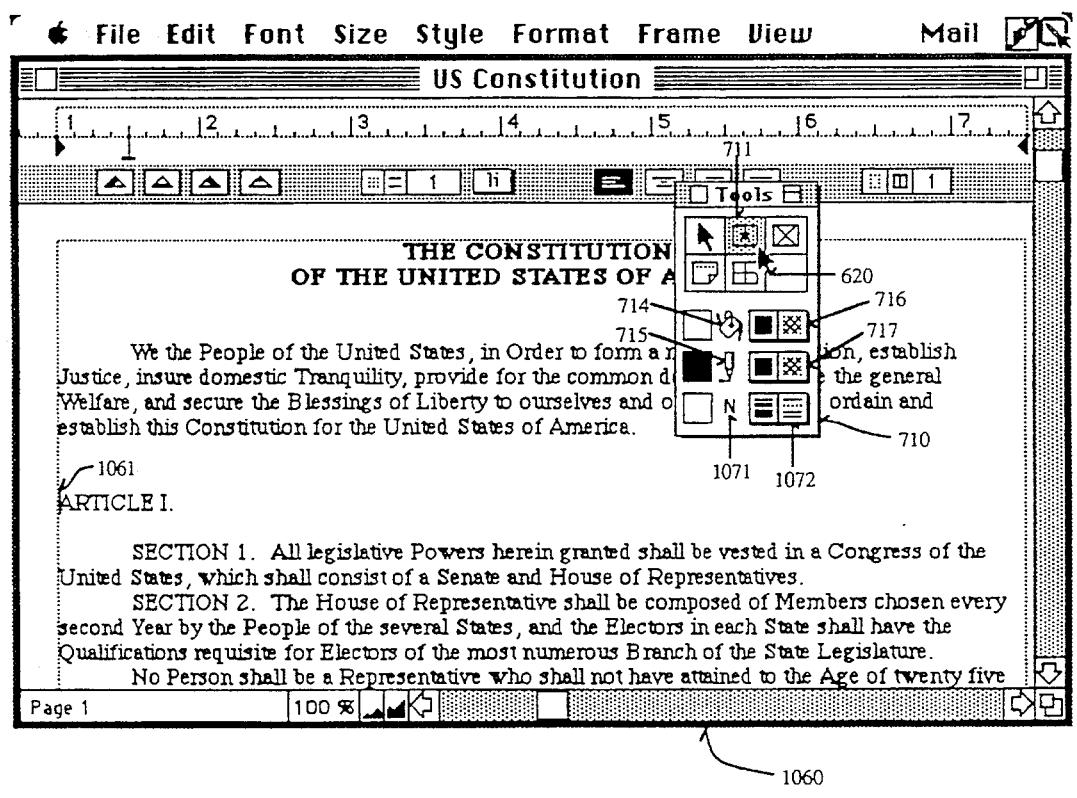

A text frame may also be inserted by selecting icon 711 in tools menu 710. This is graphically represented on screen 1060 of FIG. 10c. Again, cursor 620 must be placed by the user in an appropriate place in the document such as 1061 shown in screen 1060. Then the user selects icon 711 in tools menu 710 using cursor 620. The end result will be the same as that shown in screen 1040 of FIG. 10b. Now, the user may create text frames wherever he desires, according to the location of cursor 620. In addition, when text icon 711 is selected, it is shaded as shown in screen 1060. As an additional feature, the remaining icons 716 and 717 on tools menu 710 are now "unghosted" to indicate their availability for selection. These features allow the user to change the patterns and/or colors of the background and border regions of the frame. In addition, an additional icon 1072 is selectable wherein the user may choose the width of the border of the created frame. Width and line style selection is chosen in the same manner as for tool icons 714, 715, 716, and 717 and is discussed below.

Figure 11A:
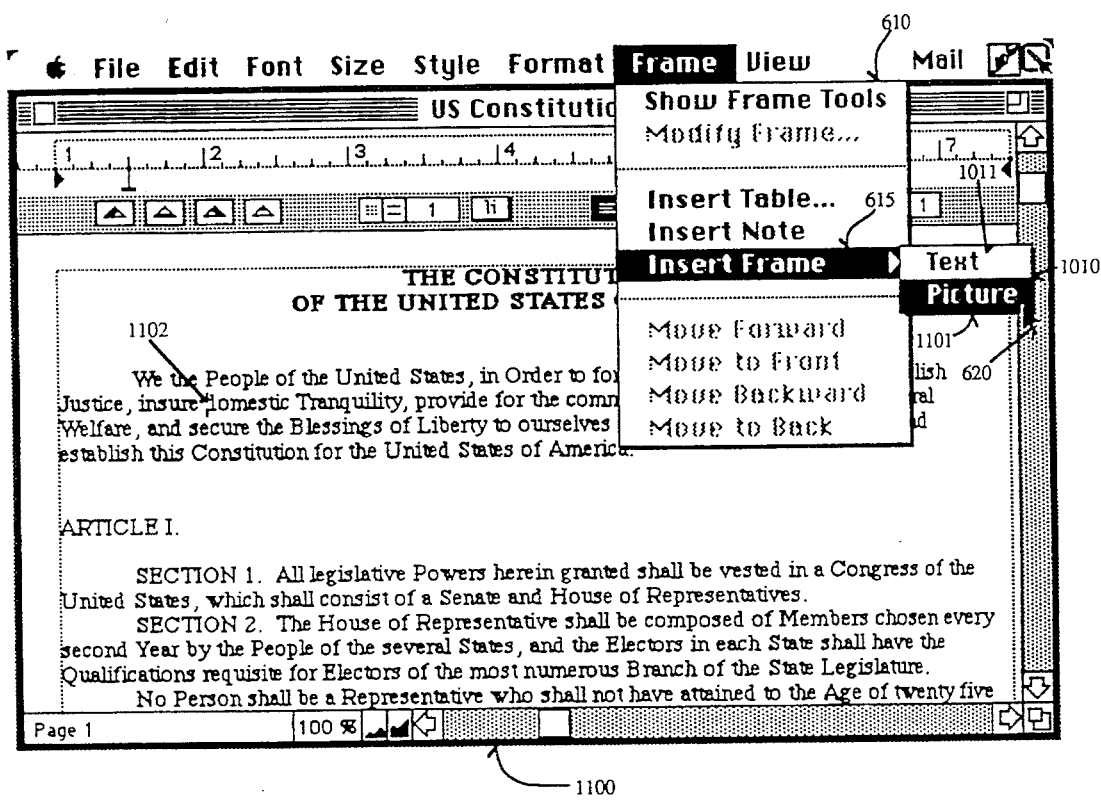
FIGS. 11a through 11h show a method for inserting a picture in a frame of a document and modifying various attributes of the frame.
Figure 11B:
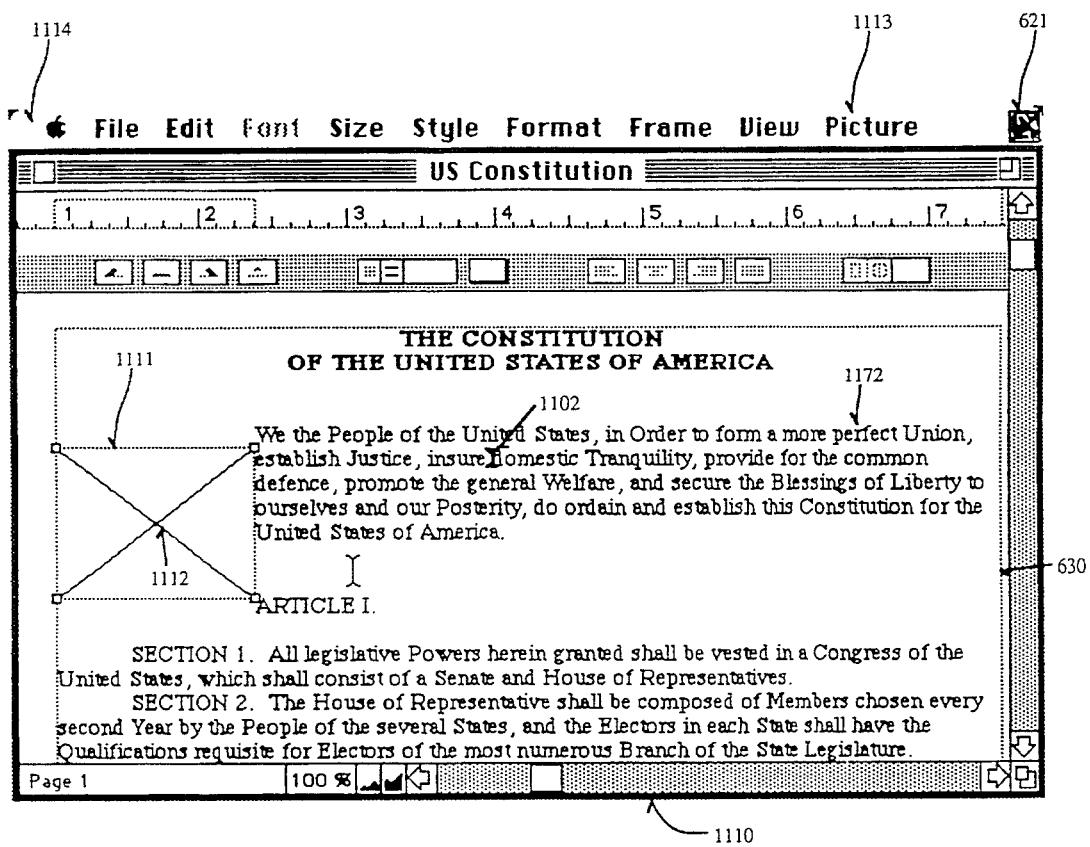
Figure 11C:
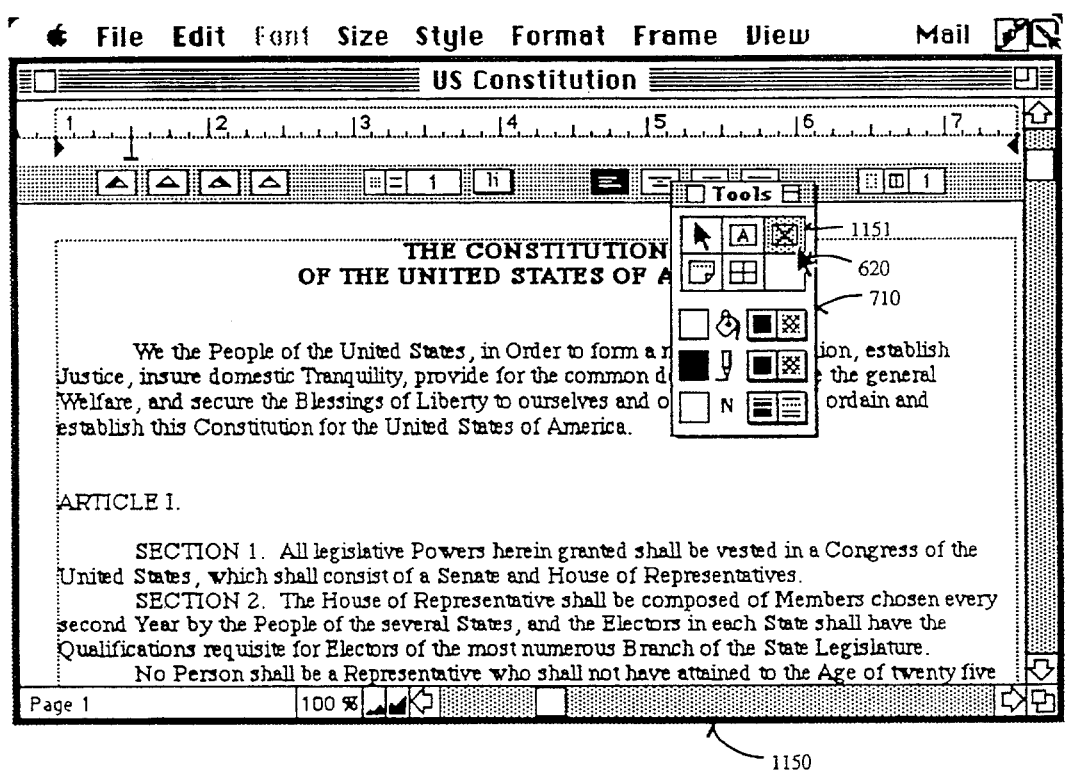

Screen 1100 on FIG. 11a shows one method for inserting a picture frame in the preferred embodiment. As shown in FIG. 11a, picture option 1101 may be selected under submenu 1010 using cursor 620. This allows a picture frame to be inserted at the position of vertical bar 1102, the frame insert position. The results of the "Insert Picture Frame" selection 1101 is shown in screen 1110 in FIG. 11b. As shown in FIG. 11b, a frame 1111 has now been created on screen 1110, which corresponds with position 1102 in document page 630. A picture frame without any data contained in it is indicated in the preferred embodiment by a large "X" 1112 as is shown in frame 1111, shown on screen 1110 in FIG. 11b. Once a picture frame is created, the contextual menu item "Picture" 1113 becomes available on menu bar 621 of screen 1110. This is known as a "contextual" menu because it only becomes active on the activation of a frame with the class D equal to that of a loaded XAPP. The menu selection 1113 is controlled by the underlying XAPP. As is shown in screen 1150 of FIG. 11c, a picture frame 1111 may also be created by selecting picture icon 1151 in frame tools menu 710.

Figure 6B:
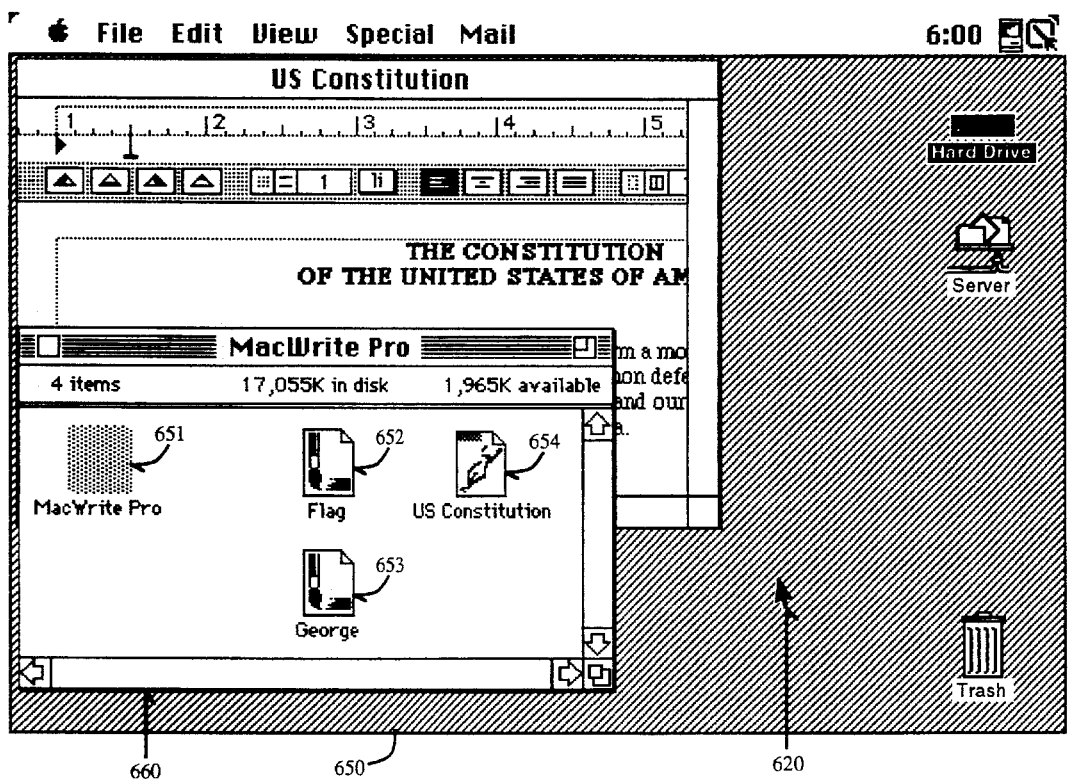
Figure 11D:
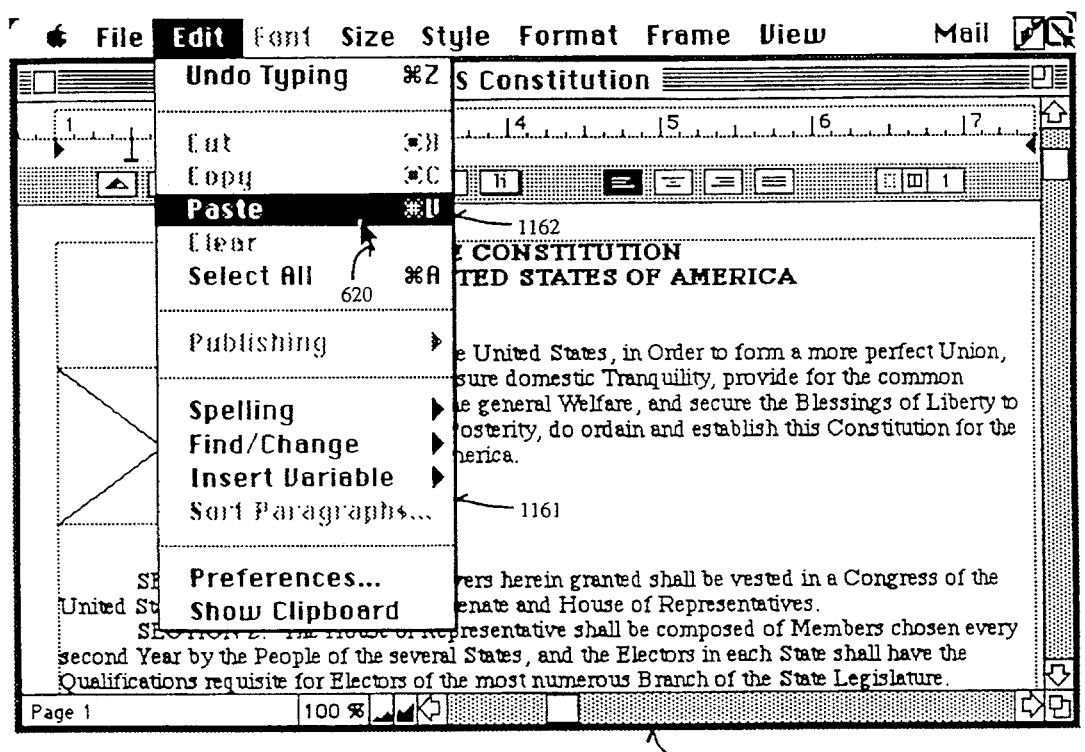
Figure 11E:
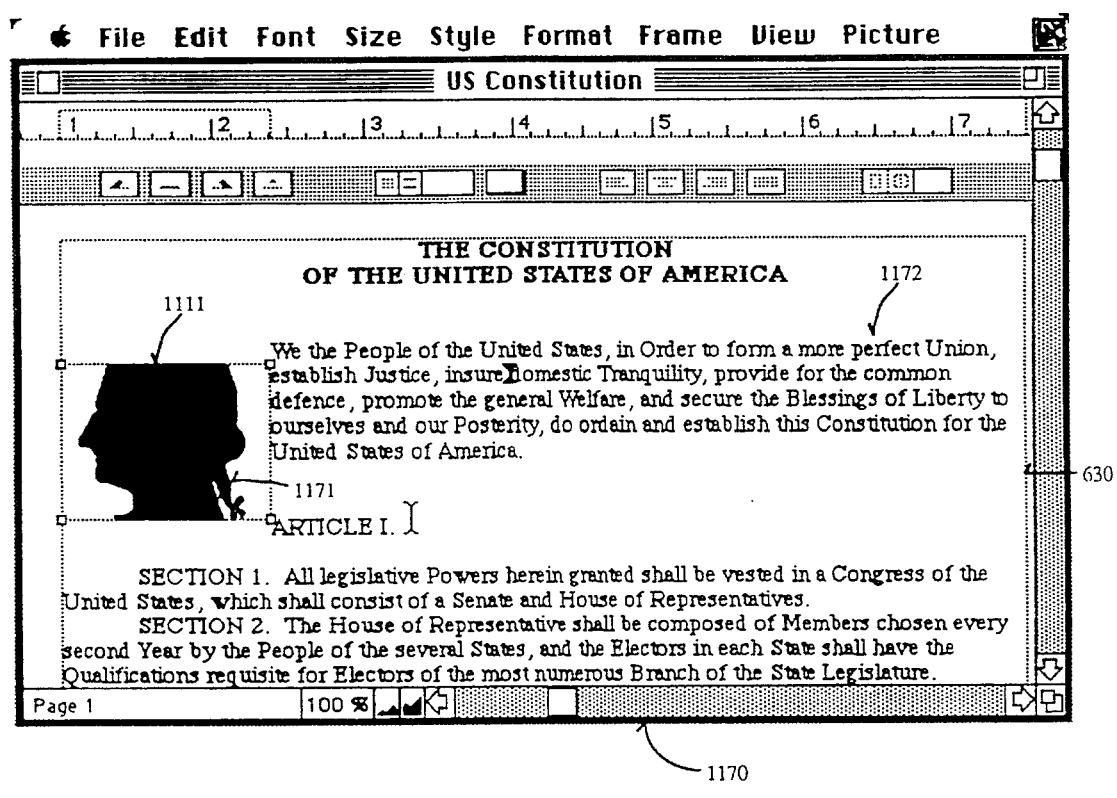

Once a picture frame has been created, an image may be inserted into the selected frame using the "Paste" option 1162 of the edit pull-down menu 1161 shown in screen 1160 of FIG. 11d. A "paste" operation inserts any picture data (text data cannot be inserted into a picture frame such as 1111) contained in a "clip" buffer or "clipboard" in the Macintosh® brand Finder operating system. A clipboard is a temporary area used for storing data such as text or images. In this case, the image "George," which was in the directory "MacWrite Pro" 660 as indicated by icon 653 in FIG. 6b is contained in the clipboard. Results of this "paste" operation is shown in screen 1170 of FIG. 11e. Now, picture frame 1111 contains image 1171 which was contained in the clipboard. Note that the image is left-justified and text 1172 contained within page 630 now "wraps around" picture frame 1111. In other words, text 1172 is reformatted such as not to be obscured by image frame 1111. Various formatting options for frames may be modified and will now be discussed.

Figure 11F:
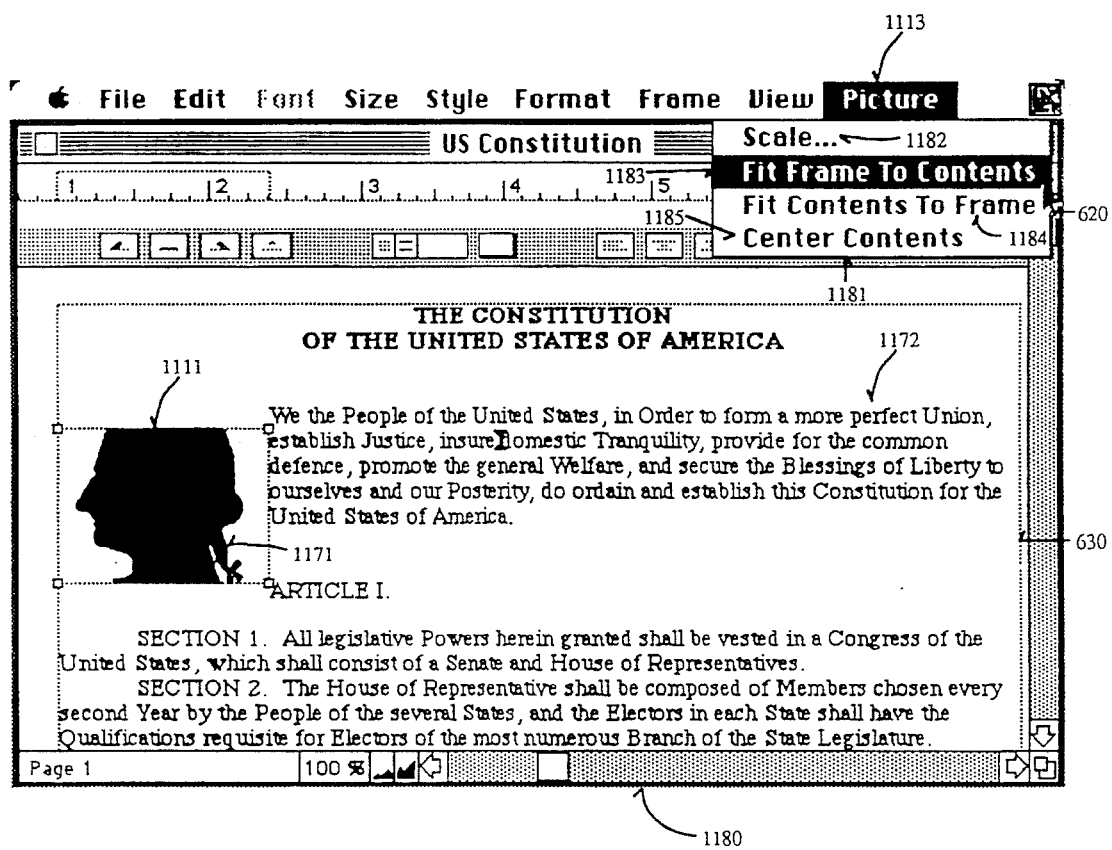
Figure 11G:
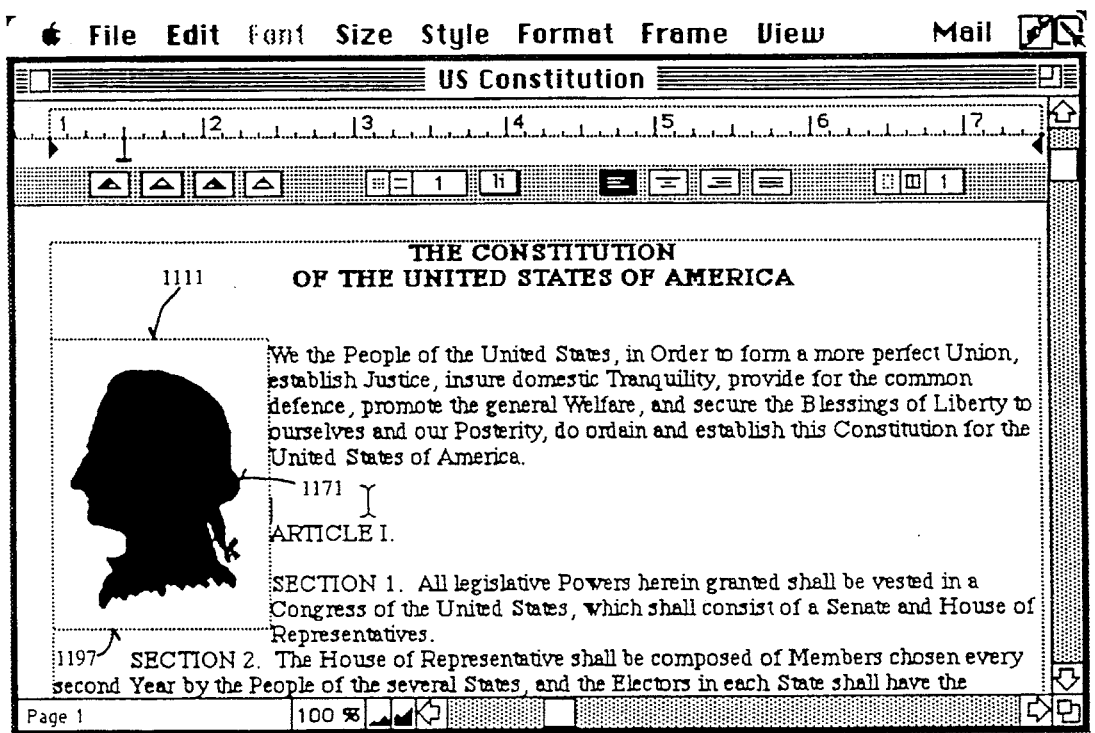
Figure 11H:
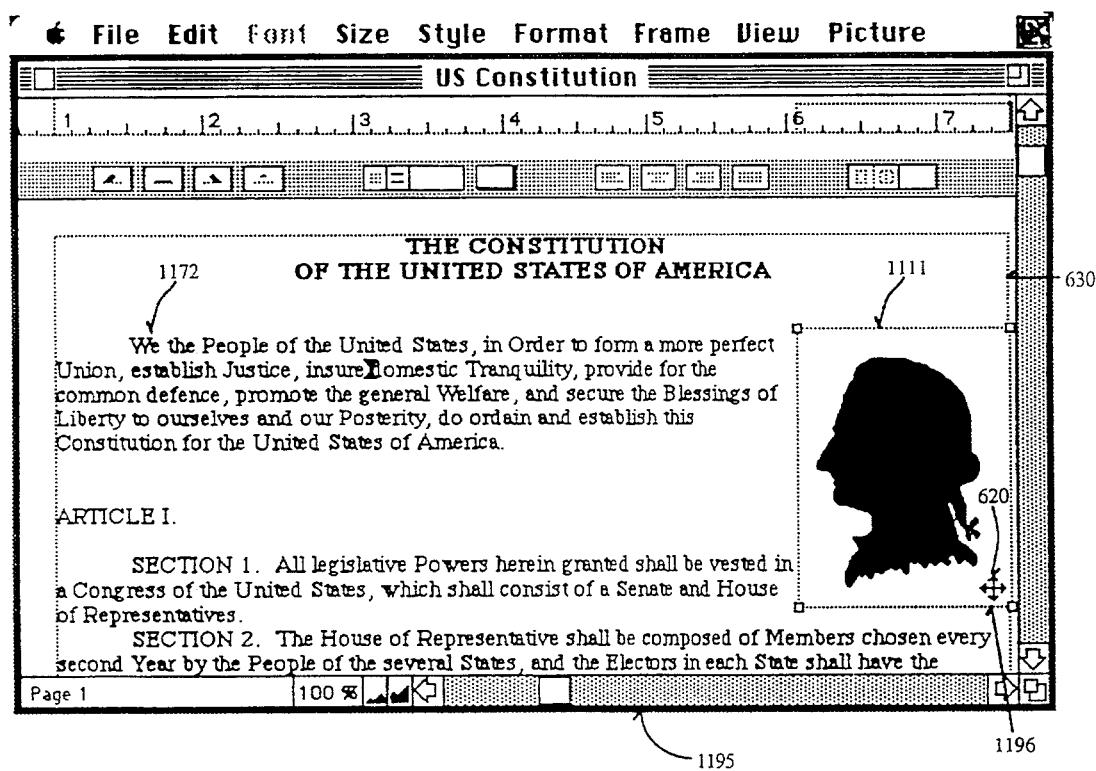

If a user selects the "Picture" option 1113 causing pull-down menu 1181 to appear on screen 1180 as shown in FIG. 11f, then various contextual options become available to him. These options include "Scale" option 1182, "Fit Frame to Contents" option 1183, "Fit Contents to Frame" option 1184, and "Center Contents" option 1185. The "Fit Frame to Contents" option 1183 has been selected which causes the result shown in screen 1190 of FIG. 11g. Notice that frame 1111 contains the full image of 1171 as shown in screen 1190 of FIG. 11g. As an additional option, the user may click and drag the entire frame 1111 so that it resides in the fight-hand portion of the screen area 1196. This is shown in screen 1195 of FIG. 11h. FIG. 11h shows cursor 620 changing to a crossbar configuration which indicates the mode for moving the frame. The user may then select frame 1111 residing at the position 1197 shown in FIG. 11g, and "drag" frame 1111 until it resides at the fight-hand portion 1196 of page 630, as is shown in screen 1195 of FIG. 11h. When released, the image and the text are redrawn, and again text 1172 wraps around picture frame 1111. The "wrap" feature may be modified by performing the various modifications as shown in FIGS. 12a through 12f.

Figure 12A:
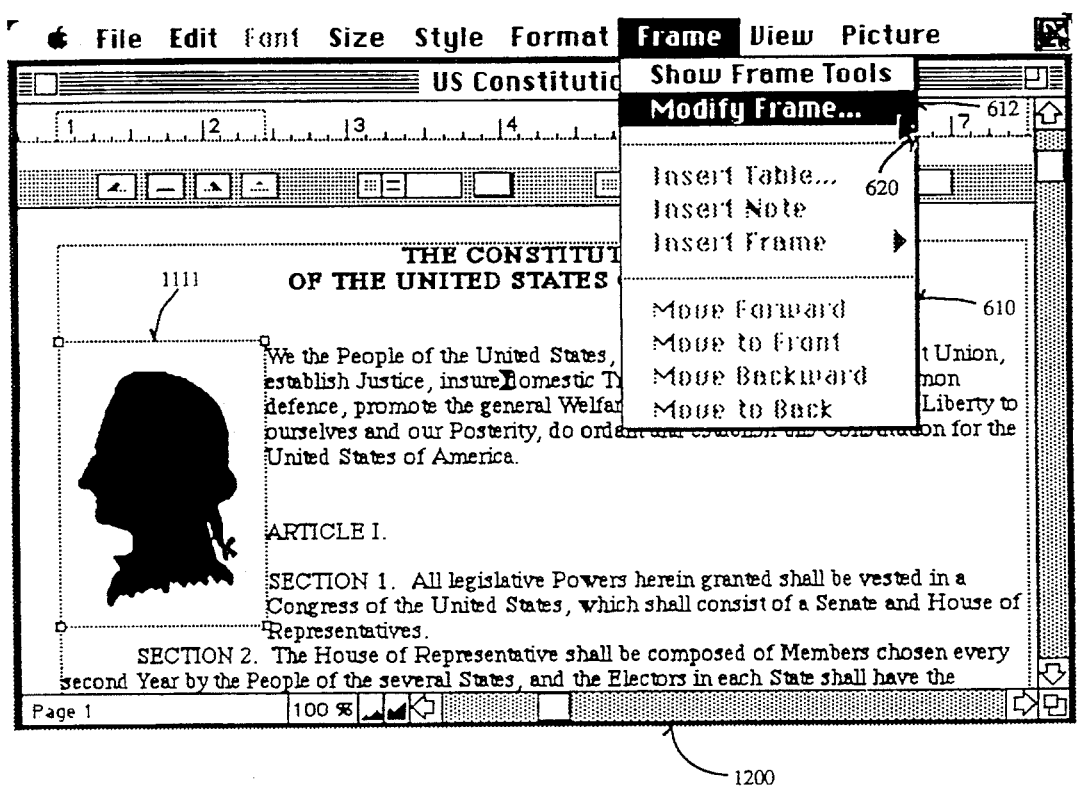
FIGS. 12a through 12f show modifying a frame using other attributes.

Text and picture frames may be modified by selecting option 612 on pull-down menu 610 as is shown in screen 1200 of FIG. 12a. The user uses cursor 620 to select the "Modify Frame" option 612 for changing the attributes of a selected frame such as 1111 shown in screen 1200. Then, the screen displays the "Modify Frame" menu 1210 as is shown in screen 1220 of FIG. 12b. The menu provides several options for modifying the attributes of the existing frame. These include "Fixed" option 1211, and "Floating" option 1212, and "Float with Page" option 1213 (which is only activated when the "Floating" option 1212 is selected). Further, "Modify Frame" menu 1210 provides "Wrap" option 1214, "None" (no wrap) option 1215, and "In-line" option 1216. The frame may also be made either "Opaque" 1217, (which is the default setting), or "Transparent" by selecting 1218. The user may apply these options to the frame using 1219 in FIG. 12b and continue selecting other options on menu 1210, "Cancel" any changes by selecting 1221, or apply the options and return to viewing the text by selecting the "OK" option 1222 using cursor 620. These various modifications will now be discussed with reference to FIGS. 12c through 12f.

Figure 12B:
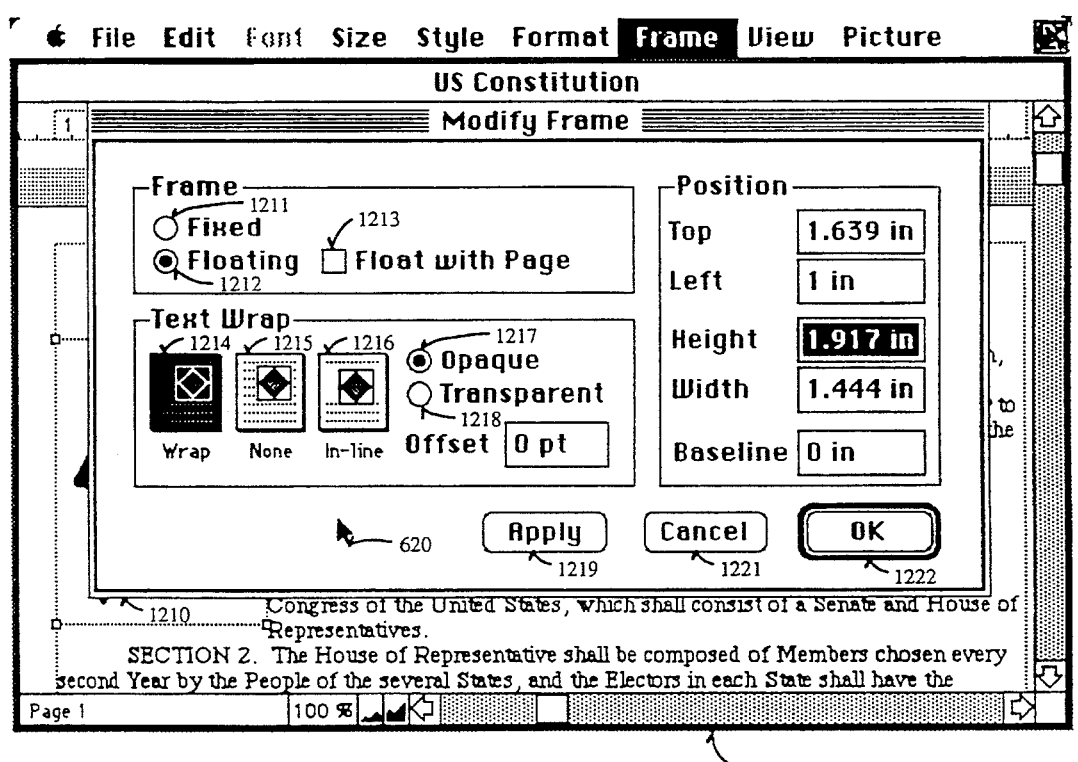
Figure 12C:
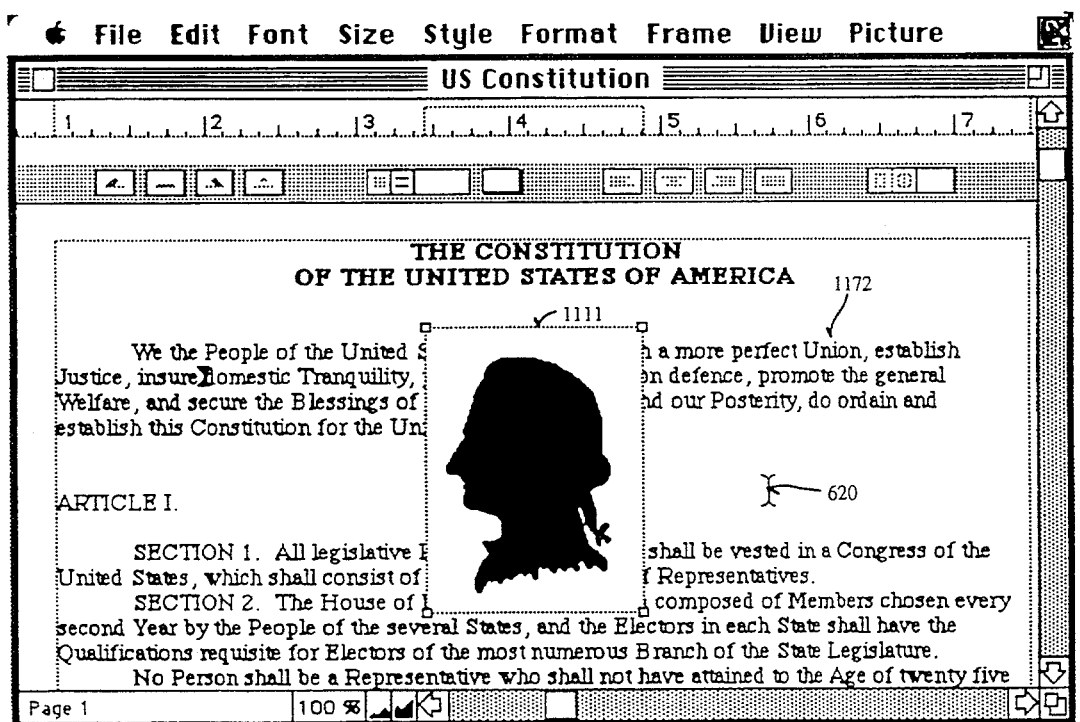
Figure 12D:
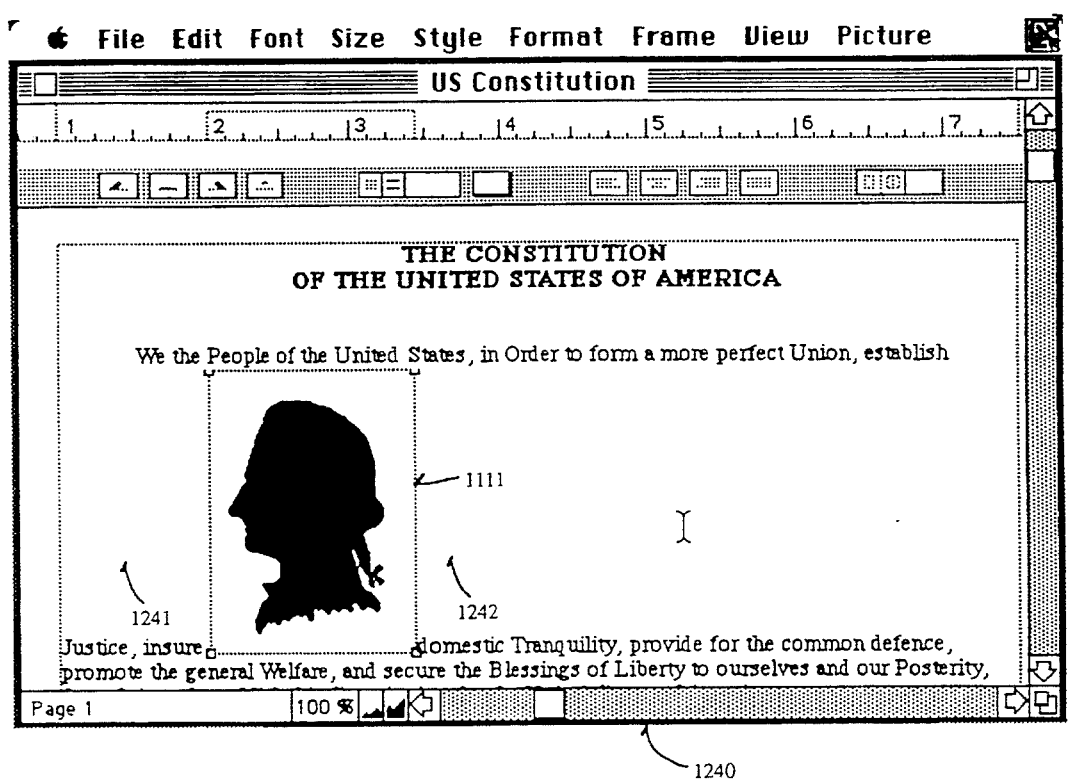

Screen 1230 in FIG. 12c shows frame 1111 having the "None" option 1215 selected from menu 1210 in FIG. 12b. Notice that the image in picture frame 1111 covers text 1172. Screen 1240 shown in FIG. 12d shows the results of selecting "In-line" option 1216 shown in FIG. 12b. The "In-line" option has the text wrapped around the image, but leaves a blank space 1241 and 1242 around the image. The image thus appears as a line or series of lines in the document. This is known as being "in-line." Notice that the image frame 1111 covers area in the document as "Opaque" option 1217 is still selected as shown in menu 1210 of FIG. 12b.

Figure 12E:
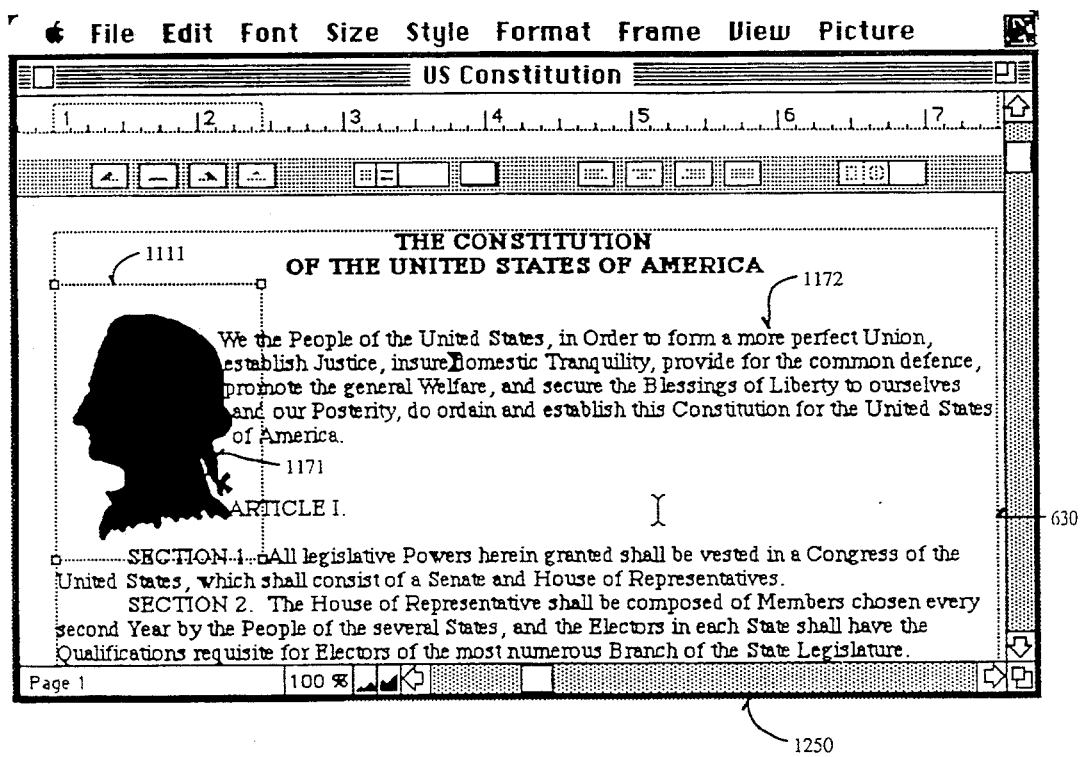

Screen 1250 in FIG. 12e shows the results of selecting "Transparent" option 1218 for frame 1111. Notice also that "Wrap" option 1214 is still selected because even though text frame 1111 is transparent, text 1172 wraps but is not obscured by image data 1171. Text 1172 therefore wraps around image 1171.

Figure 12F:
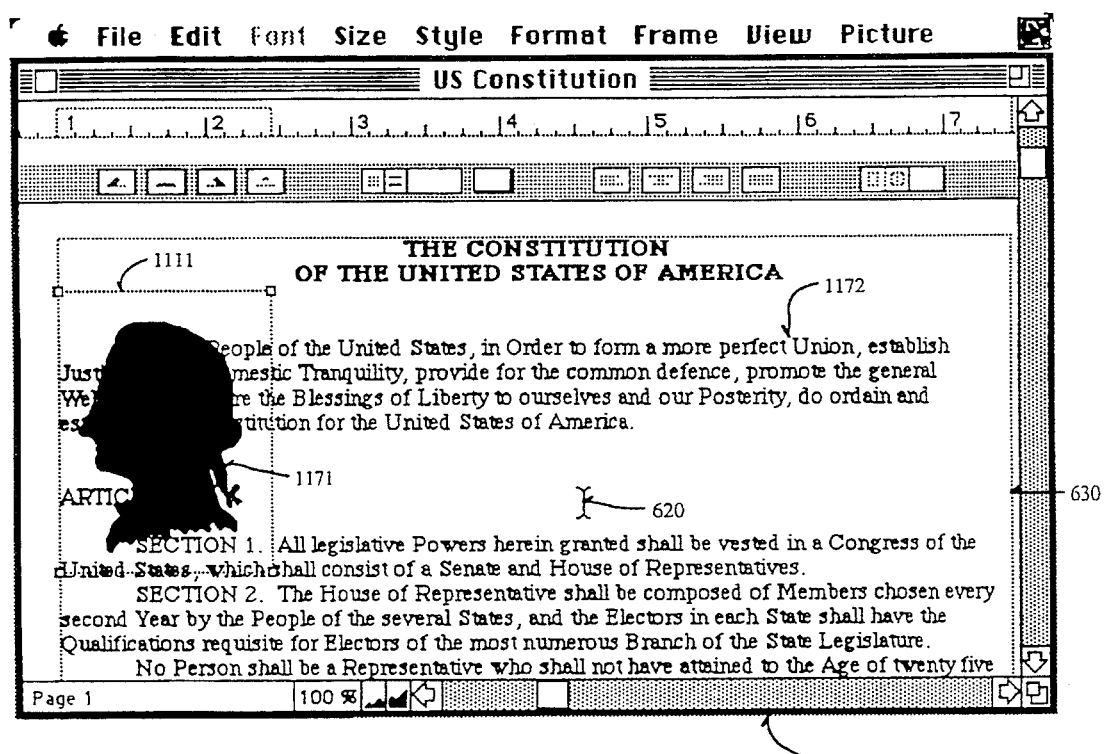

"None" (no wrap) feature 1215 with a "transparent" frame is shown in image 1260 of FIG. 12f. Notice that frame 1111 is transparent, however, because option 1215 has been selected, image 1171 obscures some of the text 1172 contained on page 630. Thus, by using the foregoing features to modify frames, a user achieves the utmost flexibility in the layout of his images and text.

Figure 13A:
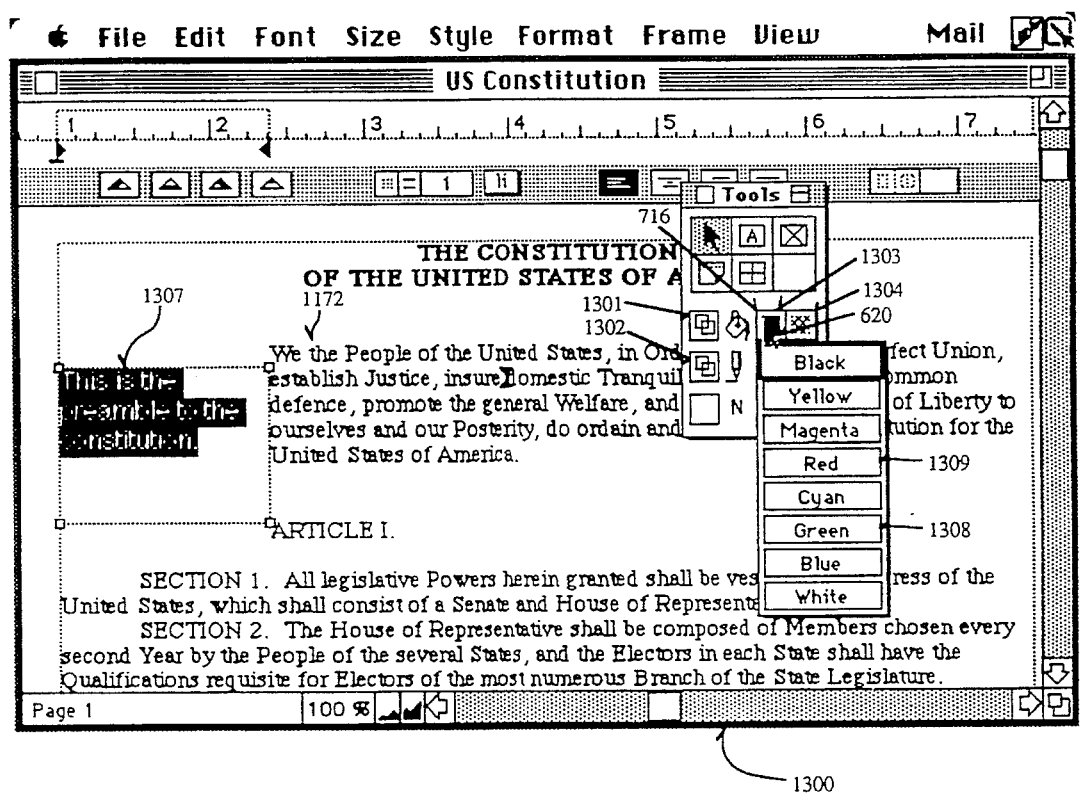
FIGS. 13a through 13f show modifying various colors and patterns of a frame.

As is shown in screen 1300 of FIG. 13a, various attributes of frames such as 1307 shown in FIG. 13a may be modified. As is shown in 1300 of FIG. 13a, 1307 may be a text frame, for instance. Once the frame is activated by placing cursor 620 inside the frame and "selecting," the attributes of the frame may be changed using tools menu 710 shown in screen 1300. For instance, the background of the frame may be modified by selecting background modification icon 1303 to access a pull-down menu. Notice that 716 comprises two portions 1303 and 1304, the color and pattern icons respectively. Notice also that tools menu 710 comprises an icon 1301 indicating the present state of the background for the selected frame. 1301 shows that the background is set to a "clear" color at this point. To change the color of the frame, icon 1303 may be selected and any of the colors shown in submenu 1308 such as red 1309 may be selected. This is done by a "click and drag" operation as with the other pull-down menus. After this operation is complete, the color of the background for frame 1307 may be modified. In order to distinguish frames in systems using a black and white or gray-scale display 121, the pattern of the frame must be modified. This is discussed with reference to FIG. 13b.

Figure 13B:
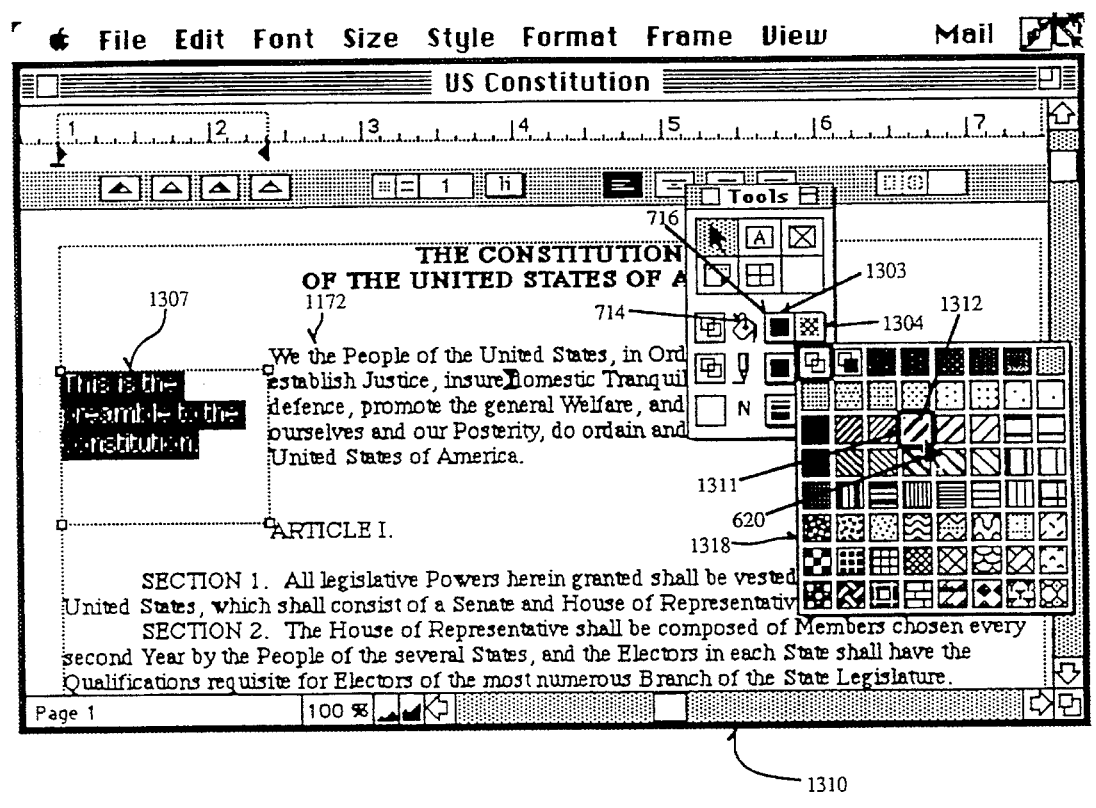

As is shown in screen 1310 of FIG. 13b, the pattern icon 1304 may be selected in order to change the pattern of the background of the frame. Cursor 620 is dragged until selection box 1311 resides over an appropriate pattern. For instance, the user may wish to choose the broad striped diagonal pattern 1312 shown in FIG. 13b. This will then change the background of frame 1307 to the broad striped diagonal as is shown in screen 1320 of FIG. 13c. Notice also that 1301 now contains the background pattern 1312 as well.

Figure 13C:
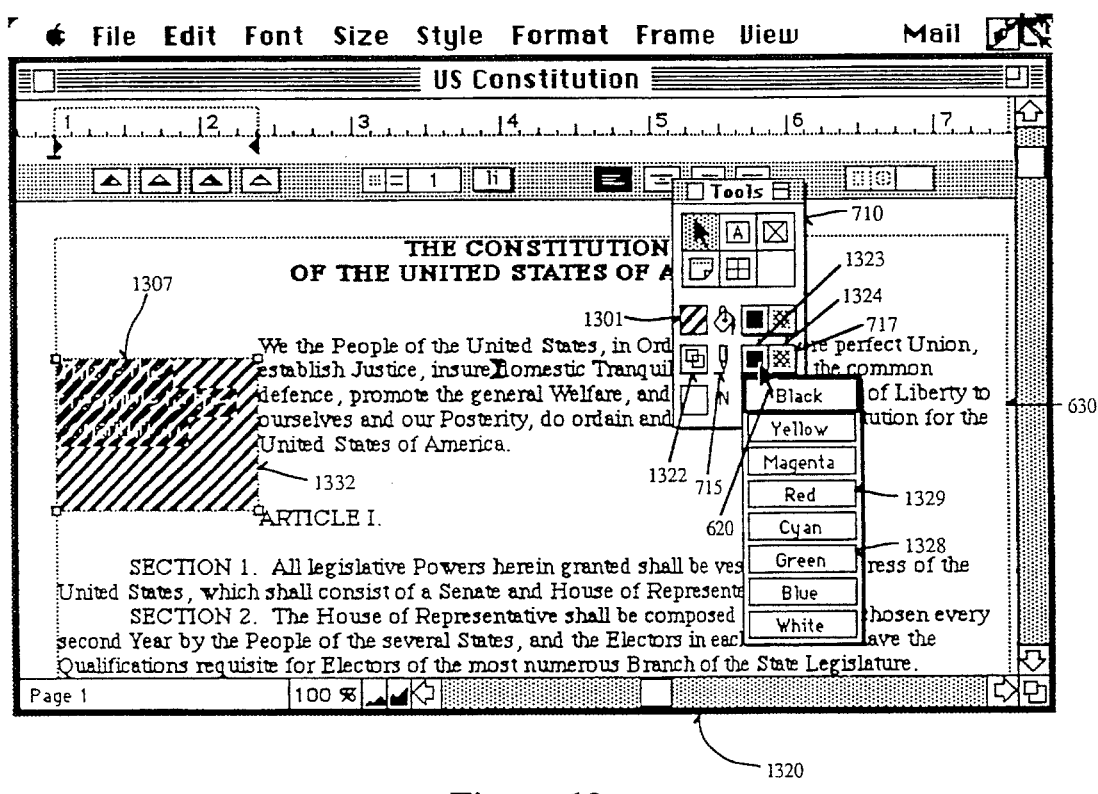

In addition to changing the background of frame 1307, the border pattern and/or color may be changed. The current border attribute of frame 1307 shown in screen 1320 of FIG. 13c is represented by icon 1322. This indicates that the border attribute is currently set to none or a "clear" color. The border color may be changed on a color monitor by selecting the color icon 1323 and dragging cursor 620 on submenu 1328 to an appropriate color. For instance, the color red 1329 on submenu 1328 may be selected. This will then change the color of the border of frame 1307 to red.

Figure 13D:
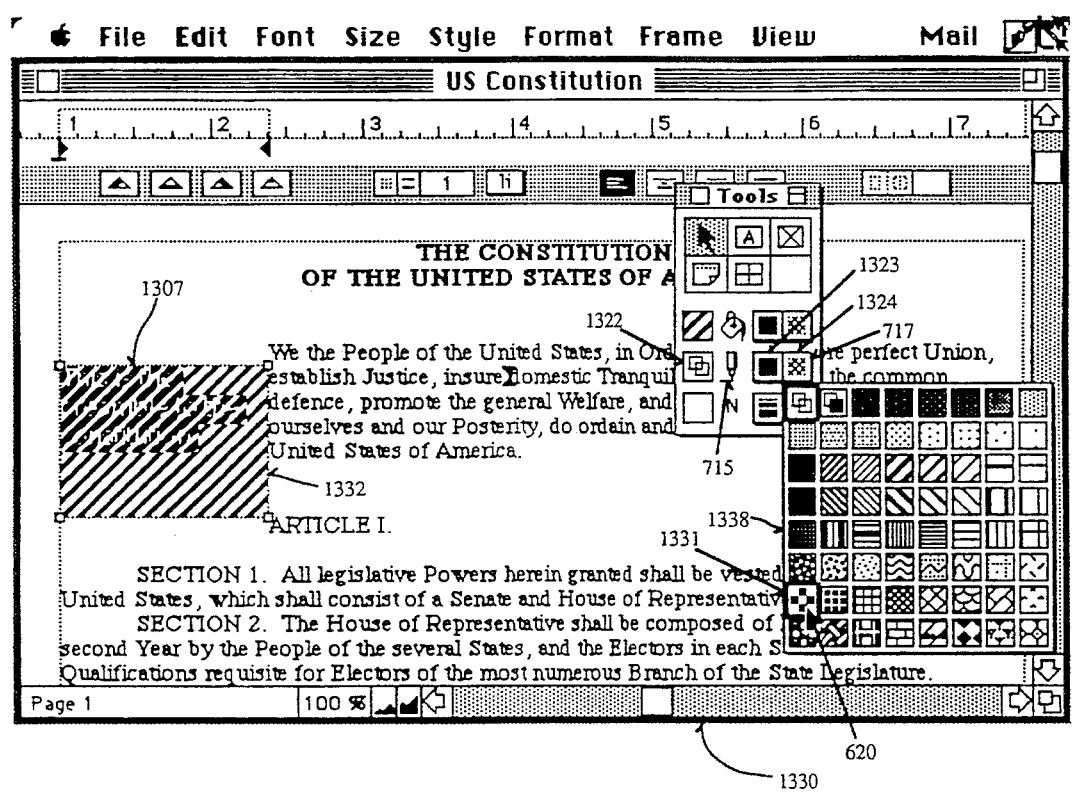

As discussed with referenced to screen 1310 of FIG. 13b, the pattern of the border may also be changed. As is shown in screen 1330 of FIG. 13d, this is done by selecting the background tool 1324 and dragging the cursor to an appropriate pattern such as the checked pattern 1331 shown in screen 1330 of FIG. 13d. This changes the border 1332 of frame 1307 to the checked pattern 1331.

Figure 13E:
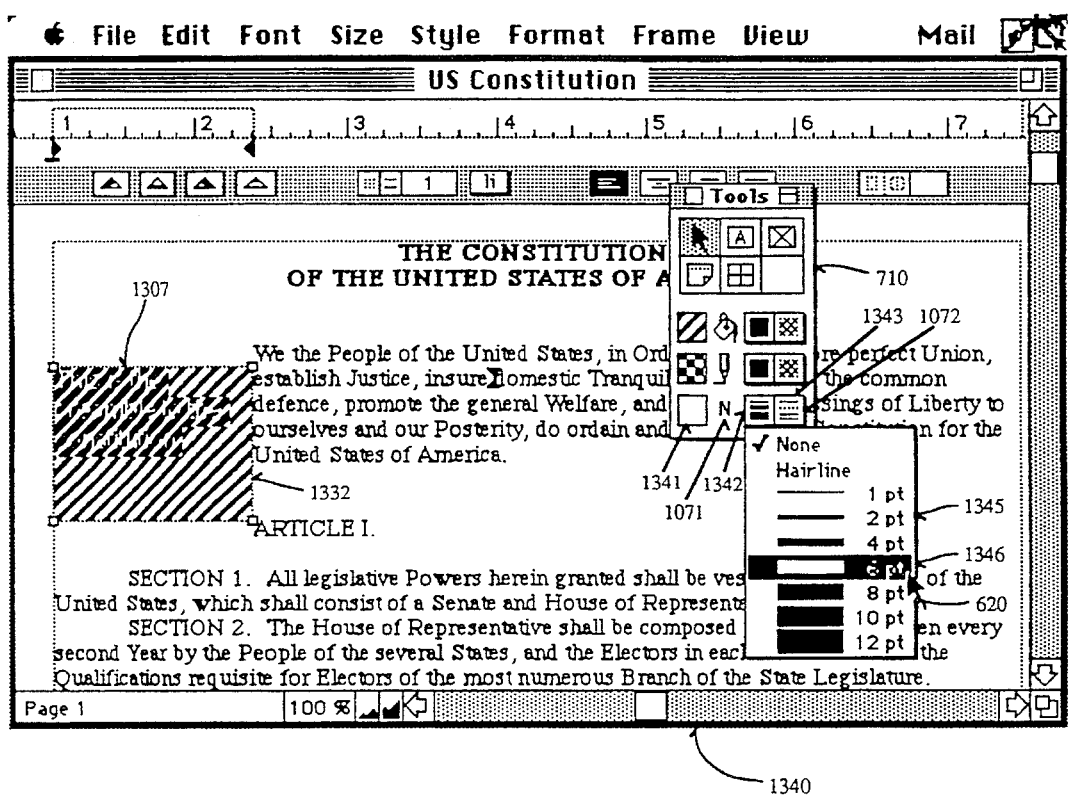
Figure 13F:
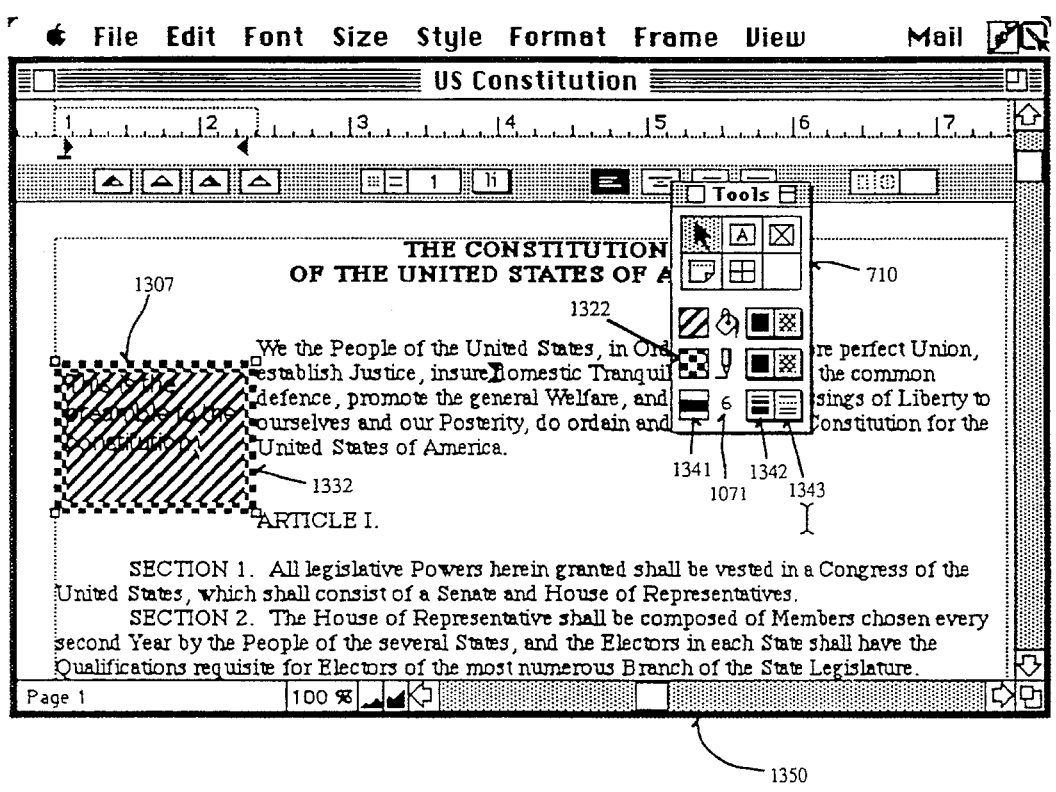

The results of changing the border of 1332 in frame 1307 to the checked pattern is shown in FIG. 13e. Notice that no change is visible because the border is zero or no pixels in width. This is indicated by the "N" (no width) residing at icon 1071. Therefore, the user must select a width using icon 1342 thereby causing submenu 1345 to appear on screen 1340. The user may select six-point width 1346. When this is done, 1341 will change to represent the width of the border, the "N" icon 1071 will change to a six to represent its current width, and border 1332 will be modified to have the width selected. This result is shown in screen 1350 of FIG. 13f. Additionally, the user may use a pull-down menu available from icon 1343 to change the style of border 1332. It may be represented as a single line as shown in FIG. 13f, or double lines.

Notice now that 1071 contains a six representing the point width of border 1332, 1332 is now that width in points, and it contains the checked pattern as indicated by icon 22. Notice also that 1341 contains a graphical representation of the width of the line.

Figure 14A:
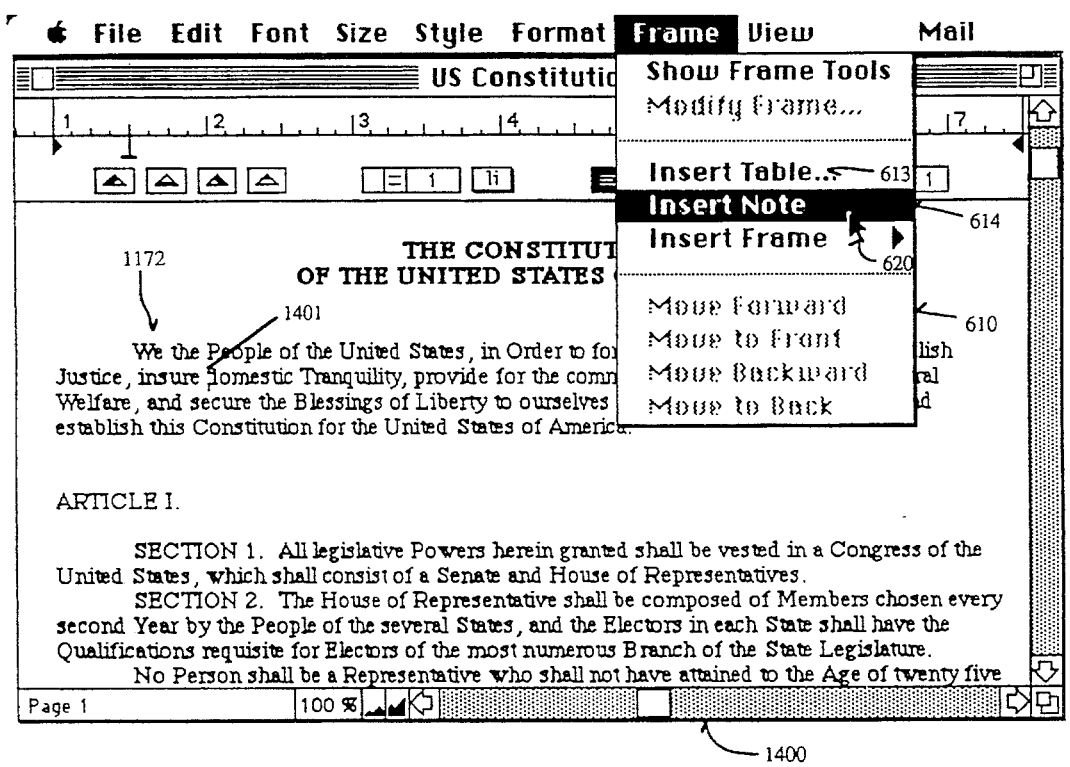
FIGS. 14a through 14i show creating and modifying a note to be associated with text as performed by a user-added function.
Figure 14B:
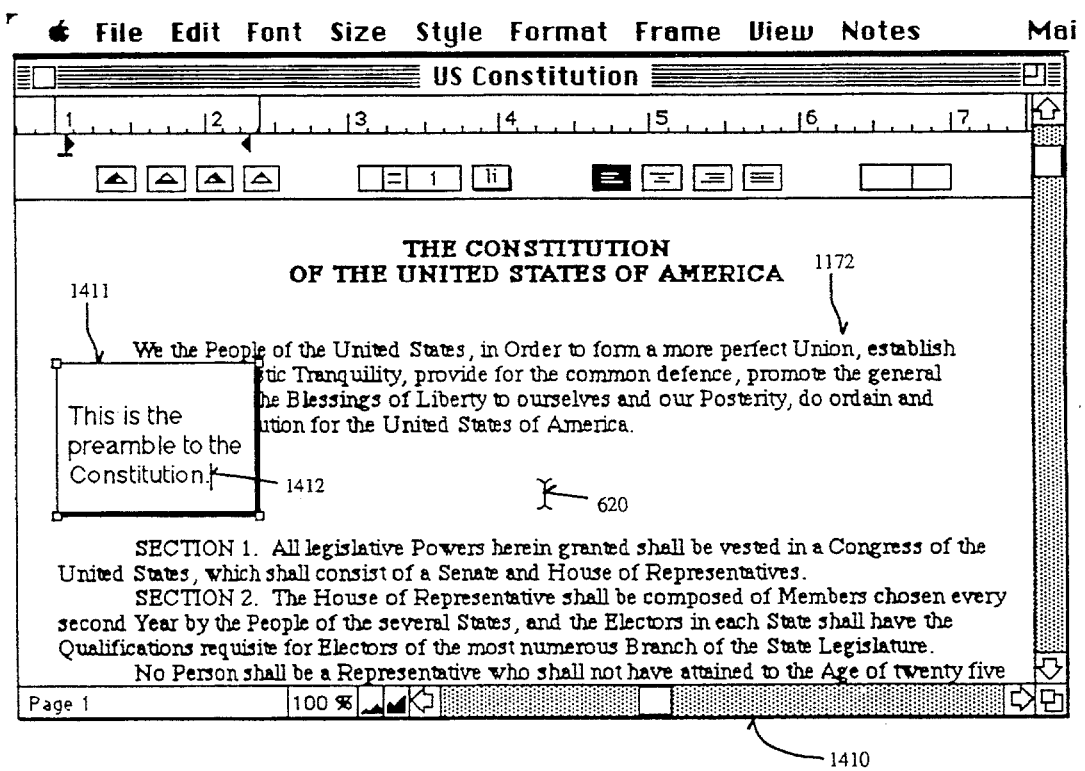
Figure 14C:
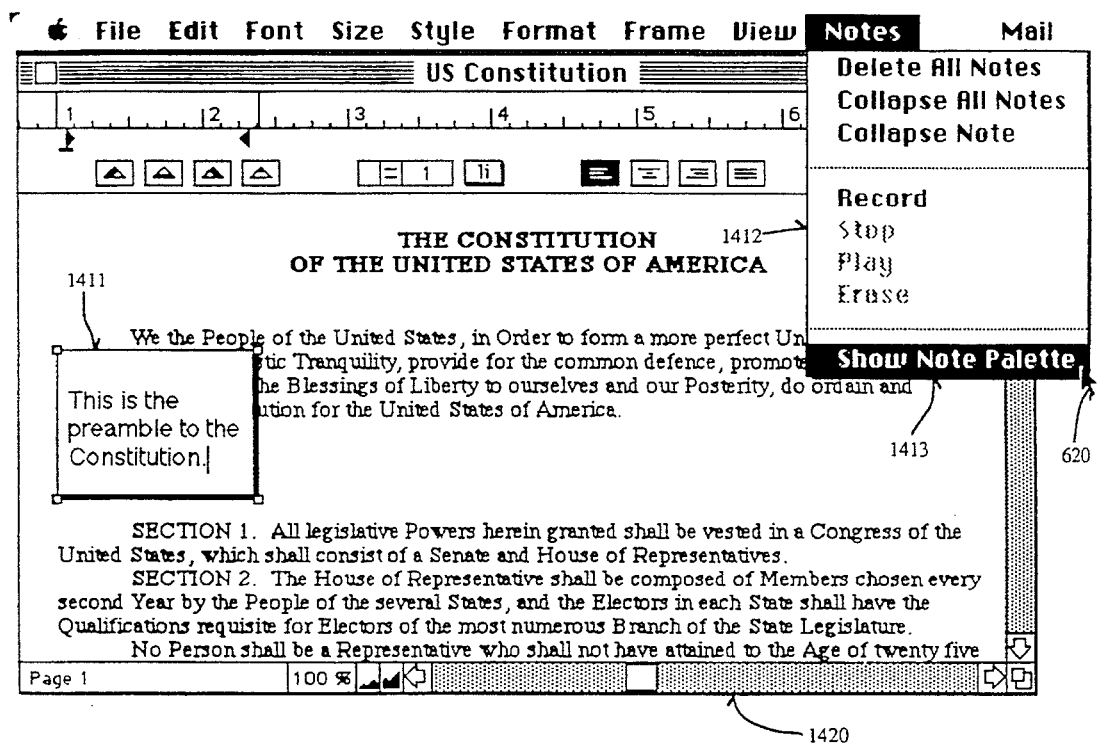

As discussed above, by loading specific applications such as a table editor or a sound note editor at program launch time such as represented by icons 810 and 811 in FIG. 8*a*, the preferred embodiment makes available XAPP's during system operation. Then, certain menu options such as 613 and 614 may become available on pull-down menu 610. This is graphically represented on screen 1400 of FIG. 14*a*. For instance, to place a note in text 1172, the user will take cursor 620 and mark a place in the text where he wants the note to be associated. The selected place is shown on screen 1400 as location 1401. Once this has been done, and "Insert Note" option 614 has been selected on pull-down menu 610 (as shown in FIG. 14), a "note" (a special type of frame) will be inserted in the document associated with the position 1401. This is graphically shown in screen 1410 of FIG. 14*b*. As is shown in FIG. 14*b*, a note 1411 has been inserted into page 630 containing text 1172. Text such as 1412 may be typed into the note by selecting the interior of the note frame area with cursor 620 (represented as a vertical bar in screen 1410) and text may be typed into frame 1411. This may indicate certain information to a reader of text 1172. Again, notes have special properties and are distinct from text frames such as 1050 as discussed with reference to FIG. 10*b* above. Notes may typically be used for indicating certain information to a reader, or may be used for comments on the text by individuals other than the author. Therefore, without changing the text 1172 contained within the document itself, notes such as 1411 may be associated with the document at indicated positions.

Figure 14D:
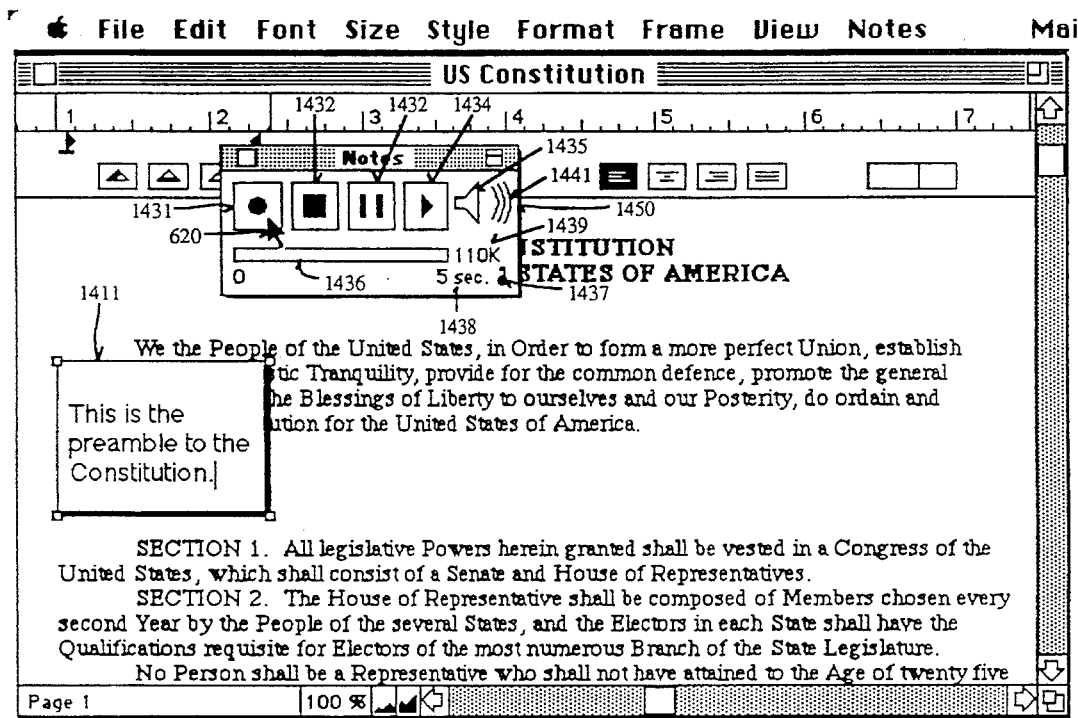

In addition to the feature of creating notes, when frame 1411 is activated, the pull-down menu 1412 for notes becomes available to the user as a contextual menu. The SoundNoteEditor XAPP was loaded at program launch time and controls menu 1412. As can be appreciated from viewing 1412 on screen 1420 of FIG. 14*c*, various options are now available to the user. For instance, the user may decide to associate certain sounds with note 1411. This is done by using a sound recording input device such as 125 shown in FIG. 1 to generate digitized sound samples and associate them with particular points in the text. This is done in two ways: using pull-down menu 1412, or using note palette 1450 shown in FIG. 14*d*. Note palette 1450 shown in FIG. 14*d* is activated by selecting option 1413 on pull-down menu 1412. Note Palette menu 1450 appears on the screen such as that shown in 1430 of FIG. 14*d*. Once 1450 is displayed, the user may associate sound samples with note frame 1411 to communicate information to a reader of text 1172. The controls on 1450 will now be discussed.

As is shown in screen 1430 of FIG. 14*d*, 1450 has controls which are analogous to those found on a tape recorder. Each icon of 1450, when selected, controls operation of sound recording/playback device 125 shown in FIG. 1. For instance, 1450 comprises a record icon 1431, a stop icon 1432, a pause icon 1433, and a play icon 1434. Each of these icons, when selected, has the same functions as those found on a tape recorder. So, when the user wishes to record sound which will be associated with the selected note, in this case 1411 shown in screen 1430 of FIG. 14*d*, sound will be recorded until stop button 1432 is selected, or a five-second time period elapses as indicated by maximum time display 1438. During the recording process, window 1436 shows the elapsed time for the current recorded message using a bar graph moving from left to fight. Once window 1436 is filled with the bar, recording ends because the maximum time (five seconds) has elapsed. The maximum elapsed time for a message associated with a note such as 1411 is five seconds as indicated by 1438. The maximum length of a sampled message is 110 kilobytes as indicated by display 1439. These values are user-definable, however, according to a user's quality and memory requirements. During the recording process, speaker icon 1435 emits wave-type displays 1441 to indicate that sound is being received by recording/playback device 125.

Figure 14E:
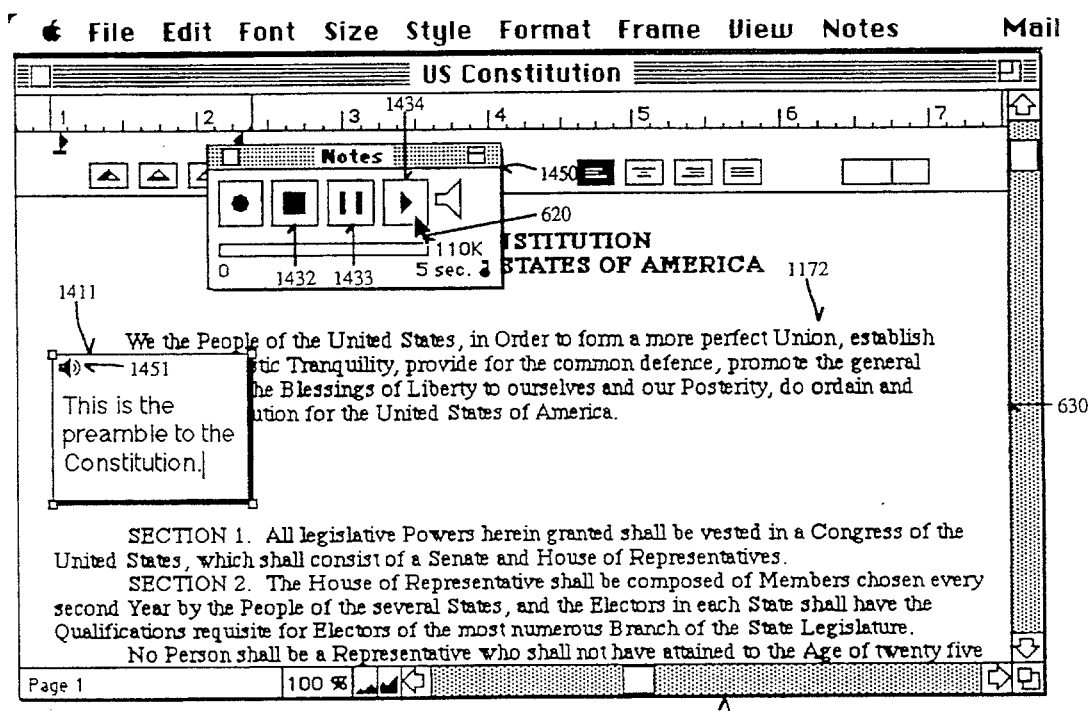
Figure 14F:
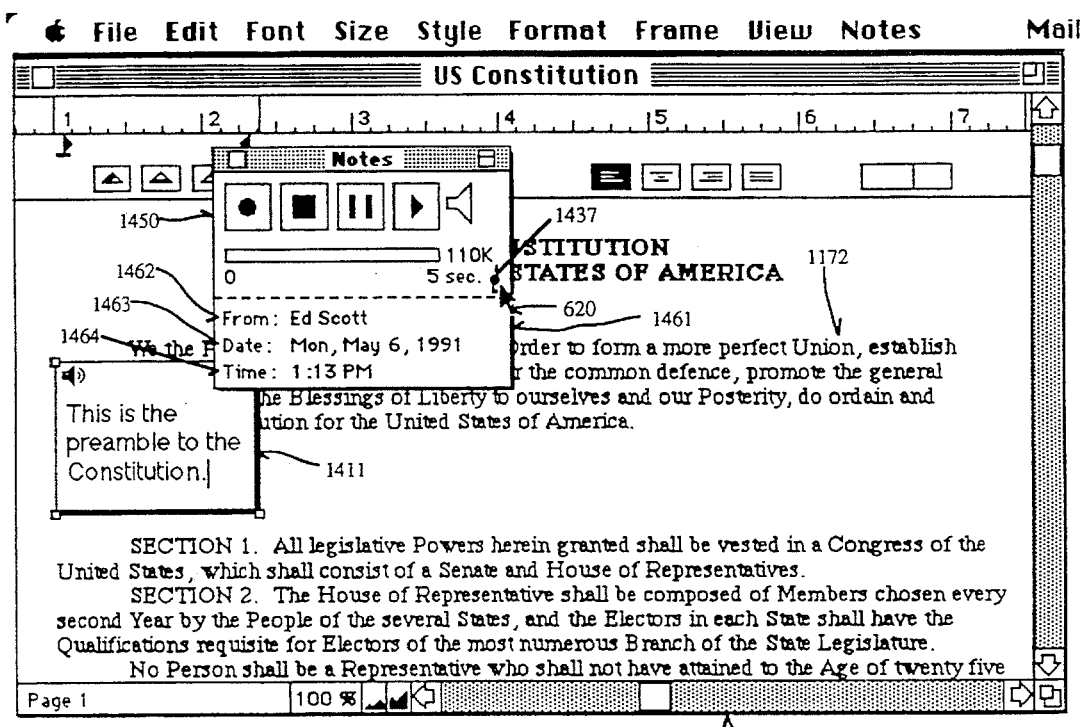

Once a sound has been recorded and associated with a note such as 1411, the note receives a small speaker icon 1451 as is shown in screen 1440 of FIG. 14*e*. This indicates that sound is associated with the note. The sound may be played back as is shown in screen 1440 of FIG. 14*e* by the user selecting play icon 1434. Again, as discussed previously, playback may be paused or halted by using either stop key 1432 or pause key 1433 shown in FIGS. 14*d* and 14*e*. It should be noted also at this time that the preferred embodiment provides a means for recording sound notes to be associated with a note such as 1411 in an asynchronous manner. That is, other processes such as text entry into a document may be performed while the sound is being recorded.

In addition to playing and recording sounds which may be associated with notes as discussed above, the reader of a text containing sound notes may determine who the author of the note is. This is done by activating "Show Attributes" flag 1437 as shown in screen 1460 of FIG. 14*f*. This causes information 1461 to be displayed about the note. This information includes author information 1462, creation date 1463, and creation time 1464 on screen 1460 of FIG. 14*f*. This information may be useful to those reviewing the note.

Figure 14G:
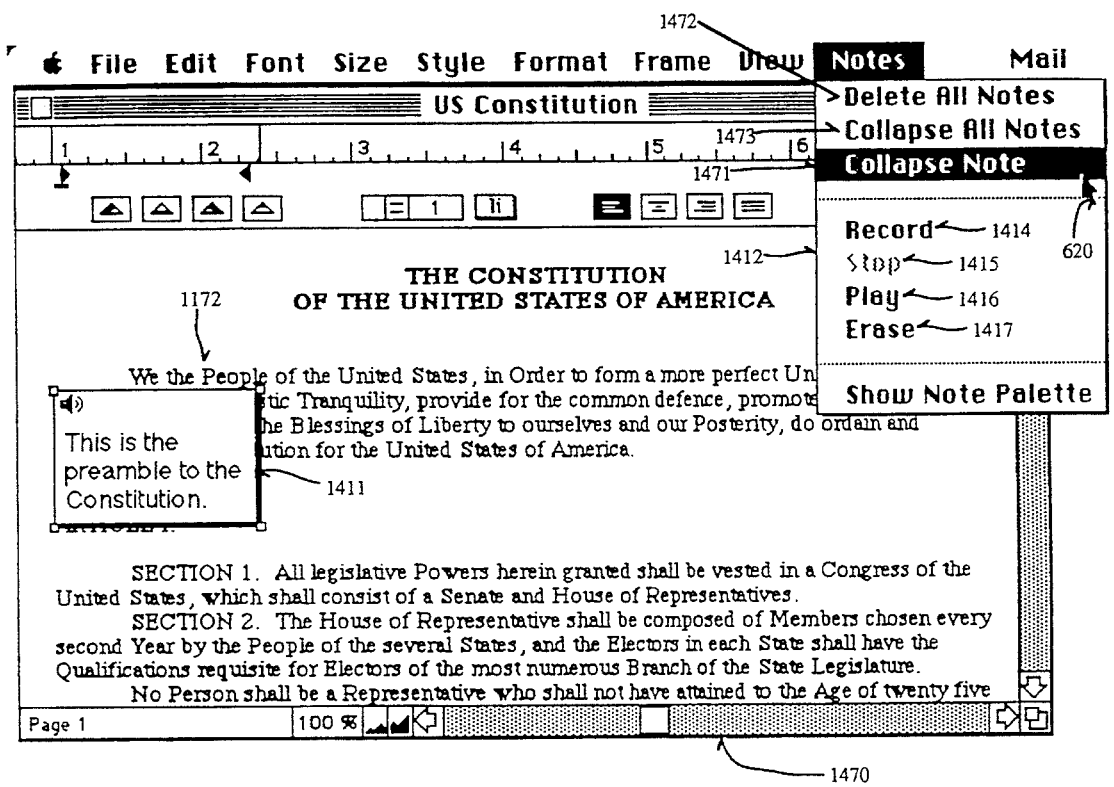
Figure 14H:
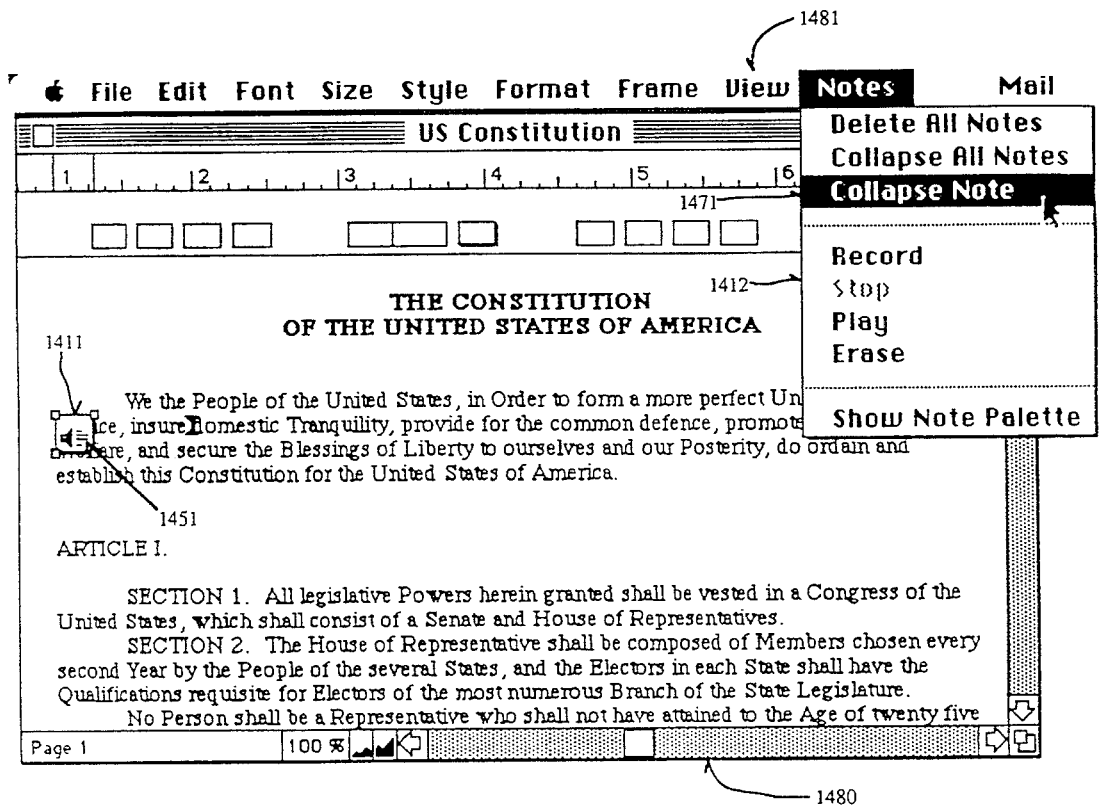
Figure 14I:
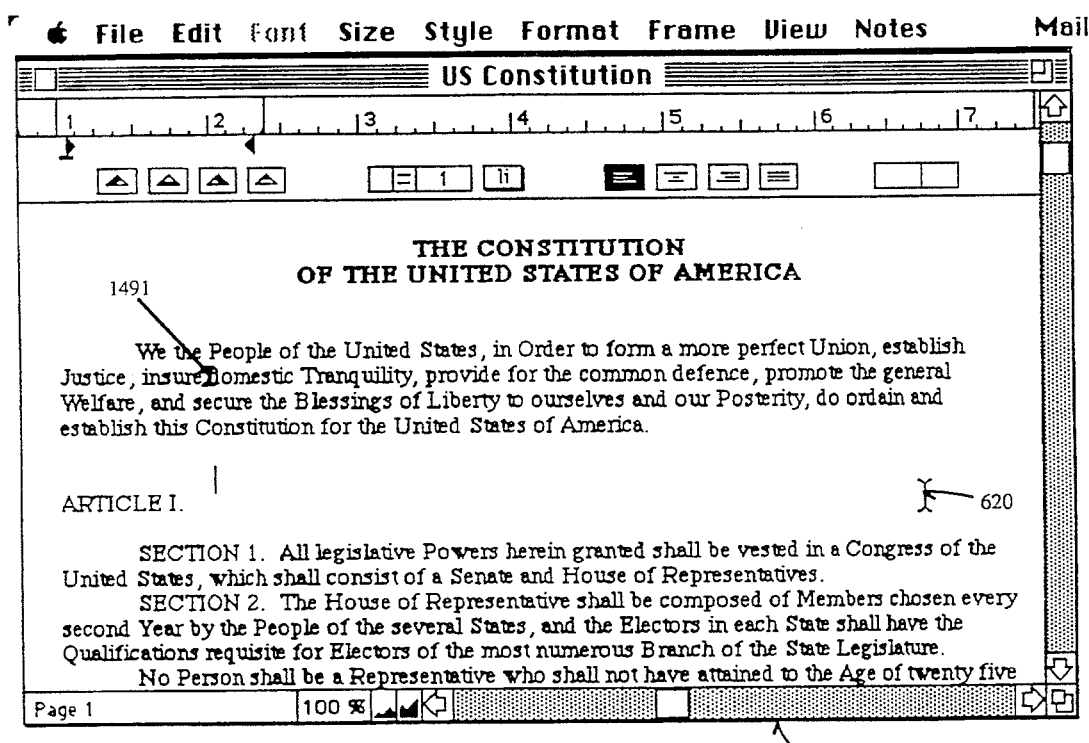

In addition to using control menu 1450 to play and record sound notes such as 1411, the user may use contextual pull-down menu 1412 to perform these functions. These are shown as options 1414, 1415, 1416, and 1417 as shown in FIG. 14*g*. An additional feature provided by pull-down menu 1412 is "Collapse Note" option 1471. This is used for minimizing the size of note 1411 or any other note contained within document 1172. For instance, the user may wish to view the document in a mode that shows that notes reside in the document, but show no text. Collapsing a note such as 1411 is done by selecting "Collapse Note" option 1471 shown in FIG. 14*g*. When this is done, the screen changes to a screen such as 1480 shown in FIG. 14*h*. As can be appreciated from viewing screen 1480 in FIG. 14*h*, 1411 has now been reduced to a substantially smaller size thus displaying only the speaker icon 1411 not text. This indicates that sound is associated with the note. Also, a note may be hidden using a menu option "Hide" under view menu 1481. This is shown in screen 1490 of FIG. 14*i*. As is shown in 1490, only a note marker 1491 remains. For certain applications, this type of collapsing may be desirable.

Figure 15A:
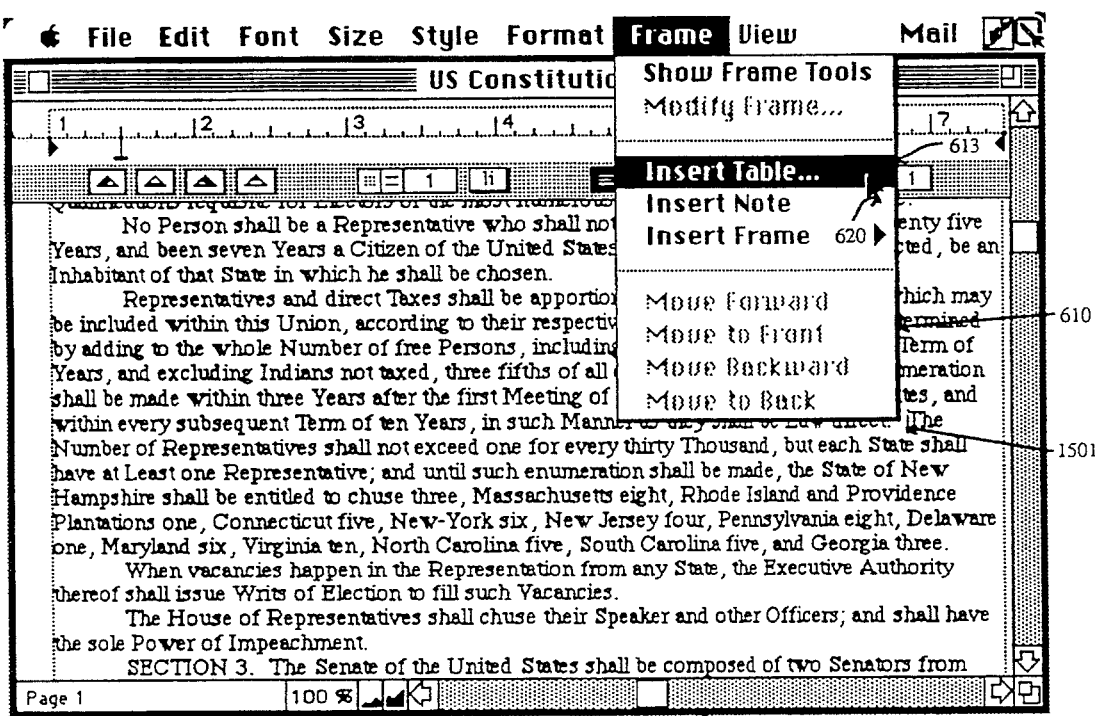
Figure 15B:
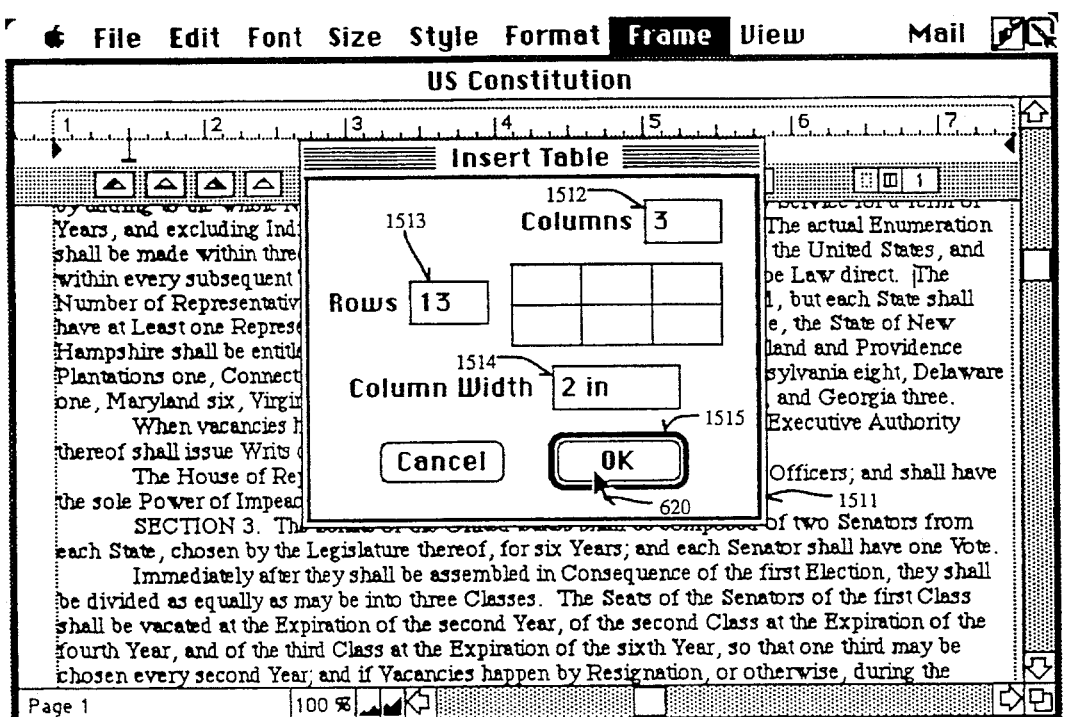

Another XAPP loaded at run time, as indicated by pull-down menu 610, is the Table Editor which is available as option 613 on pull-down menu 610. First, the user must place cursor 620 at a selected place in the text. This place is shown in screen 1500 of FIG. 15*a* as position 1501. Then, the user selects the "Insert Table" option 613 on pull-down menu 610. Once this has been done, the screen changes to that shown as 1510 in FIG. 15*b*. "Insert table" dialogue box 1511 is displayed on screen 1510 in FIG. 15*b*. The user can then modify columns box 1512, rows box 1513, and column width box 1514 to set the table size which he requires. Then, using 620, user may select "OK" button 1515 on box 1511, thus causing the table to be created at position 1501.

A table is then created with the defined dimensions, and a user may input text into the table as is shown on screen 1520 of FIG. 15*c*. As is shown in 1520 of FIG. 15*c*, table 1521 contains three columns 1522, 1523, and 1524 each having 13 rows 1525 through 1526. These were defined previously using dialogue box 1511. Also shown in FIG. 15*c* is contextual pull-down menu 1530 for tables. This is active when a table has been selected, thus calling the XAPP to perform various functions. As is shown in FIG. 15*c*, various functions may be performed such as inserting a row, inserting a column, deleting a row, or deleting a column as indicated by options 1531 through 1534. Further, the cell borders and cell guides may be modified in the manner as discussed in FIGS. 13*a* through 13*f* using options 1535 and 1536 on the pull-down menu. In addition, the table may be converted to a text frame using option 1537. Also, rows or columns may be sorted in alphabetical order by selecting the "Son Cells" option 1538, or multiple selected cells can be "merged" by selecting option 1539. Cells can be "merged" together to form a single large cell. Further, row height and column width adjustments may be performed by selecting options 1540 and 1541, respectively.

Figure 15E:
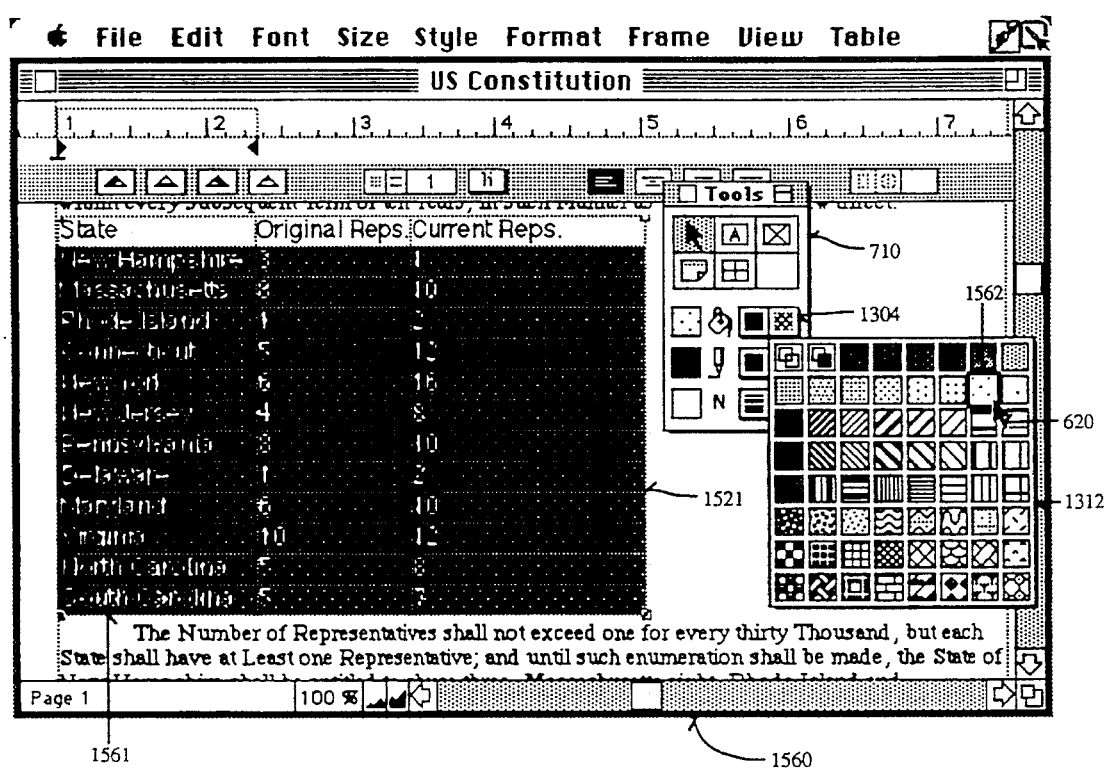

An alternative way to adjust column widths is shown with reference to screen 1550 in FIG. 15*d*. For instance, columns 1523 and 1522 are wider than necessary to represent the inserted information. To change the widths of these columns, the user may move the cursor to the border of one of the columns such as 1551 on screen 1550, and cursor 620 changes to the double arrow icon as shown in FIG. 15*d*. Then, when the user depresses a selection button, he may move the column marker to a position such as 1553 as indicated by direction arrow 1552 using a cursor control device such as 123. In addition, a column boundary such as 1556 may be moved in a direction such as 1554 in FIG. 15*d*, to reside at a second position 1555 as shown on screen 1550. The results of these column move operations are shown in FIG. 15*e*. As an additional feature, if a column is too narrow for text, another row is created and the text "wraps-around" within the width of the column.

As shown in FIG. 15*e*, table 1521 has been adjusted to have the new column settings shown on screen 1550 of FIG. 15*d*. Also, as is shown on screen 1560 of FIG. 15*e*, an area within the table, such as 1561, may be selected for modifying the background color or pattern. This is done by selecting a first area and "dragging" cursor 620. Cursor 620 changes to a "cross" configuration to indicate when a cell selection mode is entered for changing cell attributes. In this case, pattern 1562 on pattern menu 1318 is selected, thus changing the background for area 1561 to that pattern. Similar operations may be performed upon individual columns or rows or both by selecting areas in table 1521, and then selecting the appropriate pattern under icon 1304 in frame pattern menu 1318.

Figure 15F:
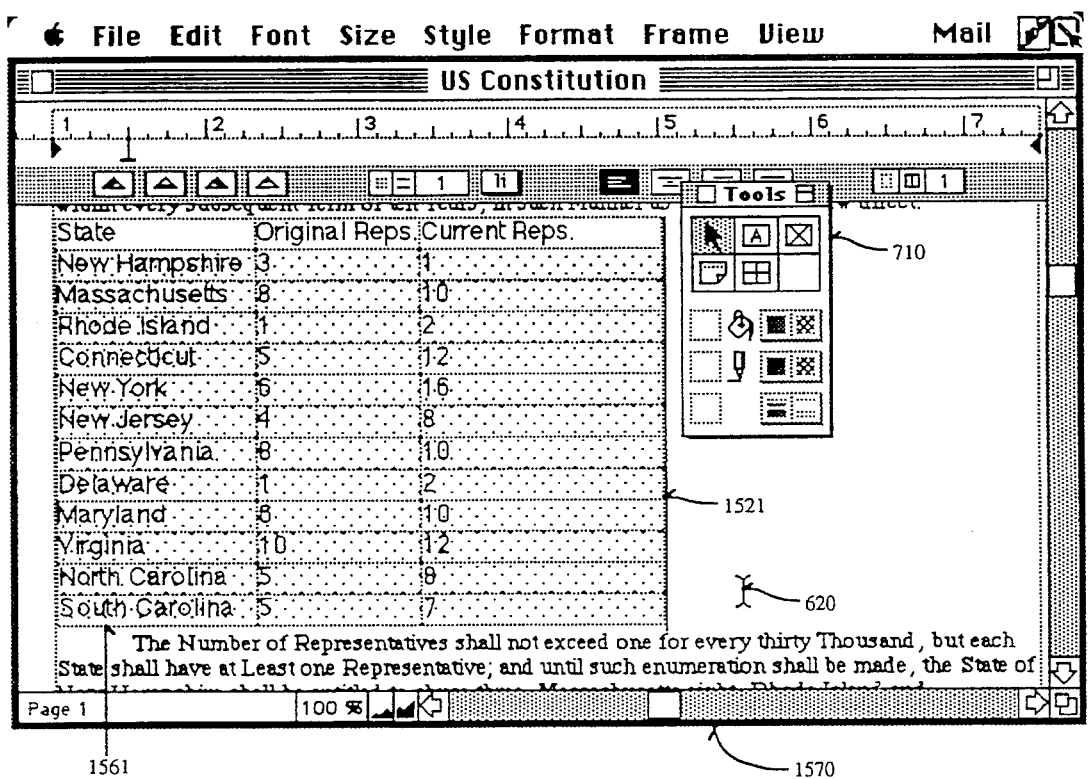

The results of the modify pattern for area 1561 is shown on screen 1570 of Figure 15*f*. As can be appreciated from viewing 1521 on screen 1570, the use of different patterns may be used to convey different information for data contained within tables. Many other changing of patterns, colors, and other items using the frame tools menu are contemplated within the spirit and scope of the present invention.

Figure 16A:
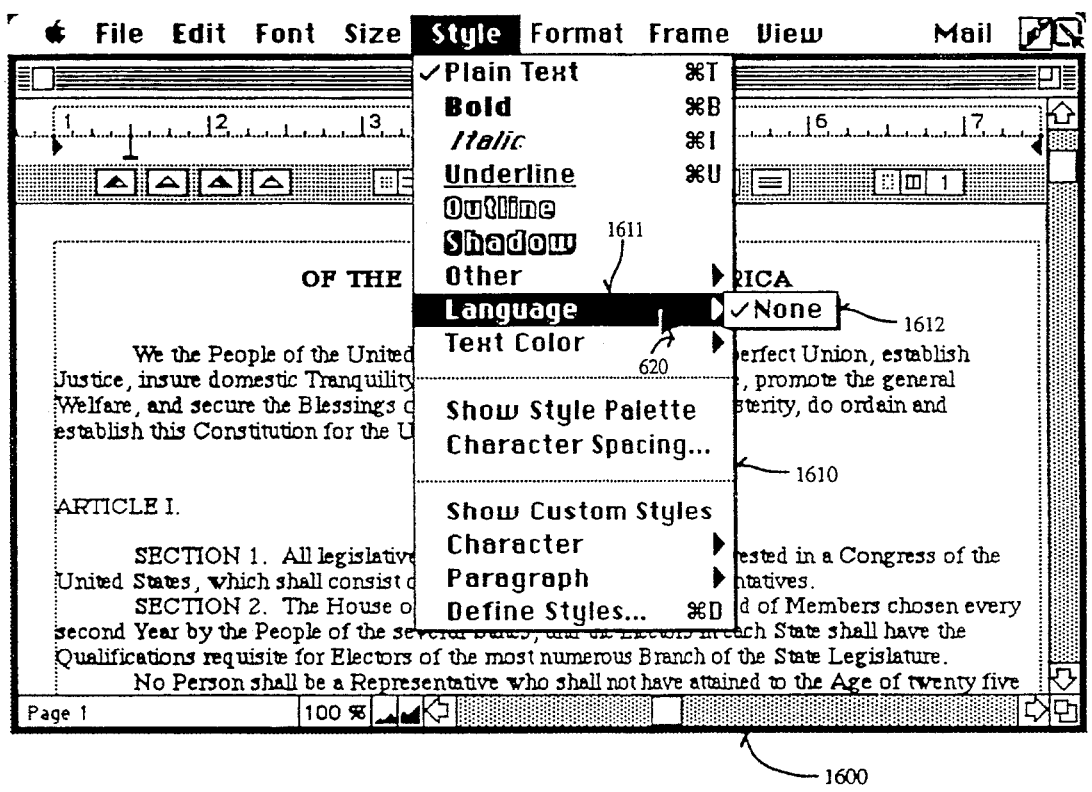
FIGS. 16a and 16b show the preferred embodiment as implemented with no languages installed.
Figure 16B:
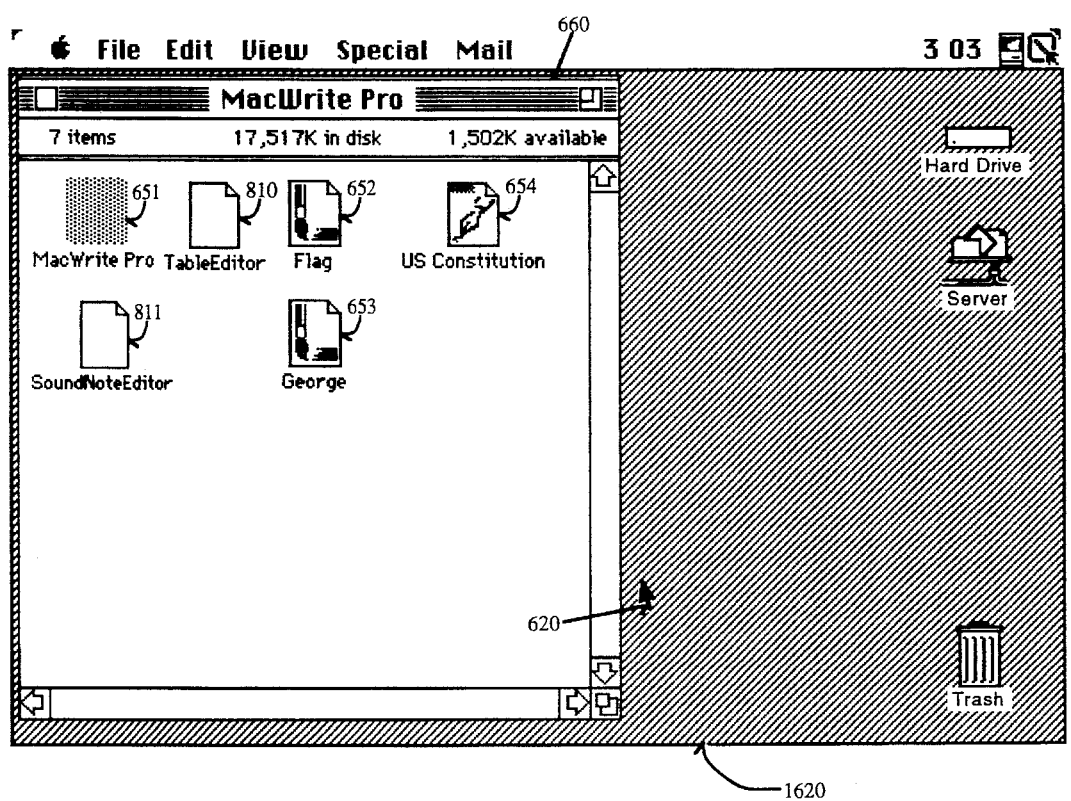
Figure 17A:
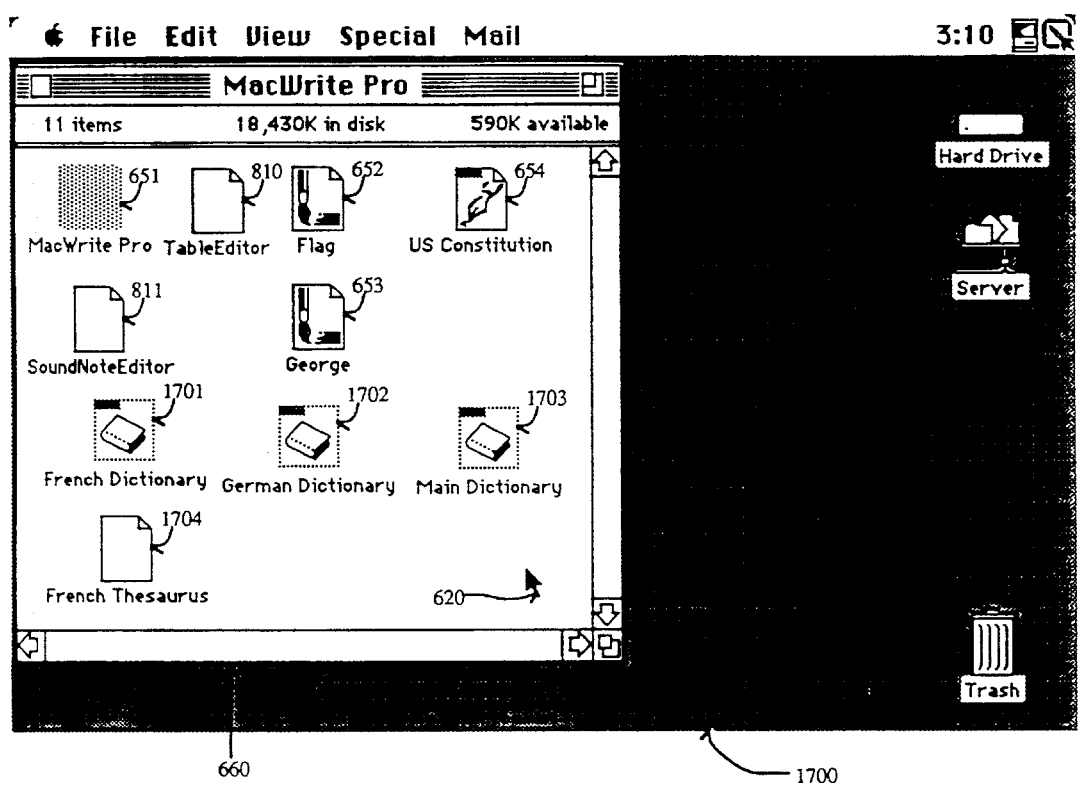
FIGS. 17a through 17h show installing additional languages, performing spell checking, and searches based upon the attributes of text indicating those languages.
Figure 17B:
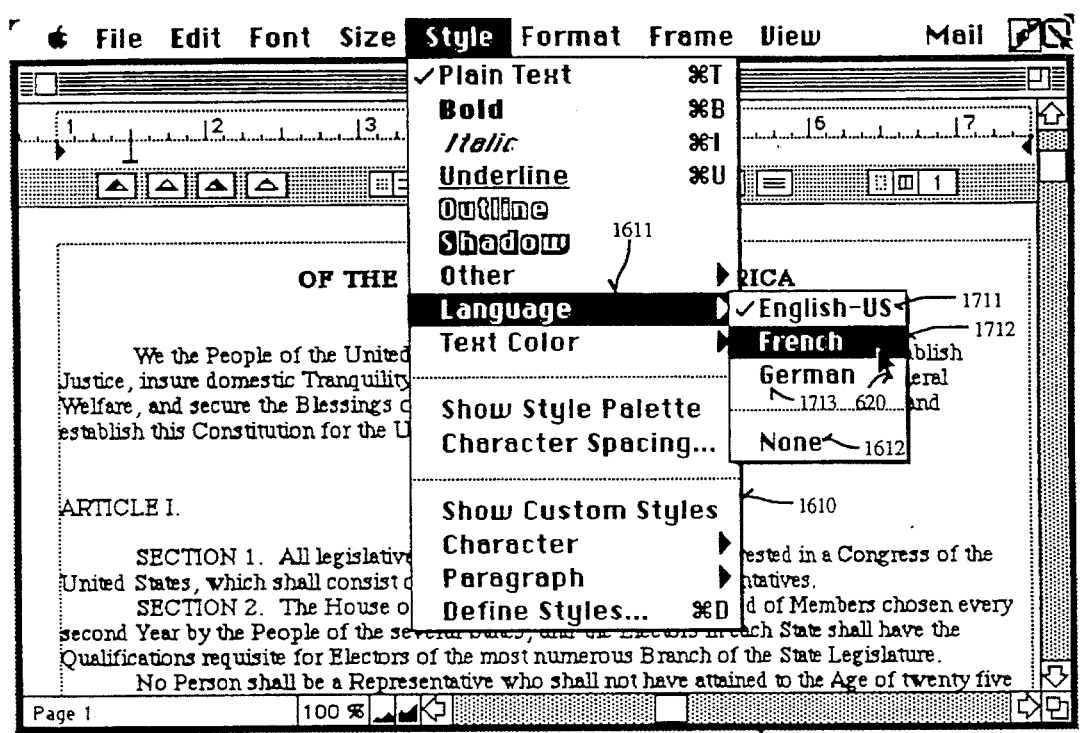

Another feature provided by the present invention is the addition of languages as a "style" accessible from the "Style" pull-down menu 1610 shown in screen 1600 of FIG. 16*a*. The "Language" option is available under selection 1611 on pull-down menu 1610. As is shown on screen 1600 of FIG. 16*a*, only "None" selection 1612 is available because no foreign language files were present at system launch time. Additional dictionaries, thesauri, and other files associated with languages are loaded in a similar way as XAPP's at launch time. The system searches for a file classification of type "Language" in specified directories. As is shown, the "None" option 1612 is shown on pull-down menu 1610. Therefore, no languages were loaded at launch time. This can be confirmed by viewing screen 1620 in FIG. 16*b*. There are no language files present in directory "MacWrite Pro" 660 as was discussed above. However, once the files are put into directory MacWrite Pro 660 as shown in FIG. 17*a*, they are available from pull-down menu 1610. The presence of a French dictionary, a German dictionary, a U.S. English dictionary, and a French thesaurus are indicated by the presence of icons 701, 702, 703, and 704 in directory 660 as shown by the screen image 1700 in FIG. 17*a*. Now, English-US, French, and German options 1711, 1712, and 1713 become available as selections as shown in screen 1710 of FIG. 17*b*. Further, "None" option 1612 also appears on pull-down menu 1610. As shown, an option such as "French" 1712 may be selected and text may be typed into the document. This text is now identified as "French." This is shown as text 1721 on screen 1720 of FIG. 17*c*. Because the text is identified as "French," when certain operations are performed, such as a spelling check, or word lookup in a thesaurus, the appropriate language file will be used. A brief description of the implementation of styles is in order at this time.

Figure 17C:
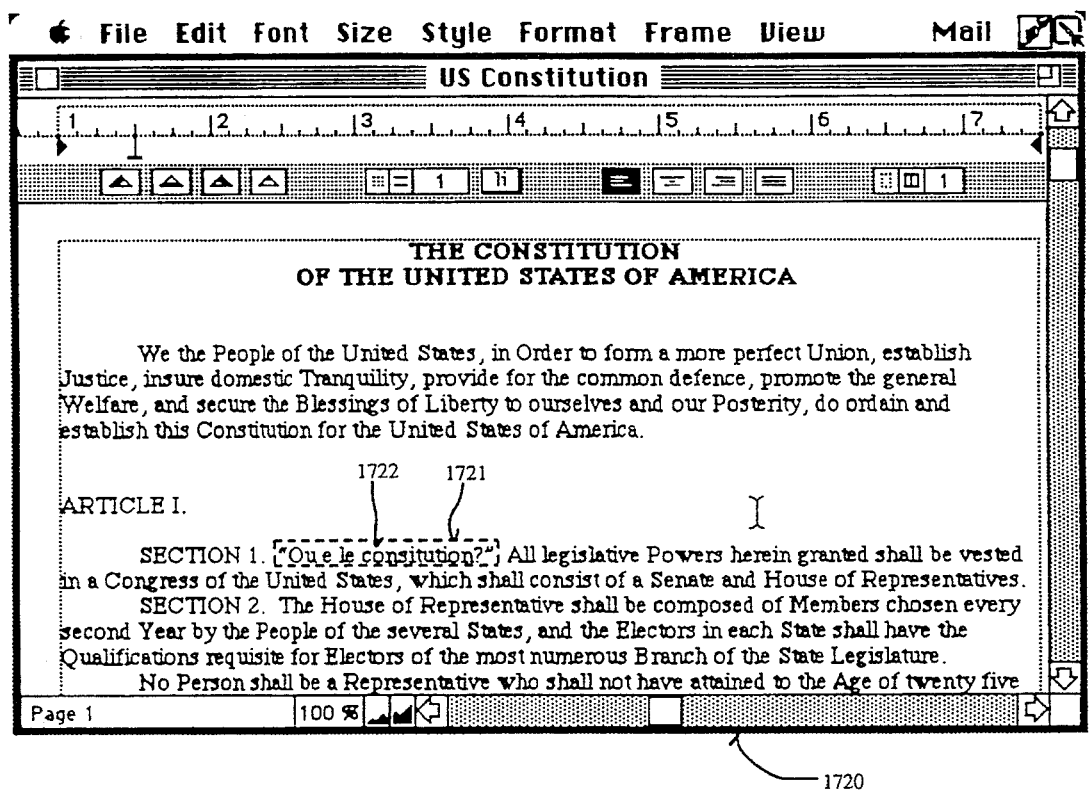
Figure 17D:
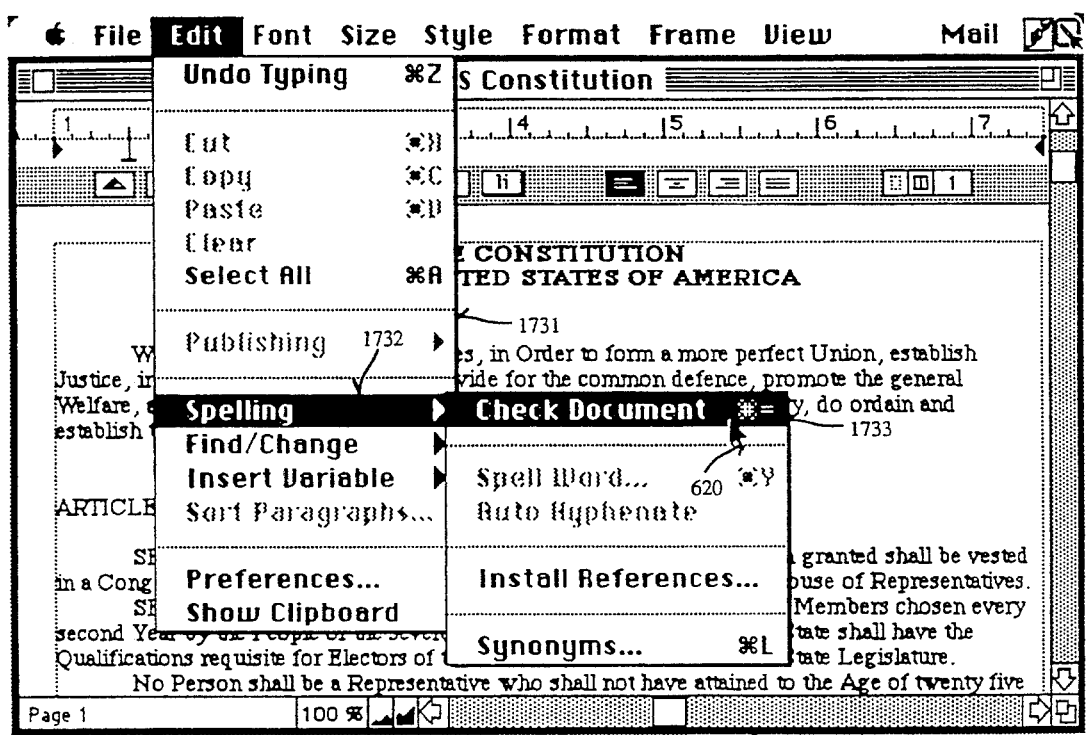
Figure 17E:
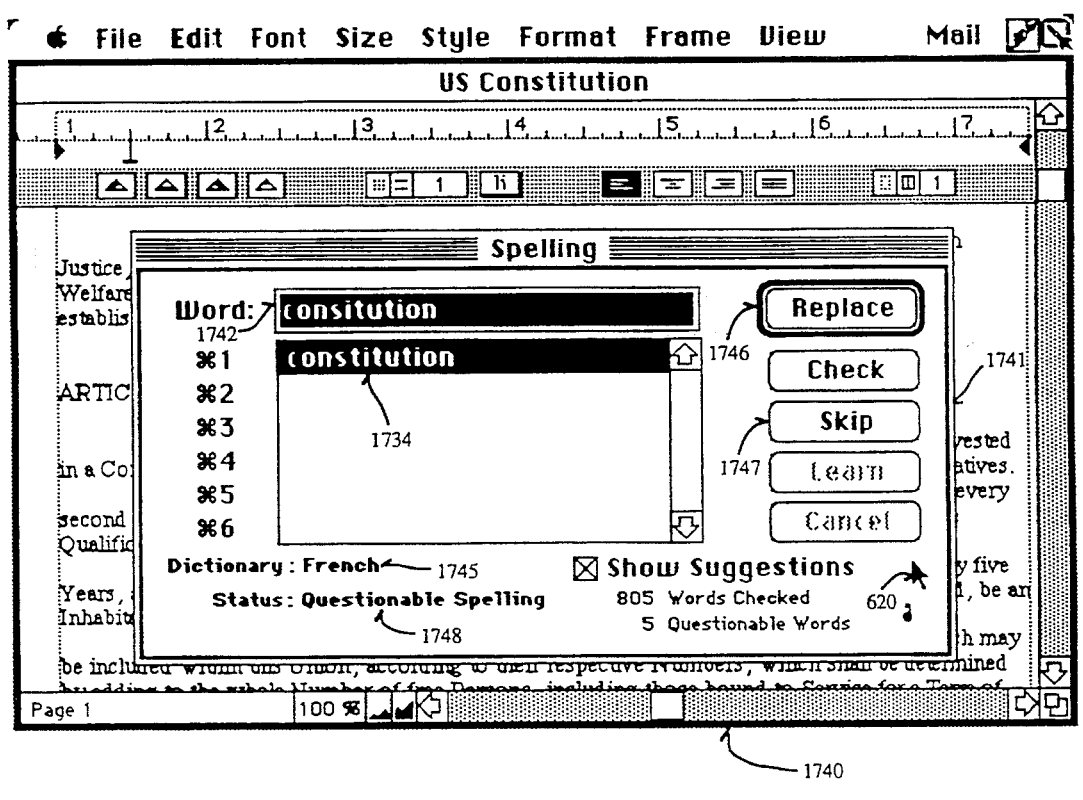

Styles are saved in documents operating under the preferred embodiment of the present invention by an index table containing a value associated with each style, and a beginning and ending position. Therefore, if the text from position one to position ten is in boldface, there will be a record in the index table containing the value for bold, followed by starting number 1, and ending number 10. The software periodically updates information contained within the document if the user wishes to change the text. Languages are treated in the same way, however, because certain dictionaries and other files must be associated with languages as styles, then those files will be used during certain operations, such as a spell check. Also, particular files are used for thesaurus and hyphenation rules in certain languages. So, if certain text such as 1721 shown in screen 1720 of FIG. 17*c* is spell-checked, for instance, then the French dictionary is used for that text. This operation will be described with reference to FIGS. 17*d* and 17*e*.

For instance, a spell check operation may be performed by using pull-down menu 1731 as shown on screen 1730. The spell check will be performed by pulling down menu 1731, selecting option 1732, and thereby select sub-option 1733 in submenu 1734. This initiates the spell check operation. The preferred embodiment then check the spelling of all the text with the appropriate dictionary files. For instance, area 1721 shown in screen 1720 of FIG. 17*c* will be checked using the French dictionary. For instance, the spelling of "constitution" 1722 shown in screen 1720 of FIG. 17*c* is questionable. Therefore, as shown in screen 1470 of FIG. 17*e*, the word is indicated by message 1748 as having a "Questionable Spelling." Dialogue box 1741 appears, which indicates the questionable word 1742, and any suggested word(s) 1743. The suggested spelling is shown as 1743. It is also clear, from viewing dialogue box 1741, that the appropriate dictionary has been used as indicated by message 1745. To use the word selected, the user must merely select the word such as 1743 suggested using cursor 620, and select the "Replace" button 1746. To skip the word, if it is a correct or esoteric spelling which is not present in the dictionary, the user merely selects "Skip" button 1747. The spelling features provided by treating languages as a style make this feature transparent to the user and greatly increase the ease of use of the preferred embodiment as a multilingual word processing program.

Figure 17F:
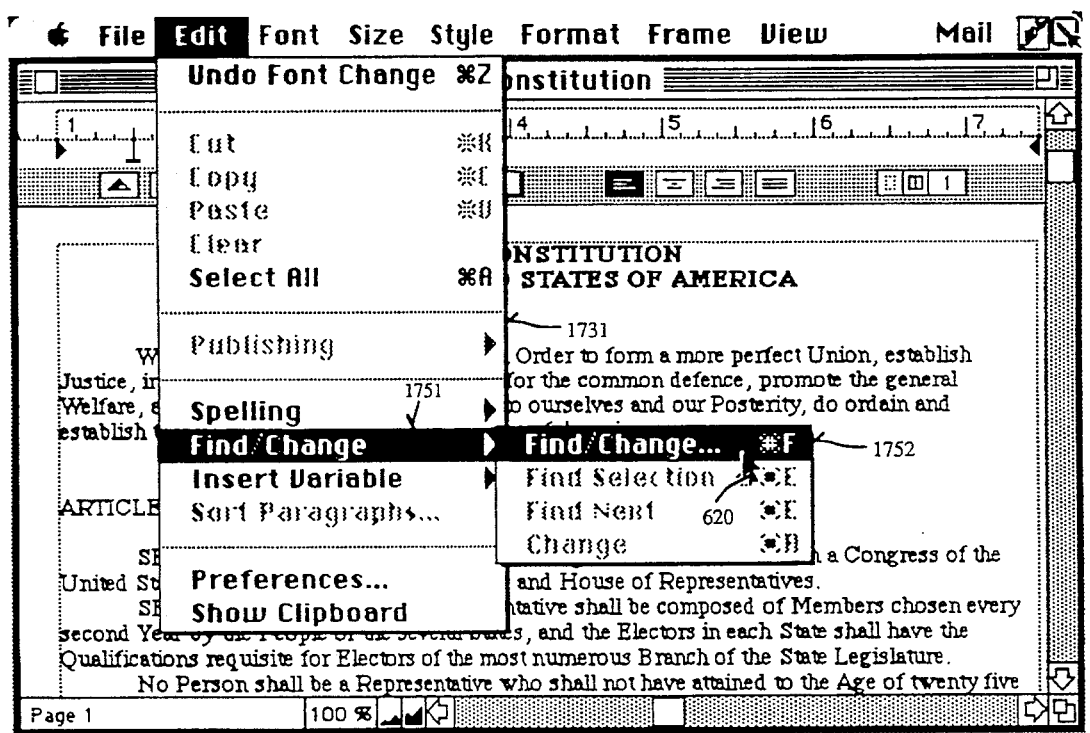
Figure 17G:
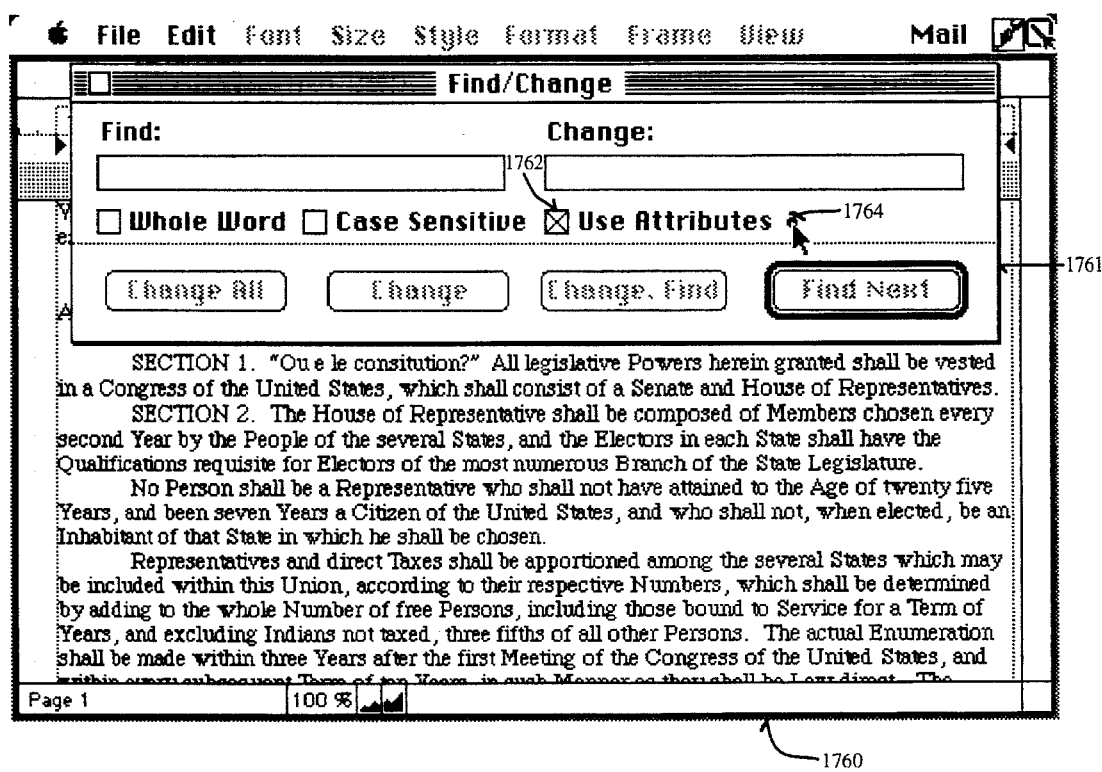
Figure 17H:
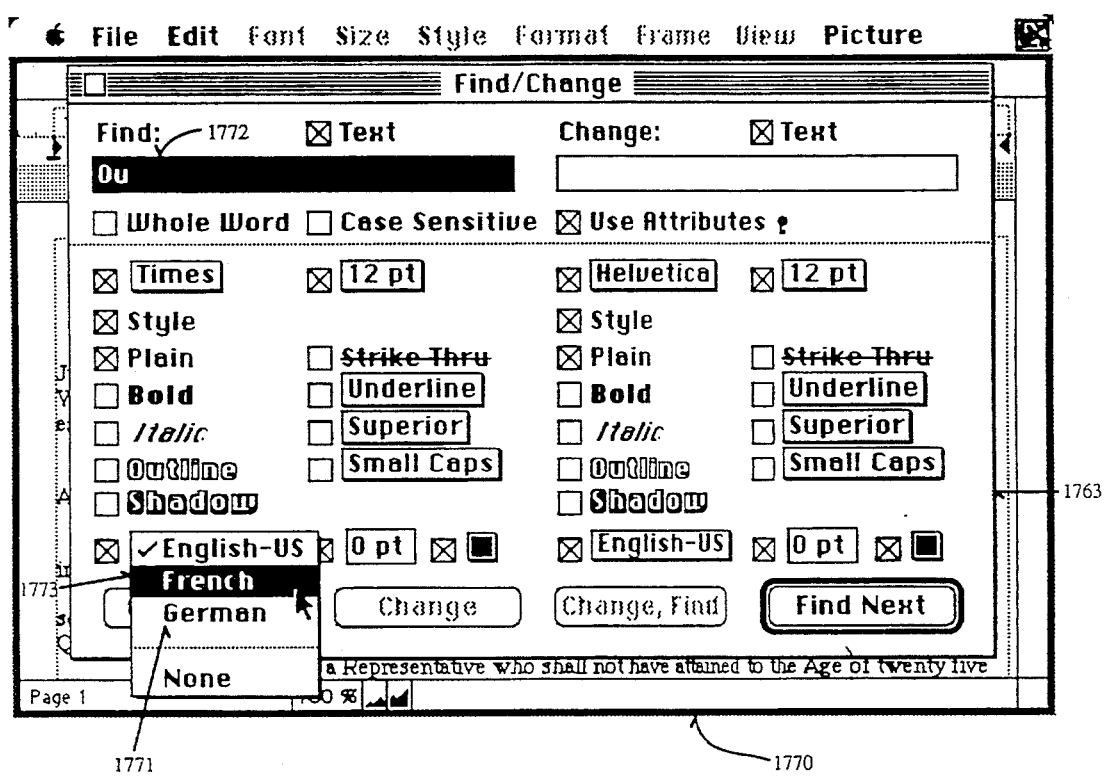

Another option available under pull-down menu 1731 is the ability to change certain items depending on their style or the language that they are written in. This is performed by selecting the "Find/Change" option 1751 on pull-down menu 1731 is shown in screen 1750 of FIG. 17f. The user may key his search based upon the style or the language of the given text. This is shown in more detail with reference to FIG. 17g. After selecting option 1752 shown in screen 1750 of FIG. 17f, dialogue box 1761 appears as shown in screen 1760 of FIG. 17g. The user may select the "Use Attributes" box 1762, and select the "Use Attributes" flag 1763 to cause the style selection box 1763 to appear as is shown in FIG. 17h. As is shown in FIG. 17h on screen 1770, style selection box 1763 provides a submenu 1771 for the search text 1772 wherein the language of the word may be selected. In this case, the word is French so only those sections of the document containing French will be searched. Again, this operation is performed using the index tables which form part of the document file in the preferred embodiment. Therefore, multilingual documents may be saved in such a way as to later preserve the language information as "Styles," so that additional dictionaries and/ or other applications may be loaded at system launch time. The loading of dictionaries is performed in a manner similar to XAPP's to allow particular operations to be performed. The use of "styles" for language greatly enhances the usability of documents which may contain multilingual text.

Figure 18A:
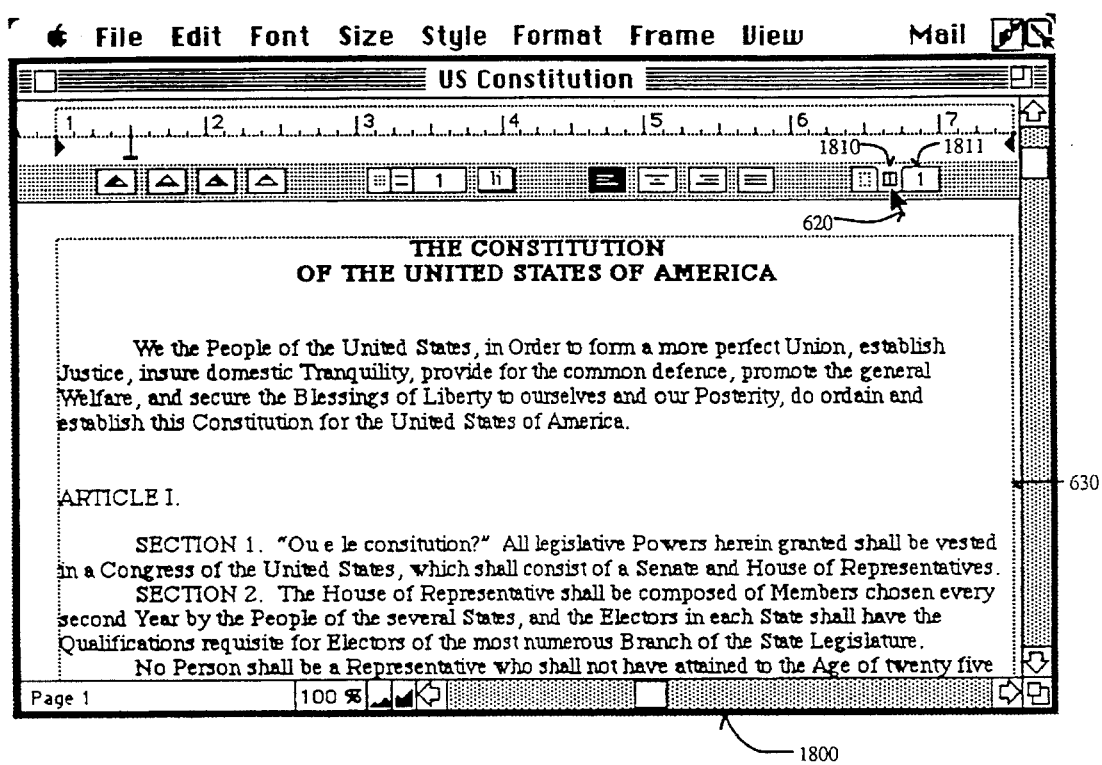
FIGS. 18a and 18b show multicolumnar features as provided by the preferred embodiment.

Another option offered by the preferred embodiment is creation and modification of columns in existing text. One way of doing this is shown in screen 1800 of FIG. 18a. For instance, 620 may be used to select area such as 1810 on screen 1800, which will thus increase the number of columns by one as indicated by column counter 1811. Therefore, because 1811 currently has a one in it, if 1810 is selected, then page 630 will now contain two columns of text and 1811 will be updated to contain two. This is shown in FIG. 18b.

Figure 18B:
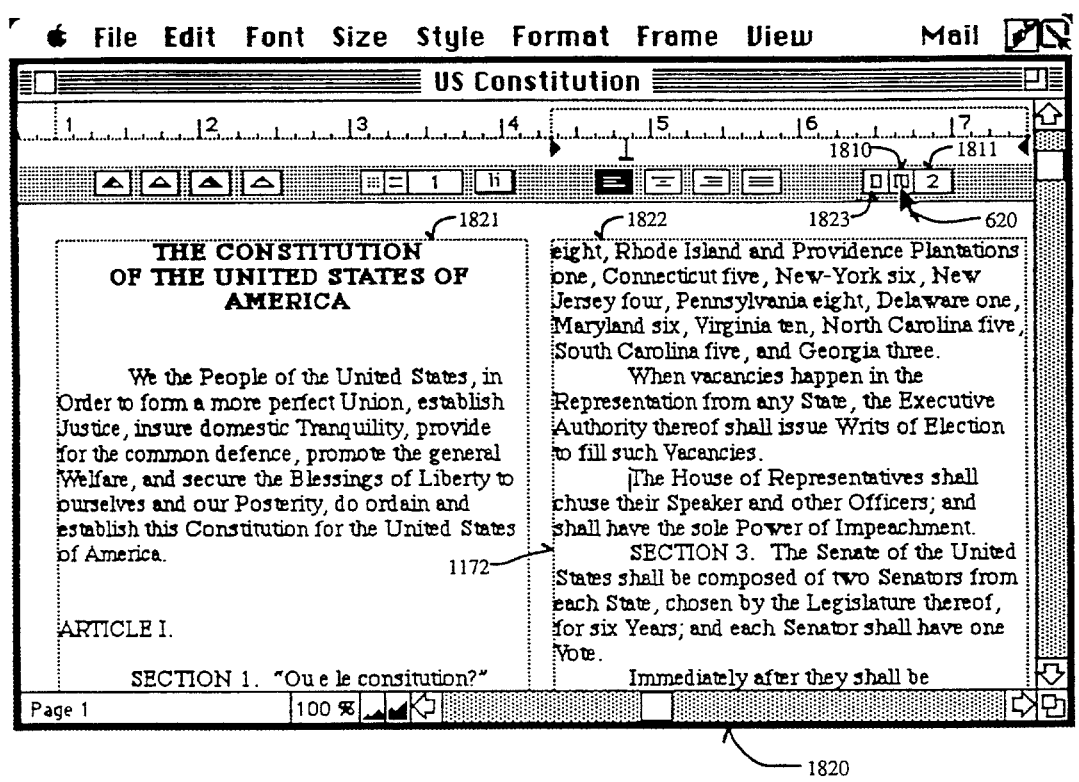

As shown in screen 1820 of FIG. 18b, text 1172 now resides in two columns 1821 and 1822. This is indicated by column number indicator 1811. The number of columns may be increased by one if 1810 is again selected. If 1823 is selected, the number of columns of text may be reduced by one. This provides a convenient and useful way for creating multiple in text such as 1172 shown in FIG. 18b.

Figure 19A:
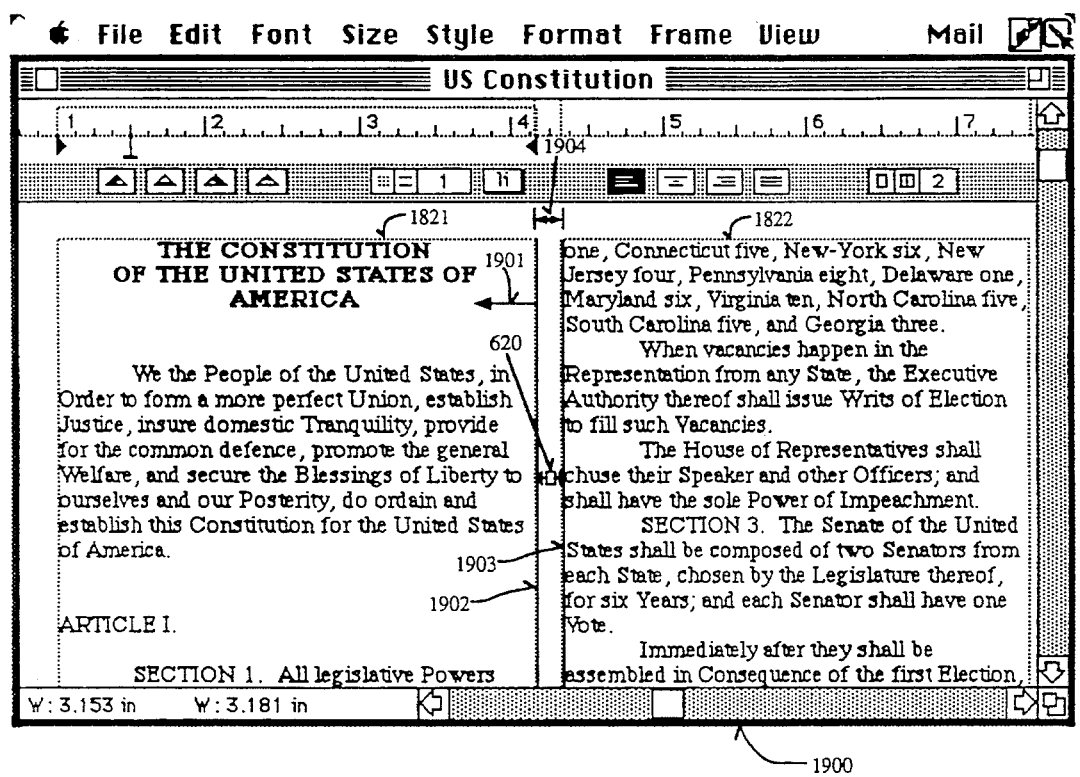
FIGS. 19a through 19d show WYSIWYG (what you see is what you get) page and column guide manipulation commands performed using the preferred embodiment.
Figure 19B:
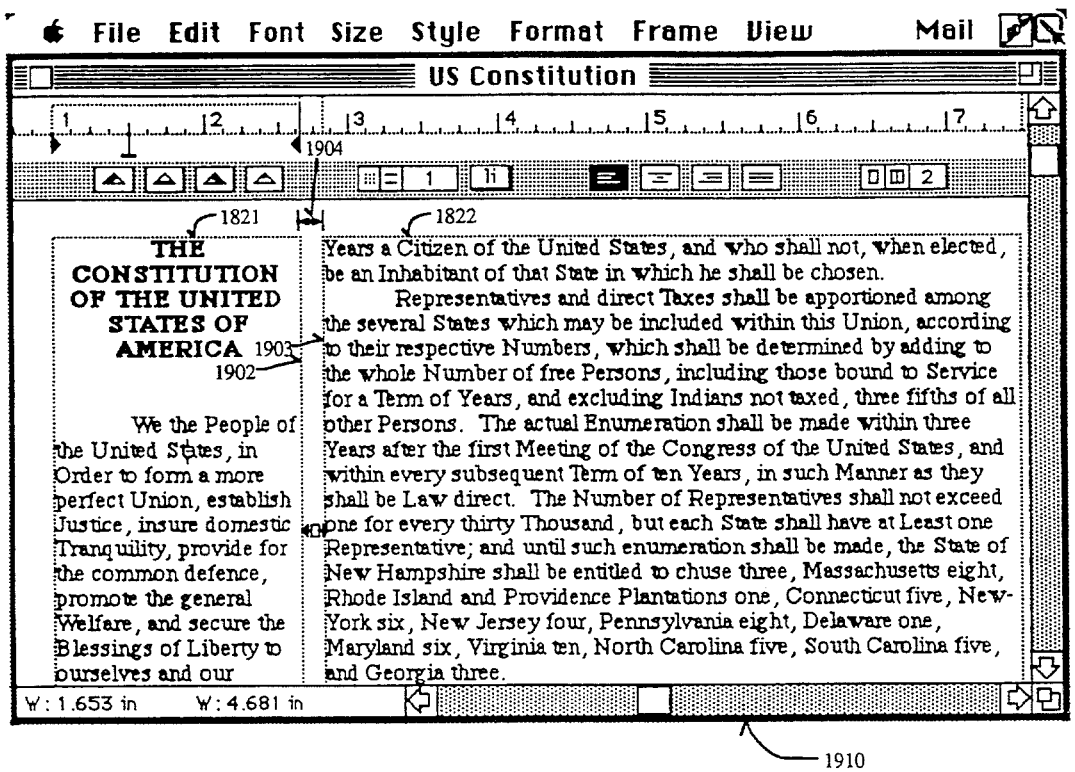

Another feature offered by the preferred embodiment is the use of WYSIWYG (what you see is what you get) modification of text borders. This is graphically shown in screen 1900 of FIG. 19a. For instance, the cursor 620 may be moved to a location between two columns such as 1821 and 1822 as shown in screen 1900 of FIG. 19a. Notice that cursor 620 has changed into a "double arrow" shape. This indicates it is in the "page guide modify mode." The page guide modify cursor 620 is activated by moving the cursor 620 to an area near a page guide such as 1902 and 1903, and selecting the "option" key on keyboard 122. Of course, the option key is set forth merely for the purposes of description of the preferred embodiment and many other ways of activating the page guide manipulation option are contemplated within the spirit and scope of the present invention. Then, the page guide may be moved in a direction such as 1901 shown in screen 1900 of FIG. 19a, thus adjusting text guides 1902 and 1903. When this is done, the text is reflowed into the new borders. Also, when the text guides between two columns of text such as 1821 and 1822 are modified, the gutter or distance such as 1904 between the two columns remains constant. Therefore, even when moved to a new position, the positions of 1902 and 1903 relative to one another remain constant. The result of this move operation is shown as screen 1910 in FIG. 19b. Note that 1902 and 1903 now reside at new locations, however, the distance 1904 (the gutter) has remained fixed.

Figure 19C:
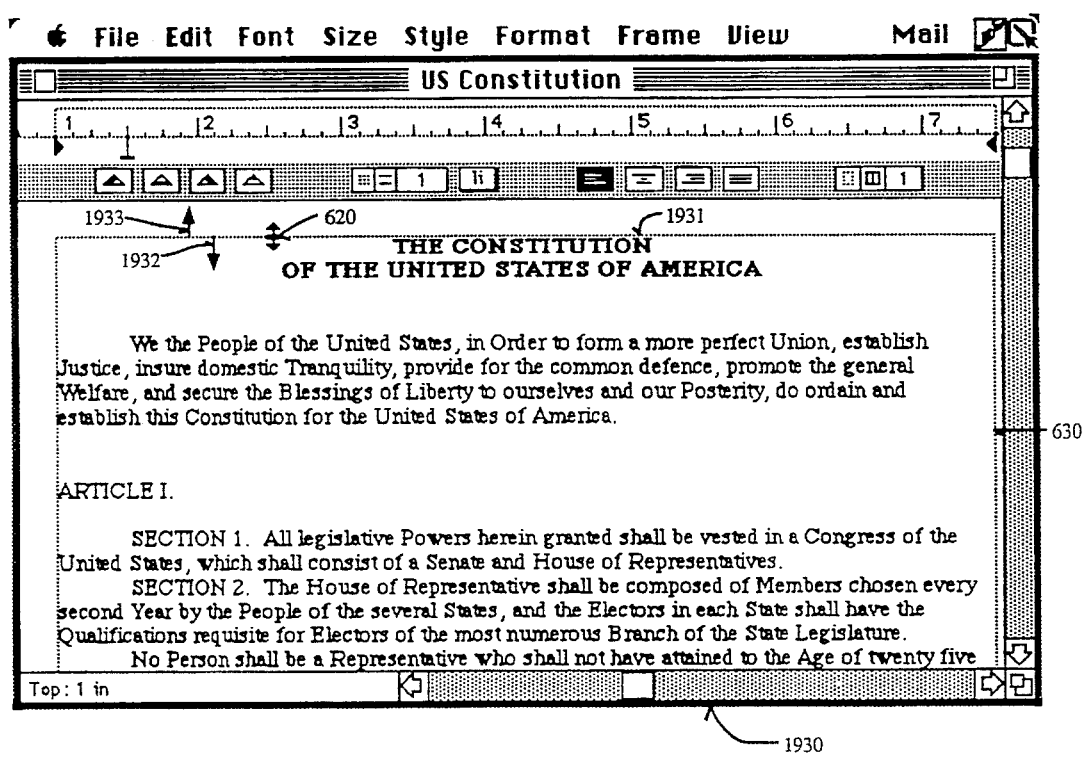
Figure 19D:
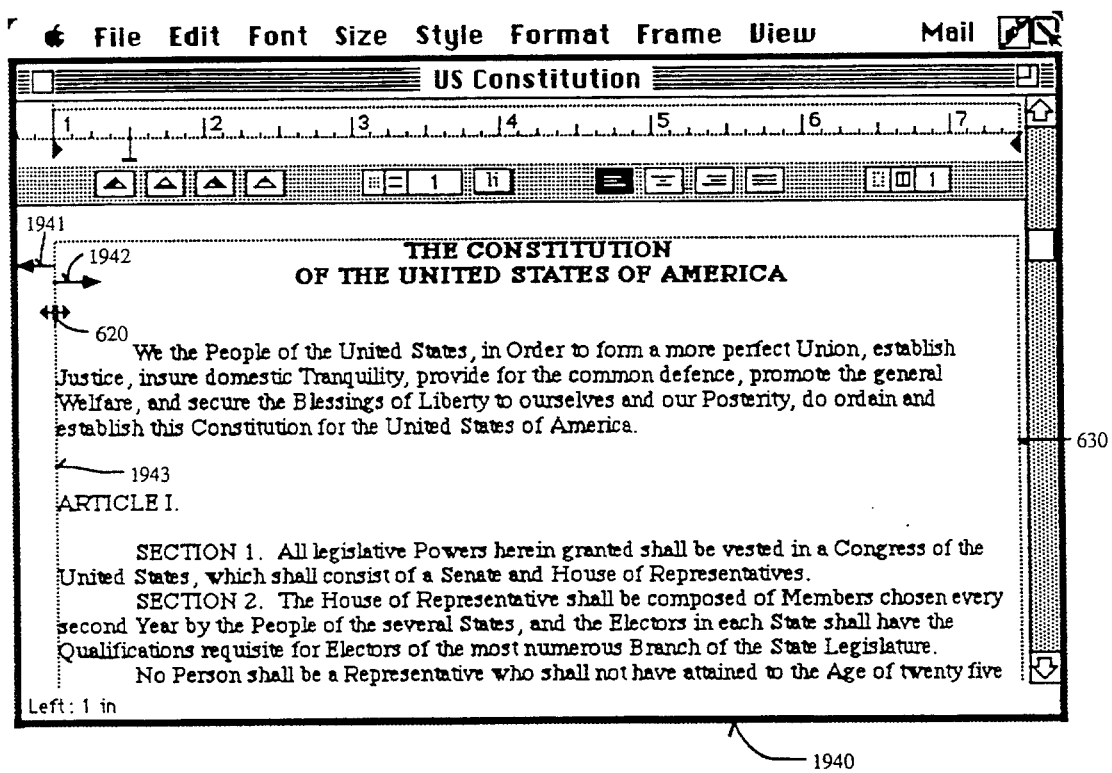

Other page attributes may be modified in this way. For instance, as shown in FIG. 19c, cursor 620 while depressing the option key at the top margin 1931 may be moved in either directions 1932 or 1933 to modify the position of top margin 1931. Also, as shown on screen 1940 of FIG. 19d, 620 may be moved in either directions 1941 or 1942 to modify the left margin 1943 on page 630. These WYSIWYG page manipulation provides a distinct advantage over the prior art method of adjusting the distances manually or on a ruler guide as was performed in the prior art, because changes are performed on the document itself and take effect immediately Although the present invention has been described particularly with reference to FIGS. 1 through 19d, it will be apparent to one skilled in the an that the present invention has utility far exceeding that disclosed in the figures. It is contemplated that many changes and modifications may be made, by one of ordinary skill in the art, without departing from the spirit and scope of the present invention as discussed above.

APPENDIX I

```
*define ushort                   unsigned short

/* frame wrap types */
#define Opaque                   (0)
#define Transparent              (1)
#define RectWrap                 (2)
#define NonRectWrap              (3)

/* frame location types */
#define FixedFrame               (0)
#define InlineFrame              (1)
#define FloatingFrame            (2)

typedef struct
{
    ushort top, left, bottom, right;
} UnsignedRect;

typedef struct
{
    Fixted top, left, bottom, right;
} FixedRect;

/* Frame Record */
typedef struct Frame
{
    short         Class;         /* Object's class. (ie, text)       */
    short         RealClass;     /* Object's actual class, in case   */
                                 /* the editor for object is missing.*/
    Rect          Bounds;        /* Region that defines this frame.  */
                                 /* Relative to mother.              */
    UnsignedRect  FractBounds;   /* Fractional portion of Bounds.    */
    struct
    {
        ushort Wrap         : 2;  /* Frame's wrap type.              */
        ushort Location     : 2;  /* Either fixed, inline, or floating */
        ushort HasSubChain  : 1;  /* TRUE if frame has sub chain on  */
                                  /* disk.
        ushort IsEditorFrame : 1; /* TRUE if this is an 'editor'     */
                                  /* frame.                          */
        ushort DoOutline    : 1;  /* TRUE if frame should be outlined */
                                  /* when page guides are showing.   */
        ushort NonRect      : 1;  /* TRUE if frame can be non-rect.  */
        ushort IsTextObject : 1;  /* TRUE if frame is a text object. */
        ushort DoStyleCmds  : 1;  /* TRUE if frame can do text style */
                                  /* commands.                       */
        ushort DoParaCmds   : 1;  /* TRUE if frame can do text       */
                                  /* paragraph commands.             */
        ushort Reserved     : 5;  /* Reserved for future use.        */
    } Attributes;
```

```
        short           SubChain;       /* starting block of sub chain       */
        ushort          Number;         /* Used when saving objects.         */
        Fixed           Outset;         /* Outset of frame for wrap around.  */
        Fixed           HOffset;        /* Horiz. offset of floating frame   */
5       Fixed           VOffset;        /* Vert. offset of floating frame.   */

/*
        ** Data not stored on disk follows:
        /*
10      long            (*Handler) (Handle object, short message, long data);
                                        /* Object handler for this object.   */
        struct Frame    **Mother;       /* Mother of frame (NULL if none)    */
        struct Frame    **NextBrother;  /* Frame's next brother (or NULL)    */
        struct Frame    **FirstSon;     /* Frame's first son (NULL if none)  */
15      PublisherHandle PubList;        /* Frame's publisher list (or NULL)  */
        SubscriberHandle SubList;       /* Frame's subscriber list (or NULL) */
        } Frame, *FramePtr, **FrameHandle;

20      #define ObjectClass(o)          ((*(FrameHandle)(o))->Class)
        #define ObjectRealClass(o)      ((*(FrameHandle)(o))->RealClass)
        #define FrameBounds(o)          ((*(FrameHandle)(o))->Bounds)
        #define FrameFractBounds(o)     ((*(FrameHandle)(o))->FractBounds)
        #define FrameWrap(o)            ((*(FrameHandle)(o))->Attributes.Wrap)
25      #define FrameLocation(o)        ((*(FrameHandle)(o))->Attributes.Location)
        #define FrameHasSubChain(o)     ((*(FrameHandle)(o))->Attributes.HasSubChain)
        #define IsEditorFrame(o)        ((*(FrameHandle)(o))->Attributes.IsEditorFrame)
        #define DoFrameOutline(o)       ((*(FrameHandle)(o))->Attributes.DoOutline)
        #define FrameCanBeNonRect(o)    ((*(FrameHandle)(o))->Attributes.NonRect)
30      #define FrameIsTextObject(o)    ((*(FrameHandle)(o))->Attributes.IsTextObject)
        #define FrameDoesStyleCmds(o)   ((*(FrameHandle)(o))->Attributes.DoStyleCmds)
        #define FrameDoesParaCmds(o)    ((*(FrameHandle)(o))->Attributes.DoParaCmds)
        #define FrameReserved(o)        ((*(FrameHandle)(o))->Attributes.Reserved)
        #define FrameSubChain(o)        ((*(FrameHandle)(o))->SubChain)
35      #define FrameNumber(o)          ((*(FrameHandle)(o))->Number)
        #define FrameOutset(o)          ((*(FrameHandle)(o))->Outset)
        #define FrameHOffset(o)         ((*(FrameHandle)(o))->HOffset)
        #define FrameVOffset(o)         ((*(FrameHandle)(o))->VOffset)
        #define ObjectHandler(o)        ((*(FrameHandle)(o))->Handler)
40      #define FrameMother(o)          ((*(FrameHandle)(o))->Mother)
        #define FrameNextBrother(o)     ((*(FrameHandle)(o))->NextBrother)
        #define FrameFirstSon(o)        ((*(FrameHandle)(o))->FirstSon)
        #define FramePubList(o)         ((*(FrameHandle)(o))->PubList)
        #define FrameSubList(o)         ((*(FrameHandle)(o))->SubList)
45
        #define FrameDiskSize           (sizeof(Frame) - 6*sizeof(Ptr) - sizeof(short))
        #define FrameSaveLoc(o)         ((unsigned char *)&ObjectRealClass(o))
```

APPENDIX II

```
     #define PageBaseClass             Frame
 5
     /* Page Record */
     typedef struct Page
     {
         PageBaseClass   BaseClassData;    /* Object's base class data.            */
10       short           PageNumber;       /* Page number for this page.           */
         short           DisplayNumber;    /* Virtual Page number for this page.   */
                                           /* based on section start num           */
         short           Panel;            /* Panel for this page.                 */
         short           PageStartSect;    /* Section # of first char on page      */
15   } Page, *PagePtr, **PageHandle;

*define PageNumber(p)          ((*(PageHandle)(p))->PageNumber)
     *define PageDispNumber(p)      ((*(PageHandle)(p))->DisplayNumber)
     *define PagePanel(p)           ((*(PageHandle)(p))->Panel)
```

APPENDIX III

```
     #define LinkBaseClass              Frame
 5
     /* Link Record */
     typedef struct Link
     {
         LinkBaseClass    BaseClassData;      /* Object's base class data.      */
10       struct Link      **Next;             /* Next object in link, or NULL.  */
         struct Link      **Previous;         /* Prev object in link, or NULL.  */
     } Link, *LinkPtr, **LinkHandle;

#define NextLink(1)                 ((*(LinkHandle)(1))->Next)
15   #define PreviousLink(1)             ((*(LinkHandle)(1))->Previous)
```

APPENDIX IV

```
#define TextBaseClass              Link

/* Text Record */
typedef struct Text
{
    TextBaseClass   BaseClassData;       /* Object's base class data.        */
    long            StartCharPos;        /* Starting character position.     */
    struct
    {
        ushort      State        : 2;    /* State of the text object.        */
        ushort      AutoFlow     : 1;    /* If TRUE, frame can be linked.    */
        ushort      HasAuxData   : 1;    /* If TRUE, frame has aux data.     */
        ushort      AutoGrew     : 1;    /* If TRUE, frame auto-grew.        */
        ushort      CanAutoGrow  : 1;    /* If TRUE, frame can auto grow.    */
        ushort      Filler       : 10;   /* Unused.                          */
    } A;

/*
    ** Data not stored on disk follows:
    */
    EditHandle      Data;                /* Text information.                */
    LOSHandle       LOSDATA;             /* Lines On Screen information.     */
} Text, *TextPtr, **TextHandle;

#define TextData(t)                ((*(TextHandle)(t))->Data)
#define TextLOSData(t)             ((*(TextHandle)(t))->LOSData)
#define TextStartCharPos(t)        ((*(TextHandle)(t))->StartCharPos)
#define TextState(t)               ((*(TextHandle)(t))->A.State)
#define TextAutoFlow(t)            ((*(TextHandle)(t))->A.AutoFlow)
#define TextHasAuxData(t)          ((*(TextHandle)(t))->A.HasAuxData)
#define TextAutoGrew(t)            ((*(TextHandle)(t))->A.AutoGrew)
#define TextCanAutoGrow(t)         ((*(TextHandle)(t))->A.CanAutoGrow)
```

APPENDIX V

```
/*
    File:       GenericXAPP.h

Contains:   Header file for the generic XAPP.

Copyright:  © CLARIS, all rights reserved.
*/ ifndef     GENERICXAPP ifndef     FRAME
include    "FrameMW.h"
endif define     GENERICXAPP define     GenericXAPPBaseClass        Frame

/* Generic XAPP Record */
typedef struct GenericXAPP
{
        GenericXAPPBaseClass    BaseClassData;      /* Object's base class data.
            */

/* We have no data of our own */
} GenericXAPP, *GenericXAPPPtr, **GenericXAPPHandle;

#endif
```

```
/*
    File:       GenericXAPP.r

Contains:   Resources for the Generic XAPP.

Copyright:  © CLARIS, all rights reserved.
*/ include     "Types.r"
include     "SysTypes.r"
#include     "XAPPHeader.r"

#include     "GenericXAPPResID.h"

include      "GenericXAPP.rsrc";

resource 'XTYP' (GenericXAPPResIDBase, "Generic XAPP", purgeable, preload) {
        1,
        GenericXAPPObjectID,
        isUserObject,
        noPrefPanel,
        noClickCreate,
        fixedWrapAround,
        floatInline,
        WhiteColor,
        Opaque,
        BlackColor,
        Opaque,
        NoLine,
        SolidLine,
        "Generic XAPP"
};

data GenericXAPPA5RefType (GenericXAPPResIDBase, "A5 Reference", preload) {
        $"00 00 00 00"
};
```

```
/*
    File:       GenericXAPPHandlerMW.c
    Contains:   Generic XAPP handler.
    Copyright:  © CLARIS, all rights reserved.
*/ include     "MPWHeaders.h"

include     "XAPPUtil.h"
#include     "XAPPSegment.h"
#include     "XAPPMW.h"
#include     "GenericXAPP.h"
#include     "GenericXAPPResID.h"

/* The segment containing the handler routine MUST be called Main */
pragma segment    Main /* defines */
define     Inherit(f,m,d)  \
            (*commonGlobals.handlerproc)(FrameClass,f,m,d)

/* globals */
CommonGlobals   *myGlobals;        /* globals common to both the app and XAPPs */
QuickDraw       *qdGlobals;        /* pointer to application's quickdraw globals */

/* external prototypes */

/* static globals */
static char     line1Text[] = "\pHello,";
static char     line2Text[] = "\pMacWrite!!";

/* static prototypes */
static void     DrawFrame(FrameHandle);

/****************************************************************************
 *
 *    main
 *
 *    Object Handler for the generic XAPP.
 *
 *    Input:  frame, a message, and some possible data (varies based on message).
 *    Output: Varies based on message.
 *
 ****************************************************************************/
long main(frame,msg,data)
```

```
                    register FrameHandle    frame;
                    register short          msg;
                    register long           data;
                    {
 5                     Handle               a5World;
                       long                 oldA5;
                       Boolean              wasUnlocked;
                       long                 returnvalue = 0L;

10                     /* set up our global space */
                       a5World = GetResource(GenericXAPPA5RefType,GenericXAPPResIDBase);
                       if (msg != InitXAPP)
                               oldA5 = MS_SetA5World(a5World, &wasUnlocked);

15                     /* Check for XAPP messages first */
                       if (IsXAPPMessage(msg))
                       {
                               switch (msg)
                               {
20                                     case InitXAPP:
                                               /*
                                               **      Sent at launch time.
                                               */

25                                             /* set up common and Quickdraw globals */
                                               oldA5 =
                    MS_MakeA5World(a5World,GenericXAPPObjectID, &wasUnlocked);

/* indicate failure appropriately */
30                                             if (!oldA5) break;

qdGlobals = (QuickDraw *)(*(Byte **)oldA5 - (sizeof(qd) -
                    sizeof(GrafPtr)));

myGlobals = (CommonGlobals *)data;
35
                                               /*
                                               **      XAPP-specific initialization should be done here.
                                               */

40                                             /* return TRUE to show that this XAPP should be used */
                                               returnvalue = TRUE;
                                               break;

case CloseXAPP:
45                                             /*
                                               **      Sent when exiting application.  Do XAPP cleanup
                    here.
                                               */
                                               break;
50                             }
                       }
                       else
                       {
                               switch (msg)
```

```
{
    case InitMsg:
    {
    /*
    **      data:               InitMsgData *.
    **      return value:   New frame, or NULL if failure.
    */
        register FrameHandle  newframe;

/* Inherit and allow the frame handle to be created */
        if (!(newframe = (FrameHandle)Inherit(frame,msg,data)))
                break;

/* Initialize frame data here */
        DoFrameOutline(newframe) = TRUE;

returnvalue = (long)newframe;
        break;
    } case KeyMsg:
    /*
    **      data:               EventRecord *.
    **      return value:   None.
    */
        /* Handle a key down event here */
        break;

case MouseMsg:
    /*
    **      data:               EventRecord *.
    **      return value:   None.
    */
        /* Handle a mouse down event here */
        break;

case CursorMsg:
    /*
    **      data:               EventRecord *.
    **      return value:   None.
    */
        /* The mouse is over the frame. Set the cursor appropriately.
    */
        SetCursor(*GetCursor(GenericXAPPCursor));
        break;

case DrawContentsMsg:
    /*
    **      data:               None.
    **      return value:   None.
    */
        /* Inherit to allow generic frame updating to occur */
        returnvalue = Inherit(frame,msg,data);
```

```
                                /* update the frame */
                                DrawFrame(frame);
                                break;
                    default:
                                /* By default, just inherit to our parent class. */
                                returnvalue = Inherit(frame,msg,data);
                                break;
                    }
          }

/* restore the app's global space */
          MS_RestoreA5World(oldA5, a5World, wasUnlocked, TRUE);

return(returnvalue);
}

/***************************************************************************
*********
*
*         DrawFrame
*
*         Updates a given frame.
*
*
*         Input:    frame.
*         Output:           None.
*
****************************************************************************
********/ static void DrawFrame(frame)

register FrameHandle  frame;
{
          Rect            bounds, clipRect;
          FontInfo        fInfo;
          short           fontWidth, fontHeight, frameWidth, frameHeight;
          RgnHandle       oldClip, newClip = NULL;

getcontrect(frame, &bounds);
          frameWidth = bounds.right - bounds.left;
          frameHeight = bounds.bottom - bounds.top;

oldClip = NewRgn();

/* set up our clipping region */
          GetClip(oldClip);

/* if we're in a scaled view, the clipping rect must be scaled */
          clipRect = bounds;
          MapRect(&clipRect, &srcrect, &destrect);
```

```
        /*
        **      if printing, do a simple clip.
        **      Otherwise, intersect with the existing clip rgn
        */
5       if (printinfo)
                ClipRect(&clipRect);
        else
        {
                newClip = NewRgn();
10              RectRgn(newClip, &clipRect);
                SectRgn(oldClip, newClip, newClip);
                SetClip(newClip);
        }

15      PenNormal();

/* Let the application know that we are drawing text. */
        XAPPdrawingtext = TRUE;

20      /* draw the text centered in the box */
        TextFont(geneva);
        TextSize(12);
        TextFace(bold);
        TextMode(srcOr);
25      GetFontInfo(&fInfo);
        fontHeight = fInfo.ascent + fInfo.descent + fInfo.leading;
        fontWidth = StringWidth(line1Text);
        MoveTo(bounds.left + (frameWidth - fontWidth)/2,
                bounds.top + (frameHeight - 2*fontHeight)/2 + fInfo.ascent);
30      DrawString(line1Text);
        fontWidth = StringWidth(line2Text);
        MoveTo(bounds.left + (frameWidth - fontWidth)/2,
                bounds.top + (frameHeight - 2*fontHeight)/2 + fontHeight +
        fInfo.ascent);
35      DrawString(line2Text);

XAPPdrawingtext = FALSE;

/* restore the clipping region */
40      SetClip(oldClip);
        DisposeRgn(oldClip);
        if (newClip) DisposeRgn(newClip);
    }
```

```
       /*
              File:        GenericXAPPResID.h

Contains:    Resource ID defines for the Generic XAPP.
 5
              Copyright:   © CLARIS, all rights reserved.

*/

10     #define      GenericXAPPA5RefType    'A5RF' define      GenericXAPPObjectID           (50)
       #define      GenericXAPPClass        GenericXAPPObjectID
       #define      GenericXAPPResIDBase    (20000)
15
       /* Cursor */
       #define      GenericXAPPCursor  GenericXAPPResIDBase
```

What is claimed is:

1. In a computer system comprising a processor, a display, a selection device and a pointing device for controlling a cursor on said display, a computer-implemented method for manipulating appearance of text on said display to present said text on a page comprising the following steps:

a. displaying a plurality of borders on an editing window on said display, and displaying text from a document within said plurality of borders, each of said borders defining margins of said text on said display;

b. detecting a user moving said cursor on said computer system display within said editing window to a first position along at least one of said borders;

c. changing an appearance of said cursor to a second representation, wherein said cursor has a first representation during editing operations;

d. detecting said user selecting said at least one of said borders by activating said selection device;

e. detecting said user moving said cursor to a second position on said display, and responsive thereto, moving said at least one of said borders on said display to said second position;

f. detecting said user de-selecting said at least one of said borders by de-activating said selection device; and g. reflowing said text on said display so that said margins of said text correspond with positions of each of said borders on said display including said one of said borders at said second position on said display.

2. The computer-implemented method of claim 1 wherein said borders include page guides.

3. The computer-implemented method of claim 1 wherein said borders include column guides.

4. The computer-implemented method of claim 3 wherein said at least one of said borders includes two of said column guides having a first distance therebetween, wherein said step of moving said at least one of said borders on said display to said second position includes moving said two of said column guides to said second position and maintaining said first distance therebetween.

5. The computer-implemented method of claim 1 wherein said borders include column borders within a table.

6. The computer-implemented method of claim 1 wherein said borders include table borders defining margins of a table within said document.

7. The computer-implemented method of claim 1 wherein said second representation includes a double-arrow.

8. In a computer system comprising a processor, a display, a selection device and a pointing device for controlling a cursor on said display, an apparatus for manipulating appearance of text on said display to present said text on a page comprising:

a. means for displaying a plurality of borders on an editing window on said display, and displaying text from a document within said plurality of borders, each of said borders defining margins of said text on said display;

b. means for detecting a user moving said cursor on said computer system display within said editing window to a first position along at least one of said borders;

c. means for changing an appearance of said cursor to a second representation, wherein said cursor has a first representation during editing operations;

d. means for detecting said user selecting said at least one of said borders by activating said selection device;

e. means for detecting said user moving said cursor to a second position on said display, and responsive thereto, moving said at least one of said borders on said display to said second position;

f. means for detecting said user de-selecting said at least one of said borders by deactivating said selection device; and g. means for reflowing said text on said display so that said margins of said text correspond with positions of each of said borders on said display including said one of said borders at said second position on said display.

9. The apparatus of claim 8 wherein said borders include page guides.

10. The apparatus of claim 8 wherein said borders include column guides.

11. The apparatus of claim 10 wherein said at least one of said borders includes two of said column guides having a first distance therebetween, wherein said moving of said at least one of said borders on said display to said second position includes moving said two of said column guides to said second position and maintaining said first distance therebetween.

12. The apparatus of claim 8 wherein said borders include column borders within a table.

13. The apparatus of claim 8 wherein said borders include table borders defining margins of a table within said document.

14. The apparatus of claim 8 wherein said second representation includes a double-arrow.

15. A computer system comprising a processor, a memory coupled to said processor, a display coupled to said processor, a selection device coupled to said processor and a pointing device coupled to said processor for controlling a cursor on said display, comprising:

a. a first circuit for displaying a plurality of borders on an editing window on said display, and displaying text from a document within said plurality of borders, each of said borders defining margins of said text on said display;

b. a second circuit for detecting a user moving said cursor on said computer system display within said editing window to a first position along at least one of said borders;

c. a third circuit for changing an appearance of said cursor to a second representation, wherein said cursor has a first representation during editing operations;

d. a fourth circuit for detecting said user selecting said at least one of said borders by activating said selection device;

e. a fifth circuit for detecting said user moving said cursor to a second position on said display, and responsive thereto, moving said at least one of said borders on said display to said second position;

f. a sixth circuit for detecting said user de-selecting said at least one of said borders by de-activating said selection device; and g. a seventh circuit for reflowing said text on said display so that said margins of said text correspond with positions of each of said borders on said display including said one of said borders at said second position on said display.

16. The computer system of claim 15 wherein said borders include page guides.

17. The computer system of claim 15 wherein said borders include column guides.

18. The computer system of claim 17 wherein said at least one of said borders includes two of said column guides having a first distance therebetween, wherein said moving of said at least one of said borders on said display to said second position includes moving said two of said column guides to said second position and maintaining said first distance therebetween.

19. The computer system of claim 15 wherein said borders include column borders within a table.

20. The computer system of claim 15 wherein said borders include table borders defining margins of a table within said document.

21. The computer system of claim 15 wherein said second representation includes a double-arrow.

* * * * *